US007048375B2

(12) United States Patent
Doshi et al.

(10) Patent No.: US 7,048,375 B2
(45) Date of Patent: *May 23, 2006

(54) TINTED LENSES AND METHODS OF MANUFACTURE

(75) Inventors: Praful Doshi, 12628 Brookstone Ct., Poway, CA (US) 92064; James Edward Fox, Cambridge (GB); Philip Gareth Bentley, Cambridge (GB); Jagvi Ramesh Patel, Royston (GB)

(73) Assignee: Praful Doshi, Poway, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 10/679,645

(22) Filed: Oct. 6, 2003

(65) Prior Publication Data

US 2004/0130676 A1    Jul. 8, 2004

Related U.S. Application Data

(60) Continuation-in-part of application No. 10/128,064, filed on Apr. 23, 2002, which is a continuation-in-part of application No. 09/949,520, filed on Sep. 7, 2001, now Pat. No. 6,834,955, which is a division of application No. 09/696,933, filed on Oct. 25, 2000, now Pat. No. 6,315,410.

(60) Provisional application No. 60/218,710, filed on Jul. 17, 2000, provisional application No. 60/162,695, filed on Nov. 1, 1999.

(30) Foreign Application Priority Data

Oct. 23, 2000    (US) .................... PCT/US00/41454

(51) Int. Cl.
*G02C 7/02*    (2006.01)

(52) U.S. Cl. ..................... 351/162; 351/165; 351/177

(58) Field of Classification Search ............ 351/160 R, 351/160 H, 161, 162, 177, 165
See application file for complete search history.

(56) References Cited

U.S. PATENT DOCUMENTS

| D211,757 S | 7/1968 | Urbach |
| 3,476,499 A | 11/1969 | Wichterle et al. |
| 3,536,386 A | 10/1970 | Spivak |
| 3,557,261 A | 1/1971 | Wichterle |
| 3,679,504 A | 7/1972 | Wichterle |
| 3,712,718 A | 1/1973 | LeGrand et al. |
| 4,038,264 A | 7/1977 | Rostoker et al. |
| 4,130,708 A | 12/1978 | Friedlander et al. |
| 4,136,250 A | 1/1979 | Mueller et al. |
| 4,153,641 A | 5/1979 | Deichert et al. |

(Continued)

FOREIGN PATENT DOCUMENTS

CA         710230        5/1965

(Continued)

OTHER PUBLICATIONS

File history for U.S. Appl. No. 09/428,817.

(Continued)

*Primary Examiner*—Scott J. Sugarman
(74) *Attorney, Agent, or Firm*—David R. Preston; David R. Preston & Associates

(57) ABSTRACT

The present invention recognizes that lenses, such as contact lenses, can be pigmented using ink that include polymers or polymerizable monomers, preferably the same monomers used to make the lens. Preferably, such lenses are made using bonding agents. The ink can be used to make images on or within the lens. Images made using these inks are preferably digital and can be used in a variety of printing methods, including ink-jet printing.

54 Claims, 16 Drawing Sheets

U.S. PATENT DOCUMENTS

| | | |
|---|---|---|
| 4,189,546 A | 2/1980 | Deichert et al. |
| 4,252,421 A | 2/1981 | Foley, Jr. |
| 4,266,232 A | 5/1981 | Juliana, Jr. et al. |
| 4,303,924 A | 12/1981 | Young, Jr. |
| 4,424,328 A | 1/1984 | Ellis |
| 4,433,125 A | 2/1984 | Ichinohe et al. |
| 4,447,474 A | 5/1984 | Neefe |
| 4,460,523 A | 7/1984 | Neefe |
| 4,463,149 A | 7/1984 | Ellis |
| 4,472,327 A | 9/1984 | Neefe |
| 4,525,044 A | 6/1985 | Bauman |
| 4,558,931 A | 12/1985 | Fuhrman |
| 4,559,059 A | 12/1985 | Su |
| 4,582,402 A | 4/1986 | Knapp |
| 4,605,712 A | 8/1986 | Mueller et al. |
| 4,640,805 A | 2/1987 | Neefe |
| 4,652,622 A | 3/1987 | Friends et al. |
| 4,668,240 A | 5/1987 | Loshaek |
| 4,681,412 A | 7/1987 | Lemelson |
| 4,686,267 A | 8/1987 | Ellis et al. |
| 4,701,038 A | 10/1987 | Neefe |
| 4,704,017 A | 11/1987 | Knapp |
| 4,709,657 A | 12/1987 | Gothard |
| 4,710,328 A | 12/1987 | Neefe |
| 4,711,943 A | 12/1987 | Harvey, III |
| 4,719,657 A | 1/1988 | Bawa |
| 4,720,188 A | 1/1988 | Knapp |
| 4,725,133 A | 2/1988 | Neefe |
| 4,740,533 A | 4/1988 | Su et al. |
| 4,744,647 A | 5/1988 | Meshel et al. |
| 4,745,857 A | 5/1988 | Putnam et al. |
| 4,793,264 A | 12/1988 | Lin et al. |
| 4,810,764 A | 3/1989 | Friends et al. |
| 4,811,662 A | 3/1989 | Sterman |
| 4,840,477 A | 6/1989 | Neefe |
| 4,851,931 A | 7/1989 | Parker et al. |
| 4,857,072 A | 8/1989 | Narducy et al. |
| 4,867,552 A | 9/1989 | Neefe |
| 4,872,405 A | 10/1989 | Sterman |
| 4,889,421 A | 12/1989 | Cohen |
| 4,898,695 A | 2/1990 | Doshi |
| 4,914,522 A | 4/1990 | Duffield et al. |
| 4,921,205 A | 5/1990 | Drew, Jr. et al. |
| 4,946,269 A | 8/1990 | Magdassi |
| 4,963,159 A | 10/1990 | Narducy et al. |
| 4,981,487 A | 1/1991 | da Costa |
| 5,018,849 A | 5/1991 | Su et al. |
| 5,034,166 A | 7/1991 | Rawlings et al. |
| 5,062,892 A | 11/1991 | Halko |
| 5,070,169 A | 12/1991 | Robertson et al. |
| 5,070,170 A | 12/1991 | Robertson et al. |
| 5,106,182 A | 4/1992 | Briggs et al. |
| 5,116,112 A | 5/1992 | Rawlings |
| 5,120,121 A | 6/1992 | Rawlings et al. |
| 5,126,531 A | 6/1992 | Majima et al. |
| 5,158,717 A | 10/1992 | Lai |
| 5,158,718 A | 10/1992 | Thakrar et al. |
| 5,160,463 A | 11/1992 | Evans et al. |
| 5,176,745 A | 1/1993 | Moore et al. |
| 5,196,493 A | 3/1993 | Gruber et al. |
| 5,205,212 A | 4/1993 | Wolfe |
| 5,238,613 A | 8/1993 | Anderson |
| 5,244,470 A | 9/1993 | Onda et al. |
| 5,244,799 A | 9/1993 | Anderson |
| 5,260,000 A | 11/1993 | Nadu et al. |
| 5,266,077 A | 11/1993 | Auten et al. |
| 5,271,765 A | 12/1993 | Ma |
| 5,271,874 A | 12/1993 | Osipo et al. |
| 5,272,010 A | 12/1993 | Quinn |
| 5,302,978 A | 4/1994 | Evans et al. |
| 5,307,704 A | 5/1994 | Muller et al. |
| 5,307,740 A | 5/1994 | Yamamoto et al. |
| 5,310,779 A | 5/1994 | Lai |
| 5,329,293 A | 7/1994 | Liker |
| 5,334,681 A | 8/1994 | Mueller et al. |
| 5,335,072 A | 8/1994 | Tanaka et al. |
| 5,346,946 A | 9/1994 | Yokayama et al. |
| 5,352,245 A | 10/1994 | Su et al. |
| 5,352,887 A | 10/1994 | Morgan et al. |
| 5,372,852 A | 12/1994 | Titterington et al. |
| 5,376,957 A | 12/1994 | Gandy et al. |
| 5,387,663 A | 2/1995 | McGee et al. |
| 5,389,132 A | 2/1995 | Davulcu l. |
| 5,414,477 A | 5/1995 | Jahnke |
| 5,452,658 A | 9/1995 | Shell |
| 5,467,149 A | 11/1995 | Morrison et al. |
| 5,472,789 A | 12/1995 | Iqbal et al. |
| 5,580,498 A | 12/1996 | Sugiyama et al. |
| 5,621,022 A | 4/1997 | Jaeger et al. |
| 5,637,265 A | 6/1997 | Misciagno et al. |
| 5,658,376 A | 8/1997 | Noguchi et al. |
| 5,662,706 A | 9/1997 | Legerton et al. |
| 5,704,017 A | 12/1997 | Heckerman et al. |
| 5,713,963 A | 2/1998 | Bensky |
| 5,733,333 A | 3/1998 | Sankey |
| 5,757,458 A | 5/1998 | Miller et al. |
| 5,764,266 A | 6/1998 | Azuma et al. |
| 5,786,883 A | 7/1998 | Miller et al. |
| 5,793,898 A | 8/1998 | Nakamoto |
| 5,819,661 A | 10/1998 | Lewis et al. |
| 5,835,554 A | 11/1998 | Suzuki et al. |
| 5,867,247 A | 2/1999 | Martin et al. |
| 5,871,675 A | 2/1999 | Muller et al. |
| 5,887,247 A | 3/1999 | Baltus et al. |
| 5,905,561 A | 5/1999 | Lee et al. |
| 5,926,195 A | 7/1999 | Domhoff et al. |
| 5,936,704 A | 8/1999 | Gabrielian et al. |
| 5,936,705 A | 8/1999 | Ocampo et al. |
| 6,030,078 A | 2/2000 | Ocampo |
| 6,070,527 A | 6/2000 | Yamane et al. |
| 6,123,021 A | 9/2000 | Cameron |
| 6,132,043 A | 10/2000 | Atkins et al. |
| 6,135,654 A | 10/2000 | Jennel |
| 6,139,577 A | 10/2000 | Schleipman et al. |
| 6,143,026 A | 11/2000 | Meakem |
| 6,159,296 A | 12/2000 | Aoyama et al. |
| 6,196,683 B1 | 3/2001 | Quinn et al. |
| 6,197,409 B1 | 3/2001 | Bodagger et al. |
| 6,276,266 B1 | 8/2001 | Dietz et al. |
| 6,284,161 B1 | 9/2001 | Thakrar et al. |
| 6,315,410 B1 | 11/2001 | Doshi |
| 6,488,375 B1 | 12/2002 | Streibig |
| 6,488,376 B1 | 12/2002 | Streibig |
| 6,811,259 B1 | 11/2004 | Tucker |
| 6,880,932 B1 | 4/2005 | Doshi |
| 2001/0050753 A1 | 12/2001 | Tucker |
| 2002/0030788 A1 | 3/2002 | Doshi |
| 2002/0039172 A1 | 4/2002 | Ocampo et al. |
| 2002/0057416 A1 | 5/2002 | Streibig |
| 2002/0080327 A1 | 6/2002 | Clark et al. |
| 2002/0107337 A1 | 8/2002 | Rosenzweig et al. |
| 2002/0140900 A1 | 10/2002 | Streibig |
| 2003/0002011 A1 | 1/2003 | Streibig |
| 2003/0002012 A1 | 1/2003 | Streibig |
| 2003/0007122 A1 | 1/2003 | Streibig |
| 2003/0025873 A1 | 2/2003 | Ocampo |
| 2003/0030772 A1 | 2/2003 | Ocampo |
| 2003/0085934 A1 | 5/2003 | Tucker et al. |
| 2003/0119943 A1 | 6/2003 | Tucker et al. |
| 2003/0184710 A1 | 10/2003 | Tucker |
| 2005/0007549 A1 | 1/2005 | Tucker |

FOREIGN PATENT DOCUMENTS

| | | |
|---|---|---|
| EP | 0 108 886 | 5/1984 |
| EP | 0 114 894 | 8/1984 |
| EP | 0 272 101 | 6/1988 |
| EP | 0 272 202 A2 | 6/1988 |
| EP | 0 272 202 A3 | 6/1988 |
| EP | 0 272 202 B1 | 6/1988 |
| EP | 0 277 771 | 8/1988 |
| EP | 0 295 947 | 12/1988 |
| EP | 0 330 616 | 8/1989 |
| EP | 0 357 062 A2 | 8/1989 |
| EP | 0 393 532 A2 | 4/1990 |
| EP | 0 367 471 | 5/1990 |
| EP | 0 369 942 | 5/1990 |
| EP | 0 390 443 | 10/1990 |
| EP | 0 395 583 | 10/1990 |
| EP | 0 425 436 | 5/1991 |
| EP | 0 461 270 | 12/1991 |
| EP | 0 472 496 | 2/1992 |
| EP | 0 482 836 A1 | 4/1992 |
| EP | 0 482 837 A1 | 4/1992 |
| EP | 0 484 044 | 5/1992 |
| EP | 0 484 045 | 5/1992 |
| EP | 0 584 764 | 3/1994 |
| EP | 0 482 836 B1 | 3/1995 |
| EP | 0 482 837 B1 | 3/1995 |
| EP | 0 482 836 B1 | 3/1999 |
| GB | 1 583 492 | 1/1981 |
| JP | 6228812 | 12/1987 |
| JP | 8-112566 | 5/1996 |
| JP | 8112566 | 5/1996 |
| JP | 10171994 | 6/1998 |
| WO | 83/038480 | 10/1983 |
| WO | 91/06886 | 5/1991 |
| WO | 92/07013 | 5/1992 |
| WO | 93/05085 | 5/1993 |
| WO | 93/09154 | 5/1993 |
| WO | 97/37489 | 10/1997 |
| WO | 97/48004 | 12/1997 |
| WO | 97/48005 | 12/1997 |
| WO | 98/25180 | 6/1998 |
| WO | 98/28652 | 7/1998 |
| WO | 01/35158 | 5/2001 |
| WO | 01/40846 A2 | 6/2001 |
| WO | 01/40846 A3 | 6/2001 |
| WO | 01/42846 | 6/2001 |
| WO | 01/96908 | 12/2001 |
| WO | 02/074186 | 9/2002 |
| WO | 02/079860 | 10/2002 |
| WO | WO 03/040242 A2 | 5/2003 |
| WO | WO 03/040242 A3 | 5/2003 |

OTHER PUBLICATIONS

File history for U.S. Appl. No. 09/678,195.
March J., *Advanced Organic Chemistry Reactions, Mechanisms, and Structure* 2nd Edition, McGraw-Hill Book Co., 1977, 363-365.
Bindagraphics Incorporated web page, http://www.bindagraphics.com/pubs/pun20.html.
IBM Printing Systems web page, http://www./printers.ibm.com/R5PSC.NSF/web/ijpaper.
HP Specialty Printing Systems web page, http://www.hp.com/oeminkjet/learn/history/decade.htm, p. 3.
Voigt B., Stability Issues and Test Methods for Ink Jet Materials, May 2001.
Jurgens M.C., Preservation of Ink Jet Hardcopies, Aug. 27, 1999.
DuPont Tyzor Organic Titanates General Brochure, http://www.dupont.com/tyzor.
The Science of VERTEC Adhesion Promoters web page, http://www.synetix.com/inks/scienceofvertec.htm.
Synetix Ink Product Portfolio web page, http://www.synetix.com/inks/productportfolio.htm.
Synetix Inks Frequently Asked Questions web page, http://www.synetix.com/inks/faq.htm.
PFAZ-322 IONAC Polyfunctional Aziridine brochure, Sybron Chemicals Inc.
Material Safety Data Sheet for VERTEC(TM) IA10.
UCARLINK XL-29SE Crosslinker brochure by DOW Chemical Co.
Stell M., Update On Color Additive Technology, OCCO 2001 Symposium, Toronto, ON Canada, Mar. 17, 2001.
J. Kunzler et al, "Hydrogels Based on Hydrophillic Side-Chain Siloxanes", Journal of Applied Science, 55:611-619 (1995).
Lai, Yu-Chin, "Role of bulky Polysiloxanylalkyl Methacrylates in Oxygen Permeable Hydrogel Materials", Journal of Applied Science, 56:317-324 (1995).
Lai, Yu-Chin, "Novel Polyurethane-Silicone Hydrogels", Journal of Applied Science, 56:301-310 (1995).
Inkjet Technology and Product Development Strategies, Torrey Pines Research, 2000.
Physical Parameters of Inks, OCP GmbH, 2003.
History of Milestones of Inkjet Printing, Hewlett Packard.
Correspondence received from the EPO re the corresponding European Application No. 00 992 769.0—2307 (Jun. 13, 2003).
Correspondence filed with the EPO re the corresponding European Application No. 00 992 769.0—2307 (Dec. 11, 2003).
Correspondence filed with the EPO re the corresponding European Application No. 00 992 769.0—2307 (May 5, 2004).
Correspondence received from the EPO re the corresponding European Applicaiton No. 00 992 769.0—2307 (Jul. 7, 2004).
Correspondence filed with the EPO re the corresponding European Application No. 00 992 769.0—2307 (Nov. 15, 2004).
Correspondence received from the EPO re the corresponding European Applicaiton No. 00 992 769.0—2307 (02-0905).
Correspondence filed with the EPO re the corresponding European Application No. 00 992 769.0—2307 (May 3, 2005).
Correspondence filed with the EPO re the corresponding European Application No. 00 992 769.0—2307 (May 25, 2005).
Inkjet Technology, Torry Pines Research, (2000).
Declaration of John M. Evans.
PCT International Search Report for PCT/US00/4254 Published as WO 01/40846.
PCT International Preliminary Examination Report for PCT/US00/4254 Published as WO 01/40846.
New Zealand Examination Report for Application No. 518516 corresponding to the New Zealand national phase from PCT/US00/4254.
EPO Supplementary Partial European Search Report dated Dec. 6, 2002 for Application No. EP 00 99 2769 corresponding to the EP national phase from PCT/US00/4254.
EPO Supplementary Partial European Search Report dated Mar. 31, 2003 for Application No. EP 00 99 2769 corresponding to the EP national phase from PCT/US00/4254.

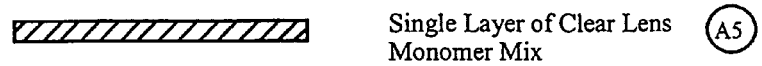
Single Layer of Clear Lens Monomer Mix (A5)
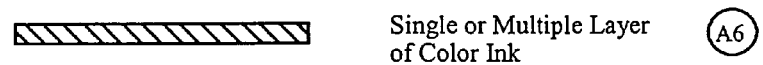
Single or Multiple Layer of Color Ink (A6)
Single Laminate
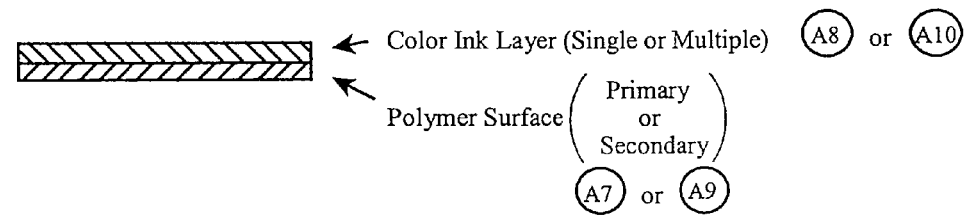
← Color Ink Layer (Single or Multiple) (A8) or (A10)
← Polymer Surface (Primary or Secondary) (A7) or (A9)
Sandwich Laminate
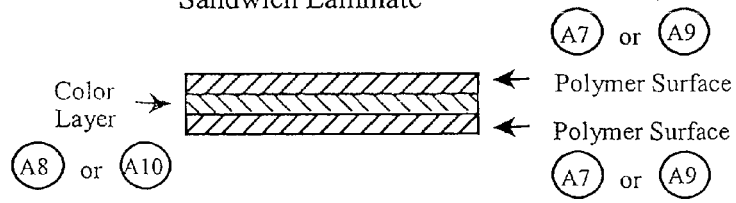
(A7) or (A9)
← Polymer Surface
← Polymer Surface
Color Layer → (A8) or (A10)
(A7) or (A9)
FIG. 2

Lathe/Fabrication

1  A contact lens (partially or fully polymerized polymer) with completed front curve and back curve.

2A  Removal of lens portion, to be printed with digital ink, by cutting, laser removal, grinding.

or

2B  The digital image is formed on top of lens surface 1.

3A  Digitally print in the area of "removed" lens portion and filled to the top.

or

3B  Digitally print in the area of "removed" lens portion but filled only partially.

4A     Fully polymerize 3A or 2B.

4B     or partially polymerize 3B.

5B  Provide a clean monomer layer on the top of the partially filled and partially polymerized digital image area to get laminated image.

6B     Fully polymerize 5B.

7.     Take 4A or 6B and carry out process steps like polishing, hydration as required to produce soft or hard lens.

NOTE: Step 2 can be carried out on front surface or back surface. When back surface is removed the process that provided sandwich 'laminated' structure is preferred, for comfort purpose.

FIG. 5

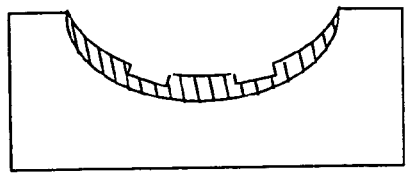
Removeal of Lens Portion to be Printed with Ink by Cutting, Laser, etc.
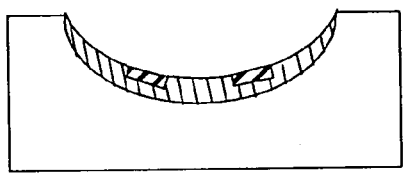
Digitally Print in the Area of the Removed Lens Portion and Fill to the Top or Partially
Partially Polymerize
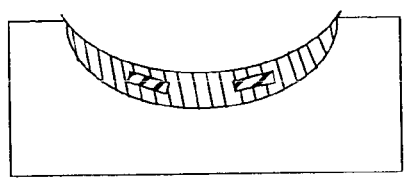
Provide a Clear Monomer Mix; or Partially or Fully Polymerized Digital Image; to be fully polymerized
FIG. 7B

TINTED LENSES AND METHODS OF MANUFACTURE

The present application is a Continuation-in-Part of U.S. patent application Ser. No. 10/128,064 to Doshi, entitled "Tinted lenses and methods of manufacture", filed on 23 Apr. 2002; which is a Continuation-in-Part of U.S. patent application Ser. No. 09/949,520, to Doshi filed Sep. 7, 2001 now U.S. Pat. No. 6,834,955; which is a divisional of U.S. patent application Ser. No. 09/969,933, to Doshi, filed Oct. 25, 2000, now U.S. Pat. No. 6,315,410; which claims benefit of priority to U.S. provisional patent application Ser. No. 60/218,710, to Doshi, filed Jul. 17, 2000; and claims benefit of priority to U.S. provisional patent application No. 60/162,695, to Doshi filed Nov. 1, 1999; and claims benefit of priority to PCT application PCT/US00/41454, published as WO 01/40846, to Doshi, filed Oct. 23, 2000; each of which is incorporated herein by reference.

TECHNICAL FIELD

The present invention generally relates generally to the fields of tinted lenses and methods of manufacture.

BACKGROUND

Tinted contact lenses have steadily gained in popularity since their introduction into the marketplace. In particular, colored contact lenses that include images that mimic the iris of an eye are particularly popular. However, colored contact lenses made by traditional technologies suffer from poor image quality and other difficulties, including leaching of pigments present on the surface of lenses, unnatural appearances, fading of colors and limited number of colors to choose from. The present invention addresses these problems, and provides additional and related benefits as well.

A variety of colored contact lenses and methods of making them have been described. For example, U.S. Pat. No. 5,018,849 to Su et al., issued May 28, 1991, describes colored contact lenses that form a laminated structure whereby a pigment is provided on the top layer of the contact lens and opaque material is sandwiched between two layers of the contact lens material, such as polymers. The opaque material blocks the natural color of the wearer's iris, and the pigment gives the wearer's eye the appearance of a desired color. These contact lenses have the undesirable quality of looking unnatural due to the limited number of colors that are available. In addition, during manufacture the opaque material and pigment are applied to the contact lens material in a plurality of steps, using one color per step.

In U.S. Pat. No. 5,034,166 to Rawlings et al., issued Jul. 23, 1991, non-laminated colored contact lenses are described. The pigment in this type of colored contact lens is casted into the structure of the lens material. The pigment is dispensed one color at a time during lens manufacturing which limits the number of colors that can be used to make colored contact lenses. The resulting colored contact lens is undesirable because the wearer's eyes appear unnatural. Furthermore, the pattern and pigments used in this method is limited which results in an unnatural looking contact lens. Also, existing methods provide customers with limited choices of colors and patters and the lenses produced by these methods can provide pigments on the a surface of a lens, which can make the lenses uncomfortable for the wearer and prone to fading of the pigment.

The colored contact lenses described in U.S. Pat. No. 5,106,182 to Briggs et al., issued Apr. 21, 1992, described a laminated colored contact lens. In this contact lens, pigmentation is provided on one portion of a contact lens using a pad transfer method using a rubber stamp having raised radial segments. The pad transfer method applies pigment to the portion of the contact lens to form a crude pattern. The pad is then pressed to the portion of the contact lens to smear the pigment and the pad disengaged from the portion of a contact lens. The lens is rotated, and the process is repeated as desired. The resulting colored contact lens is undesirable because of the limited number of colors that can be used and the resulting pigmentation pattern has an unpredictable and unnatural appearance.

U.S. Pat. No. 5,160,463 to Evans et al., issued Nov. 3, 1992, describes a colored contact lens made by applying a first pigment in a first pattern to a molding device. Additional pigments in additional patterns can be applied to the molding device in independent applications. The resulting image on the molding device can be transferred to a contact lens. The use of multiple printing steps is undesirable due to the increased number of applications that are needed to create an image. In addition, this method results in an image of unnatural appearance due to the limited number of colors that can be used to create the image.

Colored contact lenses reported in U.S. Pat. No. 5,414,477 to Jahnke, issued May 9, 1995, relate to images that are made using pad transfer methods to form a plurality of dots of unnatural appearance. A plurality of printing processed can be used to create an image comprising more than one color that reportedly results in an image with a more natural appearance. These dots are of relatively definite in shape and relatively large in size and thus have an unnatural appearance. The colored contact lenses made using these methods also have a limited number of colors and patterns that can be used, which results in an unnatural looking product.

The present invention addresses the problems associated with described tinted contact lenses by providing an image on or within a contact lens that is of superior quality. The increased quality of the image results in a tinted contact lens that has a natural appearance.

BRIEF DESCRIPTION OF THE FIGURES

FIG. 2 depicts diagram of laminate digitally encoded images encased within a structure. A6 denotes color ink coat/layer of black, magenta, yellow and cyan; A7 denotes partially polymerized monomer mix for clear lens; A8 denotes partially polymerized A6; A9 denotes fully polymerized clear lens.

FIG. 5 depicts a method of a lathe/fabrication process that can be used to produce lens of the present invention.

FIG. 7A and FIG. 7B depict spin cast methods that can be used to produce lens of the present invention.

SUMMARY

Figure 1:
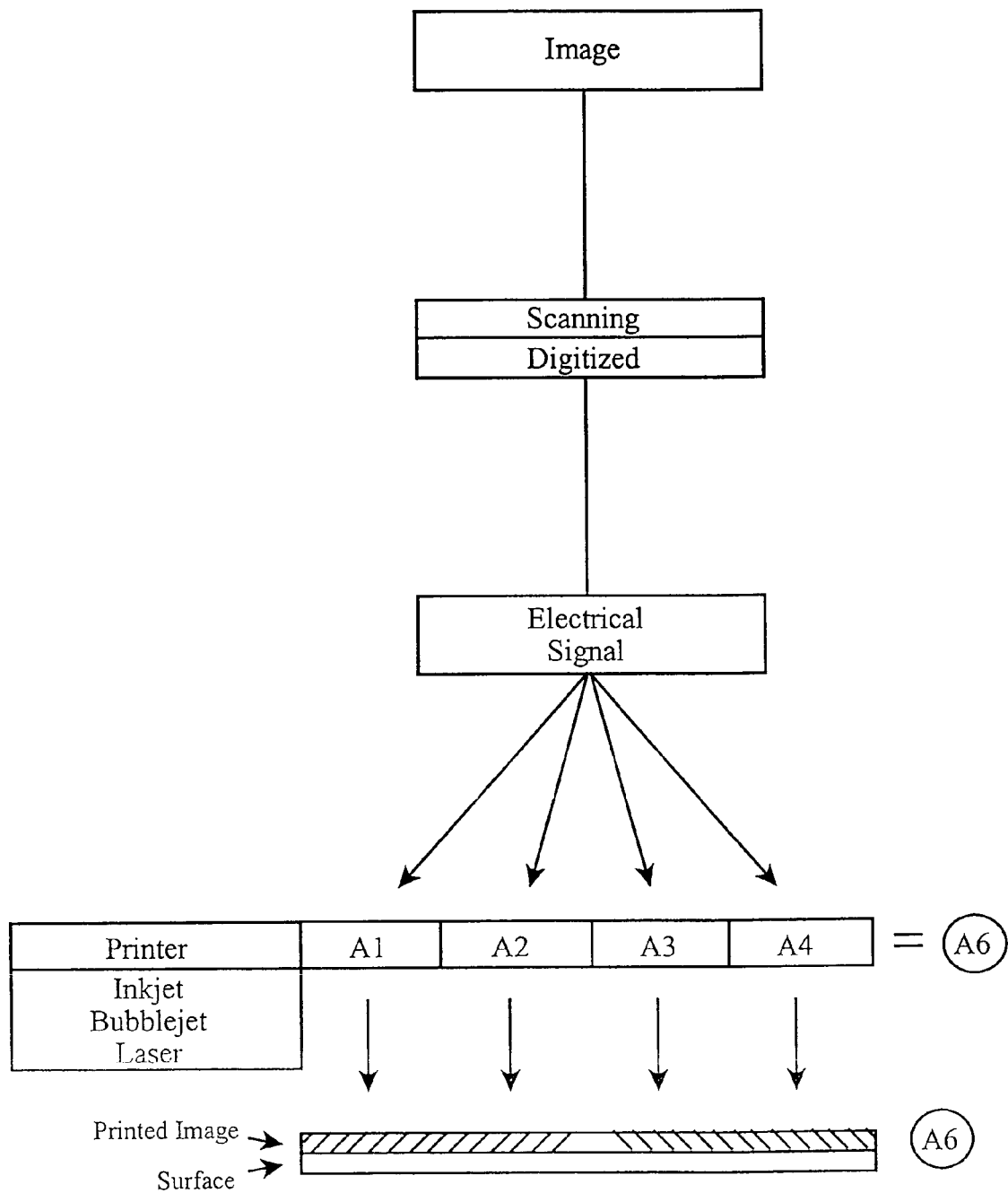
FIG. 1 depicts a schematic diagram of a method of printing digitally encoded images. A1 denotes black ink; A2 denotes magenta ink; A3 denotes yellow ink; A4 denotes cyan ink; A6 denotes color ink coat/layer of A1+A2+A3+A4. The digitally encoded image is printed on a surface such as a lens.

The present invention recognizes that lenses, such as contact lenses, can be tinted using ink that includes polymers or polymerizable monomers, preferably the same monomers used to make the lens. The ink can be used to make images on or within the lens. Images made using these inks are preferably in a modified or unmodified digital format and can be used in a variety of printing methods, including ink-jet printing. Modified digital formats can be made by altering the digital image before or after printing such as by vibration applied to the printed surface.

A first aspect of the present invention is an article of manufacture, including: a polymer and a digitally encoded image made with ink, wherein the polymer forms a lens.

A second aspect of the present invention is a method of making an article of manufacture that includes a digitally encoded image and a polymer, including the steps of: printing a digitally encoded image on a composition that includes a polymer, wherein the polymer forms a lens.

A third aspect of the present invention is a method of making an article of manufacture that includes a digitally encoded image and a polymer, including the steps of: printing a digitally encoded image on a composition comprising a polymer, and forming a lens from said polymer.

A fourth aspect of the present invention is a method of making an article of manufacture that includes a digitally encoded image and a polymer, including the steps of: printing a digitally encoded image on a composition comprising at least one monomer, polymerizing said at least one monomer to form at least one polymer, and forming a lens from said at least one polymer.

A fifth aspect of the present invention is a method of making an article of manufacture that includes a digitally encoded image and a polymer, including the steps of: printing an image on at least one first surface, transferring said image to at least one second surface comprising a monomer or a polymer, and forming a lens from said second surface.

A sixth aspect of the present invention is an article of manufacture, including: at least one information storage medium, and at least one digital image, wherein the at least one digital image comprises at least a portion of an image or other image.

A seventh aspect of the present invention is a system, including: an article of manufacture of the present invention and a printing device.

An eighth aspect of the present invention is a composition of matter, including an ink, dye, vat dye, particle, pigment, reactive dye or diazo dye. The composition of matter also includes a binder, monomer, polymer, homopolymer, heteropolymer, copolymer, and initiator, UV initiator, thermal initiator, solvent, dispersant, anti-bacterial agent, anti-microbial agent, anti-fungal agent, disinfectant, thickener or humectant.

A ninth aspect of the present invention is a method of doing business, including the steps of: obtaining a digital image from a person, database or image and printing said digital image on a lens.

A tenth aspect of the present invention is an article of manufacture, including: a polymer substrate, and a digitally encoded image made with ink, wherein the polymer substrate forms a lens, wherein the polymer substrate is subjected to a pre-treatment process that precedes the application of the digitally encoded image to the polymer substrate; and wherein the pre-treatment process results in an enhanced image quality of the digitally encoded image.

An eleventh aspect of the present invention is a method of making an article of manufacture including a polymer substrate and a digitally encoded image made with ink, wherein the polymer substrate forms a lens, including: subjecting the polymer substrate to a pre-treatment process; and applying the digitally encoded image to the polymer substrate, wherein the pre-treatment process results in an enhanced image quality of the digitally encoded image.

A twelfth aspect of the present invention is an article of manufacture, including: a polymer substrate and a digitally encoded image made with ink comprising reactive components, wherein the polymer substrate forms a lens, wherein the digitally encoded image is applied to the polymer substrate by ink jet printing; and wherein the reactive component is stored in an ink jet printer cartridge.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and the laboratory procedures well known and commonly employed in the art. Conventional methods are used for these procedures, such as those provided in the art and various general references such as U.S. Pat. Nos. 5,160,463; 5,271,874; 5,018,849; 5,034,166; 5,414,477; Day et al., Current Optometric Information and Terminology, Third Edition, American Optometric Association (1980); Howley's Condensed Chemical Dictionary (1981); and Federation of Societies for Coatings Technology, Glossary of Color Terms, Federation of Societies for Coatings Technology (1981). Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings:

"Directly" refers to direct causation of a process that does not require intermediate steps.

"Indirectly" refers to indirect causation that requires intermediate steps.

"Digitally Encoded Image" or "Digital Image" refers to an image that has been created or stored in a digital format. A digitally encoded image can be made using methods known in the art, such as artistic renditions or scanning or otherwise translating an image, including a naturally occurring image such as the iris of an eye, such as a human eye. A digitally encoded image can be stored on appropriate storage medium, such as magnetic medium or polymers such as cyclo-olefin copolymers. A plurality of digitally encoded images can be stored together or separately to form a database of digitally encoded images that are accessible individually or in combination. Such digitally encoded images can be altered using established methods, such as artistic renditions or image modulating software. A plurality of images can also be merged to form a new digitally encoded image. A digital image is where a given image is presented as made from multiple dots of different colors. For example, an image produced by using a scanner or digital camera. Modified digital images may be defined as a digital image that is changed with a secondary process like polymerization or mixing of colored dots.

"Ink" as used herein refers to any colored compound, chemical or structure, such as a dye, vat dye, particle, pigment, reactive dye, diazo dye and the like. Ink also includes structures that while not colored give the appearance of color by, for example, diffraction or deflection (for example) of light by a particle. An ink can be water based, monomer based, or solvent based.

"Dye" in the context of inks refers to a variety of dyes as they are known in the art, such as diazo dyes, such as Diazo 15 (4-diazo-(4'-toluyl)-mercapto-2,5-diethoxy benzyene zinc chloride) (U.S. Pat. No. 5,662,706).

"Vat Dye" in the context of inks refers to a variety of vat dyes as they are known in the art, such as Vat Blue 6 (7,16-dichloro-6,15-dihydro-9,14,18-anthrazinetertrone) and Vat Green 1 (16,17-dimethyoxydinaphtho (1,2,3, ed: 31, 2'-1'-1-m)perylene-5) (U.S. Pat. No. 5,302,978).

"Particle" in the context of inks refers to a variety of particles as they are known in the art, such as India Ink.

"Pigment" in the context of inks refers to a variety of pigments as they are known in the art, such as titanium dioxide, red iron oxide, yellow iron oxide U.S. Pat. No. 5,160,463, Pigment Blue 15 (phthalocyanine blue (CI #74160)), Pigment Green 7 (phthalocyanine green (CI #74260)), Pigment Blue 36 (cobalt blue (CI #77343)) or chromium sesquioxide (U.S. Pat. No. 5,272,010).

"Reactive Dye" in the context of inks refers to a variety of reactive dyes as they are known in the art, such as Reactive Blue No. 4 (2-anthra-cene-sulfonic acid, 1-amino-4,3((4,6-dichloro-s-triazine-2-yl)amino)-4-sulfoaniline)-9-10-dihydro-9-10-dixo, disodium salt; CAS Reg. 4499-01-8); Reactive Yellow No. 86 (1,3-ben-zendisulfonic acid 4-((5 amino carbonyl-1-ethyl-1,6-dihydro-2-hydroxy-4-methyl-6-oxo-3-pridinyl)azo)-6-(4,6-dichloro-1,2,5-triazine-zyl) amino)-disodium salt) (U.S. Pat. No. 5,106,182).

"Solvent" in the context of inks refers to an aqueous, organic or inorganic solvent, such as water, isopropanol, tetrahydrofuran or acetone (U.S. Pat. No. 5,271,874).

"Surfactant" refers to a surfactant as that term is known in the art, such as, for example, acetylene glycol or polyoxyethylene alkyl ether (U.S. Pat. No. 5,746,818 and U.S. Pat. No. 5,658,376, respectively).

"Dispersant" in the context of inks refers to dispersants as they are known in the art, such as, for example, the Tergitol series from Union Carbide, polyoxylated alkyl ethers, alkyl diamino quaternary salts or "Pecegal "O"" from GAF (U.S. Pat. No. 5,560,766). Dispersants are preferably used at between about 0.1% and about 10%, more preferably between about 0.5% and about 5%.

"Lens" as used herein refers to a composition of matter that can transmit light. A lens preferably can act as an optical lens, such as a contact lens. In certain aspects of the present invention, a lens need not act as an optical lens, such as a contact lens that is used for vanity purposes as opposed to purposes relating to the correction, improvement or alteration of a user's eyesight.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens or a hybrid lens. A contact lens can be in a dry state or a wet state.

"Soft Lens" refers to a variety of soft lenses as they are known in the art that are characterized as having, for example, at least one of the following characteristics: oxygen permeable, hydrophilic or pliable.

"Hard Lens" refers to a variety of hard lenses as they are known in the art that are characterized as having, for example, at least one of the following characteristics: hydrophobic, gas permeable or rigid.

"Hybrid Lens" refers to a variety of hybrid lenses as they are known in the art, such as, for example, a lens having a soft skirt and a hard center.

"Dry State" refers to a soft lens in a state prior to hydration or the state of a hard lens under storage or use conditions.

"Wet State" refers to a soft lens in a hydrated state.

"Single color" refers to a discrete color made of one or more ink.

"Multi-colored image" refers to an image that includes more than one single color. A multi-colored image can be made using a plurality of single colors. For example, a multi-colored image can be made using two or more single colors, three or more single colors, or four or more single colors, preferably primary colors. The colors can be mixed before or during the formation of a multi-colored image, such as during a printing process, such as printing processes using dispensation, such as ink jet printing.

"Transparent" refers to a substantial portion of visible light transmitted through a structure, such as greater than or equal to 90% of incident light.

"Opaque" refers to a substantial portion of visible light reflected or absorbed by a structure, such as greater than or equal to 90% of incident light.

"Partially opaque" refers to a combination of transparent and opaque.

"Hydrogel" refers to a polymer that swells in an aqueous solution due to the absorbance of water. A hydrogel includes water or an aqueous solution as part of its structure.

"Polymer" refers to a linkage of monomers. Preferably, a polymer is a polymer appropriate for use in lenses, such as contact lenses. A polymer can be, for example, a homopolymer, a heteropolymer, a copolymer, a hydrophobic polymer, a hydrophilic polymer or any combination thereof.

"Hydrophobic Polymer" refers to a polymer that does not absorb an appreciable amount of water or an aqueous solution (see, U.S. Pat. No. 5,034,166). "Hydrophilic Polymer" refers to a polymer that absorbs an appreciable amount of water or an aqueous solution (see, U.S. Pat. No. 5,034,166). Lens forming materials that are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; 4,062,624; and 5,034,166.

"Hydrophilic Monomer" refers to monomers used to make soft lenses, such as hydroxyethylmethacrylate, methacrylic acid, or N-vinylpyrrolidone (U.S. Pat. No. 5,271,874; U.S. Pat. No. 5,272,010). "Hydrophilic Monomer" refers to monomers used to make hard lenses, such as methylmethacrylate, ethoxyethylmethacrylate, styrene, or silicone (U.S. Pat. No. 5,271,874; U.S. Pat. No. 5,272,010).

"Homopolymer" refers to a polymer comprising a single type of monomer such as hydroxyethylmethacrylate.

"Heteropolymer" refers to a polymer comprising more than one type of monomer such as hydroxyethylmethacrylate and methacrylic acid.

"Copolymer" refers to the use of two different polymers to make a polymer chain.

"Acrylic Polymer" or "Acrylics" refers to a variety of polymer of that genus and species as they are known in the art, such as, for example, hydroxyethylmethacrylate.

"Silicone Polymer" or "Silicones" refers to a variety of polymers of that genus and species as they are known in the art, such as, for example Tris (such as Tris (pentamethyldisiloxyanyl)-3-methacrylate-propylsilane or 3-methacryloxypropy tris(trimethylsiloxy)silane).

"Polycarbonate Polymer" or "Polycarbonate" refers to a variety of polymers of that genus and species as they are known in the art, such as, for example Lexan.

"Initiator" in the context of polymerization refers to an initiator as that term is known in the art, such as, for example, a chemical that starts a polymerization reaction.

"UV Initiator" in the context of polymerization refers to a UV initiator as that term is known in the art, such as, for example, a chemical that becomes reactive or active with the adsorption of energy, such as UV energy, such as, for example benzoin methyl ether.

"Binder" or "bonding agent" refers to compounds used perform the function of increasing the interaction between moieties, such as between a dye and a polymer or monomer or between monomers and polymers such as those terms are known in the art. Examples of binders or binding agents are hexamethylene diisocyanate or other isocyanate compounds.

"Thickener" refers to a compound that is used to increase the viscosity of a liquid or partially liquid mixture or solution such as that term is known in the art. An example of a thickener is polyvinyl alcohols.

"Anti-kogating agent" or "non-kogating agent" refers to compounds that facilitate printing processes that utilize nozzles, such as such terms are known in the art.

"Dispersant" refers to a surface-active agent added to a suspending medium to promote the distribution and separation of fine or extremely fine solid particles.

"Thermal Initiator" in the context of polymerization refers to a thermal initiator as that term is known in the art, such as, for example, a chemical that becomes active or reactive with the absorption of heat energy, such as, for example, Vazo-64 or azobisisobutyronitrile.

"Anti-Bacterial Agent" refers to a compound or composition that can act as a bactericidal or bacteriostatic or can reduce the growth rate of a bacteria such as tetrabutylammonium chloride.

"Anti-Fungal Agent" refers to a compound or composition that can act as a fungicidal or fungistatic or can reduce the growth rate of a fungi such as benzalkonium chloride salicylic acid.

"Disinfectant" refers to a compound or composition that can reduce the type, number or diversity of microorganisms.

"Humectant" refers to compounds that reduce evaporation, such as ethylene glycol.

"Printing" refers to the application of at least one ink to a surface or structure to form an image. Printing can use any appropriate device or method known in the art of later developed for a particular purpose.

"Printing Device" refers to any appropriate device for printing an image on a surface or structure known in the art or later developed for a particular purpose. Preferably, a printing device includes the dispensation of microdroplets of liquid that includes an ink that form an image. The size or volume of the microdroplets can vary, but generally the smaller the microdroplet, the higher the quality of the image produced. Preferred microdroplets are between about 1 nanoliter and about 100 microliters, preferably between about 10 nanoliters and about 10 microliters or between about 100 nanoliters and about 1 microliter.

"Ink Jet Printing" refers to printing using a printing device that comprises at least one ink jet. Ink jet printing can use a single color or can use a plurality of colors. For example, ink jet printing can use a printing device that contains a plurality of different colored inks that can be provided separately. In this aspect of the invention, the inks are preferably at least two, at least three or at least four primary colors and black that can be mixed to form a very large number of different colors. Such printing devices are commercially available such as through, for example, Hewlett Packard Corporation (such as DeskJet 560C printer cartridges) and Encad Corporation. Ink can be applied to a surface more than once to obtain the desired intensity, hue or other color characteristic.

"Piezo Printing" refers to printing using a printing device that comprises at least one piezo printing structure. Such piezo printing structures are known in the art, such as, for example, those available through Packard Instruments and Hewlett Packard Corporation or Canon Inc.

"Thermal Printing" refers to printing using a printing device that comprises at least one thermal printing structure. Such thermal printing structures are known in the art, such as, for example, those available through Hewlett Packard Corporation.

"Laser Printing" refers to printing using a printing device that uses at least one laser printing structure. Such printing structures are known in the art, such as, for example, those available through Cannon or Hewlett Packard Corporation.

"Pad Transfer Printing" refers to printing using a pad transfer printing device. Such pad transfer printing devices are known in the art, particularly for printing in the field of contact lenses. Briefly, an image is placed or printed on a pad transfer device and the image on the pad transfer device is transferred to another surface, such as a polymer or lens (U.S. Pat. No. 3,536,386 to Spivack, issued Oct. 27, 1970; U.S. Pat. No. 4,582,402 to Knapp, issued Apr. 15, 1986; U.S. Pat. No. 4,704,017 to Knapp, issued Nov. 3, 1987; U.S. Pat. No. 5,034,166 to Rawlings et al., Jul. 23, 1991; U.S. Pat. No. 5,106,182 to Briggs et al., issued Apr. 21, 1992; U.S. Pat. No. 5,352,245 to Su et al., issued Oct. 4, 1994; U.S. Pat. No. 5,452,658 to Shell, issued Sep. 26, 1995 and U.S. Pat. No. 5,637,265 to Misciagno et al., issued Jun. 10, 1997).

"Impregnation" refers to an ink being contacted with a surface, such as a polymer, and the ink diffuses into the polymer where it is reacted to precipitate to a size larger than the average pore size of the polymer (EP 0357062 to Pfortner, published Mar. 7, 1990).

"Photolithography" refers to a process as it is known in the art, such as wherein at least one photosensitive ink is used to provide a desired image using a mask that blocks light.

"Chemical Bond" refers to a covalent bond or non-covalent bond. Under certain circumstances, inks can form chemical bonds with polymers or monomers if the reactive groups on each are appropriate (EP 0393532 to Quinn, published Oct. 24, 1990 (referring to U.S. Pat. No. 4,668,240 to Loshaek and U.S. Pat. No. 4,857,072); U.S. Pat. No. 5,272,010 to Quinn, issued Dec. 21, 1993;

"Polymer-Polymer Bond" refers to two polymers forming covalent or non-covalent bonds, such as by cross linking polymers formed between two polymers, such as hydroxy-ethyl methylacrylate and ehtyleneglycoldimethacrylate.

"Pattern" refers to a predetermined image (U.S. Pat. No. 5,160,463 to Evans et al., issued Nov. 3, 1992; U.S. Pat. No. 5,414,477 to Jahnke, issued May 9, 1995;).

"At least two separate colors or a mixture thereof," "at least three separate colors or a mixture thereof," or "at least four separate colors or a mixture thereof" refers to the use of inks of different colors being provided in separate containers or separate portions within a container. The colors are preferably primary colors or fundamental colors and black, more preferably black, cyanine, magenta and yellow. The inks can be mixed in different proportions (including zero) to obtain a very large spectrum of colors. The mixing can occur within a printing structure, for example, before the ink is dispensed in a printing process. Alternatively, the mixing can occur outside of a printing structure, for example, after the ink is dispensed in a printing process. Furthermore, a combination of the foregoing can also occur.

"Dry State" refers to a polymer that is not fully hydrated.

"Wet State" refers to a polymer that is fully hydrated.

"Forming a Lens" or "Fabricating a Lens" refers to any method or structure known in the art or later developed used to form a lens. Such forming can take place, for example, using cast-molding, spin-casting, cutting, grinding, laser cutting, stamping, trimming, engraving, etching or the like (U.S. Pat. No. 4,558,931 to Fuhrman, issued Dec. 17, 1985).

"Cast-Molding" in the context of forming a lens refers to the formation of at least a portion lens using a mold (U.S. Pat. No. 3,536,386 to Spivak, issued Oct. 27, 1970; U.S. Pat. No. 3,712,718 to LeGrand et al., issued Jan. 23, 1973; U.S. Pat. No. 4,582,402 to Knapp, issued Apr. 15, 1986; U.S. Pat. No. 4,704,017 to Knapp, issued Nov. 3, 1987; U.S. Pat. No. 5,106,182 to Briggs et al., issued Apr. 21, 1992; U.S. Pat. No. 5,160,463 to Evans et al., issued Nov. 3, 1992; U.S. Pat. No. 5,271,874 to Osipo et al., issued Dec. 21, 1993 and EP 0357062 to Pfortner, published Mar. 7, 1990)

"Spin-Casting" in the context of forming a lens refers to the formation of a lens using centrifugal force (U.S. Pat. No. 3,557,261 to Wichterle, issued Jan. 19, 1971 and U.S. Pat. No. 5,034,166 to Rawlings et al., issued Jul. 23, 1991).

"Information Storage Medium" refers to any medium of expression that can store information in any appropriate format either permanently or transiently. Preferred information storage medium includes paper, electronic medium, magnetic medium or polymers, such as cyclo-olefin copolymers.

"Electronic Medium" refers to information storage medium that can store information in electronic form. For example, electronic medium includes magnetic storage medium, such as diskettes.

"Machine Readable Format" refers to information stored on or within an information storage medium in a form, language or arrangement such that a machine, such as a central processing unit (CPU) can access and use the information.

"Database" refers to a collection of information, such as digital images. The information is preferably provided on or within an information storage medium and can be separate from or integral with a central processing unit.

Other technical terms used herein have their ordinary meaning in the art that they are used, as exemplified by a variety of technical dictionaries.

Introduction

The present invention recognizes that lenses, such as contact lenses, can be tinted using ink that includes polymers or polymerizable monomers, preferably the same monomers used to make the lens. The ink can be used to make images on or within the lens. Images made using these inks are preferably digital and can be used in a variety of printing methods, including ink-jet printing.

As a non-limiting introduction to the breath of the present invention, the present invention includes several general and useful aspects, including:

1) an article of manufacture, including: a polymer and a digitally encoded image made with ink, wherein the polymer forms a lens;
2) a method of making an article of manufacture that includes a digitally encoded image and a polymer, including the steps of: printing a digitally encoded image on a composition that includes a polymer, wherein the polymer forms a lens, wherein such lenses can optionally include indentation structures to facilitate localizing inks used to make the digitally encoded image;
3) a method of making an article of manufacture that includes a digitally encoded image and a polymer, including the steps of: printing a digitally encoded image on a composition comprising a polymer, and forming a lens from said polymer;
4) a method of making an article of manufacture that includes a digitally encoded image and a polymer, including the steps of: printing a digitally encoded image on a composition comprising at least one monomer, polymerizing said at least one monomer to form at least one polymer, and forming a lens from said at least one polymer;

5) a method of making an article of manufacture that includes a digitally encoded image and a polymer, including the steps of: printing an image on at least one first surface, transferring said image to at least one second surface comprising a monomer or a polymer, and forming a lens from said second surface;

6) an article of manufacture, including: at least one information storage medium, and at least one digital image, wherein the at least one digital image comprises at least a portion of an image or other image;

7) a system, including: an article of manufacture of the present invention and a printing device;

8) a composition of matter, including an ink, dye, vat dye, particle, pigment, reactive dye, or diazo dye. The composition of matter also includes a binder, bonding agent, monomer, polymer, homopolymer, heteropolymer, copolymer, and initiator, UV initiator, thermal initiator, solvent, dispersant, surfactant, anti-bacterial agent, anti-microbial agent, anti-fungal agent, disinfectant, thickener or humectant;

9) a method of doing business, including the steps of: obtaining a digital image from a person, database or image and printing said digital image on a lens.

10) an article of manufacture, including: a polymer substrate, and a digitally encoded image made with ink, wherein the polymer substrate forms a lens, wherein the polymer substrate is subjected to a pre-treatment process that precedes the application of the digitally encoded image to the polymer substrate; and wherein the pre-treatment process results in an enhanced image quality of the digitally encoded image;

11) a method of making an article of manufacture including a polymer substrate and a digitally encoded image made with ink, wherein the polymer substrate forms a lens, including: subjecting the polymer substrate to a pre-treatment process; and applying the digitally encoded image to the polymer substrate, wherein the pre-treatment process results in an enhanced image quality of the digitally encoded image; and 12) an article of manufacture, including: a polymer substrate and a digitally encoded image made with ink comprising reactive components, wherein the polymer substrate forms a lens, wherein the digitally encoded image is applied to the polymer substrate by ink jet printing; and wherein the reactive component is stored in an ink jet printer cartridge.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

I Lens with Digitally Encoded Image

The present invention includes an article of manufacture, including: a polymer and a digitally encoded image comprising at least one ink, wherein the polymer forms a lens.

Digitally Encoded Image

The digitally encoded image can include a single color image or a multi-colored image. The single color image preferably comprises one ink, but that need not be the case because many inks have similar colors and different colored inks can be combined to produce an ink with a color different from the individual inks used to make the combination. The multi-colored image is preferably made using a plurality of inks either alone or in combination.

The digitally encoded image can be transparent, opaque, or partially opaque. For transparent digitally encoded images, the ink within the image does not substantially interfere with the transmission of light through the polymer. For opaque digitally encoded images, the ink within the digitally encoded image substantially interferes with the transmission of light through the polymer. When the lens is a contact lens, opaque digitally encoded images can substantially block the natural color of the contact lens wearer's iris. Ink used to create an opaque digitally encoded image can include materials such as particles, for example as mica or ground oyster shells or particulates, in a type and amount sufficient to make the digitally encoded image opaque. Another alternative is a pigment, vat dye, diazo dye or reactive dye. For partially opaque digitally encoded images, the ink within the digitally encoded image can include materials such as particles and particulates, such as mica, ground oyster shells or particulates, in a type and amount sufficient to partially block the transmission of light through the digitally encoded image. Partially blocking the transmission of light, in this instance, refers to the ability of the digitally encoded image to allow a portion of incident light to transmit through a digitally encoded image.

Ink

Inks used in the present invention can include any single colored compound or composition or any combination of colored compounds or compositions. Inks can be provided in water, monomer or solvents, preferably at a concentration between about 0% and greater than about 99.5% or between about 0.01% and about 99.5%, preferably between about 0.1% and about 90% or between about 1% and about 80%, and more preferably between about 10% and about 60% or between about 20% and about 40%. Inks can also include particles or particulates, preferably at a concentration of between about 0% and about 5% or between about 0.01% and about 5%, preferably between about 0.1% and about 4% or between about 1% and about 3% to render a digitally encoded image opaque or partially opaque. Examples of inks include dyes, vat dyes, particles, pigments, reactive dyes or diazo dyes. As discussed herein, the characteristics and compositions including inks and other components include inks that are part of an article of manufacture of the present invention, such as a lens, such as a contact lens, and also include compositions that include at least one ink that can be used to make an article of manufacture of the present invention.

Inks can include water, monomer, polymer or an appropriate solvent in order for the ink to be suitable in the making of a digitally encoded image. An appropriate solvent is a solvent that is compatible with the creation of a digitally encoded image on or within a surface, such as on or within a polymer. For example, solvents appropriate for polymers used to make lenses, such as contact lenses, include, but are not limited to isopropanol, water, acetone or methanol, either alone or in combination and can include a monomer. Appropriate concentrations of solvents are between about 0% and greater than about 99.5% or between about 0.1% and about 99.5%, preferably between about 1% and about 90% or between about 10% and about 80%, and more preferably between about 20% and about 70% or between about 30% and about 60%. Different polymers, monomer and inks have different tolerances and reactivities to different solvents. Thus, appropriate matches between solvent and polymer, monomer and ink should be considered. For hydrogel polymers, adjustment in swelling ratios may be achieved with a variety of concentrations of solvents.

An ink can also include a monomer, polymer, homopolymer, heteropolymer, or copolymer. In a preferred aspect of this embodiment of the present invention, an ink includes a monomer that can be polymerized to form a polymer using polymerization methods appropriate for a given monomer, mixtures thereof, or polymers, or mixtures thereof. Monomers can also be used to decrease the viscosity of the ink. Alternatively, the ink can include a polymer such that the viscosity of the ink is increased. Alternatively, the ink can include polymer and monomer. Appropriate concentrations of monomers are between about 5% and greater than 99%, preferably between about 25% and about 75%, and more preferably between about 35% and about 60%. Appropriate concentrations of polymers are between about 0% and about 50%, preferably between about 5% and about 25%, and more preferably between about 10% and about 20%. When monomers and polymers are mixed, the total concentration of monomer and polymer are lo between about 10% and greater than 99%, preferably between about 25% and about 75% and more preferably between about 35% and about 65%.

The viscosity of a solution including an ink can be as high as between about 500 centipoise and about 5,000 centipoise and is preferably between about 1 to about 200 centipoise or between about 10 and about 80 centipoise, preferably between about 20 and about 70 centipoise or between about 30 and about 60 centipoise or between about 1 and about 10 centipoise. Solutions having low viscosity tend to be "runny" when dispensed, and can allow different colors to merge and blend, resulting in an image with a more natural appearance. Such blending can be enhanced using a variety of methods, including sonication or vibration at appropriate duration and frequency to promote appropriate blending. Solutions having too low a viscosity can result in images that are too "runny" and thus have potentially undesirable characteristics, such as pooling of ink in a digitally encoded image or spreading of ink to an unintended location. Solutions having too high a viscosity may not be easily dispensed using a variety of printing structures, such as ink jets and thus may not be appropriate for the present invention. Furthermore, solutions having high viscosity can tend to "bead" on a surface and not blend with the surrounding environment, including surrounding droplets or beads of ink. Under these circumstances, the ink may form unnatural appearing images (see, for example, U.S. Pat. No. 5,160,463 and U.S. Pat. No. 5,414,477). Agents such as thickeners or diluents (including appropriate solvents) can be used to adjust the viscosity of the ink.

An ink that includes at least one monomer can also include a polymerization initiator, so that once an ink that includes at least one type of monomer is dispensed, the polymerization of the monomer in the ink is initiated. The number, type and amount of initiator is a matter of choice depending on the type of monomer or monomers in the ink. Appropriate initiators include, but are not limited to, UV initiators that initiate polymerization by UV irradiation, thermal initiators that initiate polymerization by thermal energy.

An ink can also include a dispersant to allow uniform composition of ink in a container. Dispersants are preferably provided at an appropriate concentration, such as between about 1% and about 10%.

An ink can also include at least one anti-microbial agent or antiseptic agent to kill or reduce the number or multiplication microbial agents, reduce the number of microbial agents, or keep microbial agents from multiplying. Preferred anti-microbial agents include anti-bacterial agents, anti-fungal agents and disinfectants. Preferably, such anti-microbial agents, anti-bacterial agents, anti-fungal agents and disinfectants are provided at an appropriate concentration such as between about 0% and about 1%.

An ink can also include at least one humectant such as 1,3-diozane-5,5-dimethanol (U.S. Pat. No. 5,389,132) at an appropriate concentration. Preferably, the range of concentration of a humectant is between about 0% and about 2%.

An ink can also include at least one antioxidant agent or a low corrosion agent, such as alkylated hydroquinone, at an appropriate concentration, such as between about 0.1% and about 1% (U.S. Pat. No. 4,793,264). An ink can also include a non-kogating agent or non-kogating agent, such as 2-methyl-1,3-propanediol at an appropriate concentration, such as between about 0% and about 1%. An ink can also include an evaporation retarding agent, such as, for example, diethylene glycerol or ethylene glycol at between about 0% and about 2% (U.S. Pat. No. 5,389,132).

A preferred ink can have the following composition:

| Component | Percentage |
| --- | --- |
| Monomer | 0% to 99% |
| Pigment and/or colorant and/or reactive dye | 0.1% to 15% |
| Initiator | 0.01% to 2% |
| Solvent | 0% to 80% |
| Binder or Bonding Agent | 0% to 10% |
| Thickener | 0% to 1% |
| Anti-kogating Agent | 0% to 1% |
| Humectant | 0% to 1% |
| Surfactant | 0% to 10% |
| Cross-linker | 0% to 1% |
| Dispersant | 0% to 10% |

Printing

The digitally-encoded image is preferably applied to a structure, such as a lens, using a printing method or printing structure. The digitally encoded image can be stored digitally in at least one information storage medium, such as an electronic medium. The stored digitally encoded image can be printed using printing structures and printing methods that can convert the stored digitally encoded image into a printed image using an appropriate interface. For example, a central processing unit can include a stored digitally encoded image. Software can interface the stored digitally encoded image with a printing structure such that the printing structure prints the digitally encoded image. Such interfaces are known in the art, such as those used in digital printing processes that use ink-jets (Hewlett Packard; Encad) (see, for example, FIG. 1).

Preferred printing methods and printing structures include, but are not limited to, ink-jet printing, piezo printing, thermal printing, bubble jet printing, pad-transfer printing, impregnation, photolithography and laser printing. Ink-jet printing can use appropriate ink-jet printing structures and ink-jet printing methods as they are known in the art or later developed. For example, appropriate ink-jet printing structures include, but are not limited to HP Desk Jet 612 or Canon color bubble jet BJC1000 color printer hardware.

Furthermore, appropriate ink-jet printing methods, include, but are not limited to thermal ink jet printing, piezo printing or bubble jet printing.

Ink-jet printing can include piezo printing structures and piezo printing methods as they are known in the art or later developed. For example, appropriate piezo printing structures include, but are not limited to Canon color bubble jet printer BJC1000.

Ink-jet printing can include thermal printing structures and thermal printing methods as they are known in the art or later developed. For example, appropriate thermal printing structures include, but are not limited to HP Deskjet 612 color printer.

Ink-jet printing can include bubble jet printing structures and bubble jet printing methods as they are known in the art or later developed. For example, appropriate thermal bubble jet structures include, but are not limited to Canon BJC1000 color printer.

Pad-transfer printing can include pad-transfer printing structures and pad-transfer printing methods as they are known in the art or later developed. For example, appropriate pad-transfer printing structures include, but are not limited to Tampo-type printing structures (Tampo vario 90/130), rubber stamps, thimbles, doctor's blade, direct printing or transfer printing as they are known in the art.

Impregnation printing can include impregnation printing structures and impregnation printing methods as they are known in the art or later developed. For example, appropriate impregnation printing structures include, but are not limited to applying solubilized vat dyes, masking device, developer and the like.

Photolithography printing can include photolithographic printing structures and photolithography printing methods as they are known in the art or later developed. For example, appropriate photolithography printing structures include, but are not limited to applying diazo dyes, masking devices, developers and the like.

Laser printing can include laser printing structures and laser printing methods as they are known in the art or later developed. For example, appropriate laser printing structures include, but are not limited to HP Laser Jet printer hardware, particularly the 4L, 4M series.

More than one printing structure or more than one printing method can be used to make a digitally encoded image of the present invention. For example, ink-jet printing and pad transfer printing can be used in combination.

Digitally encoded images can be printed on the surface of a structure, such as on the surface of a lens, such as on the surface of a contact lens. In this aspect of the present invention, the printing structures and printing methods deposit ink onto a surface. The ink can then dry to produce a non-transient image, or monomers or polymers within the ink can be polymerized to produce a non-transient image. In the latter instance, the monomers or polymers are preferably the same or result in the same polymer that comprises the surface. Digitally encoded images can be printed on at least one surface of a structure. For example, if the structure is a lens, such as a contact lens, a digitally encoded image can be printed on either or both sides of the contact lens. Printing methods preferred for this type of printing include, but are not limited to thermal inkjet or bubble jet printing.

As depicted in FIG. 2, digitally encoded images can also be trapped within a structure, such as a lens, such as a contact lens. In this aspect of the present invention, the image can be trapped within a structure using laminate printing, including sandwich laminate printing. For example, an image is printed on a surface, such as a first portion of a lens, then a second portion of a structure, such as a second portion of a lens, is attached to the first portion of a lens such that the image is trapped between the first portion of a structure and the second portion of a structure.

Preferably, the first portion of a structure includes a polymer and the digital image includes a monomer. The monomer can be polymerized such that the digitally encoded image becomes non-transient and substantially immobile. Then the second portion of a lens is attached to the first portion of a structure such that the digitally encoded image becomes trapped between the first portion of the structure and the second portion of a structure. In this aspect of the present invention, the digitally encoded image preferably includes a monomer that can be polymerized to form a polymer, preferably a polymer that is included in the first portion of a structure or the second portion of a structure, preferably both.

Figure 3A:
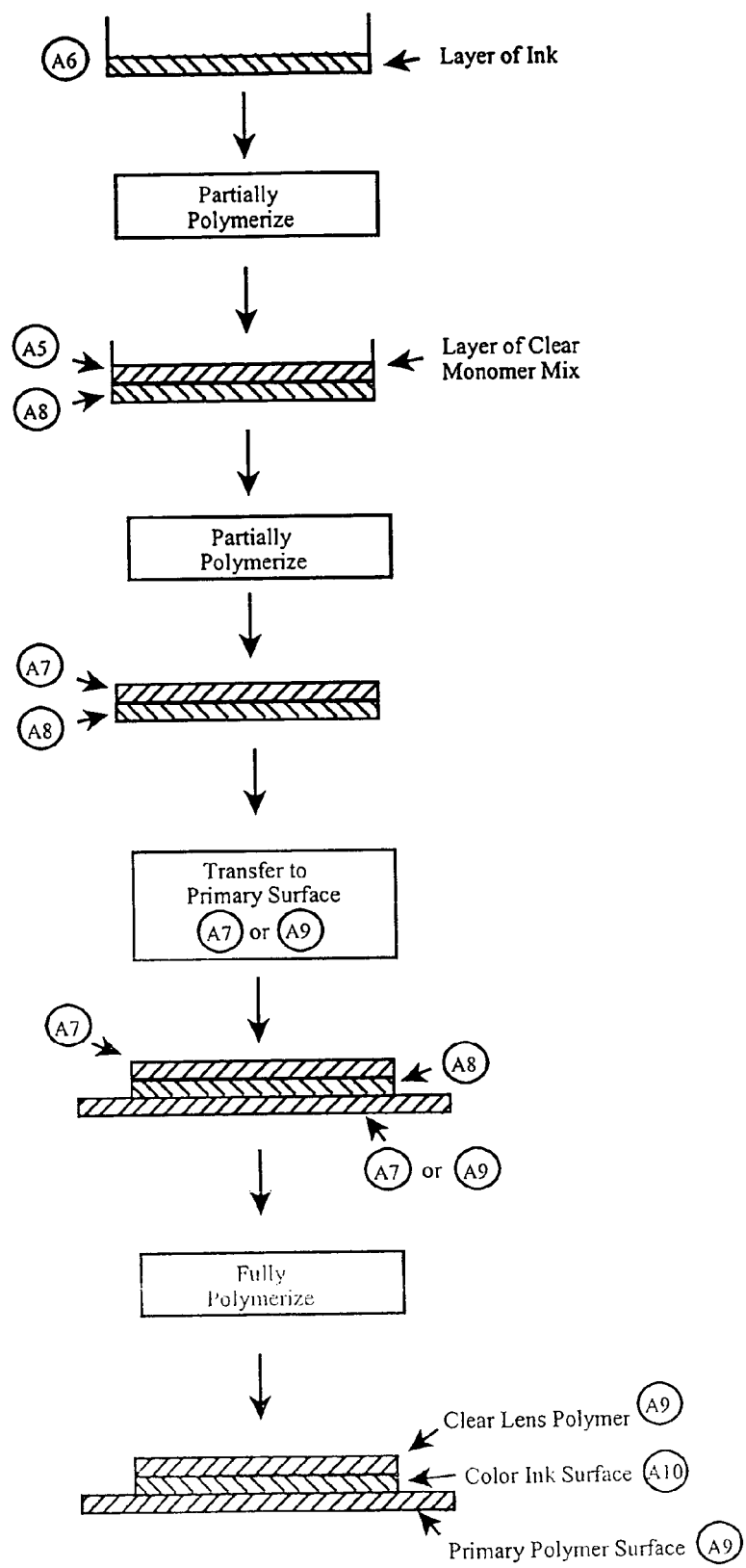
FIG. 3A depicts a method of encasing a layer of ink between a primary surface and a polymer layer. A5 denotes a monomer mix for clear lens; A6 denotes color ink coat/layer of black, magenta, yellow and cyan; A7 denotes partially polymerized A5; A8 denotes partially polymerized A6; A9 denotes fully polymerized clear lens; A10 denotes fully polymerized A6.
Figure 3B:
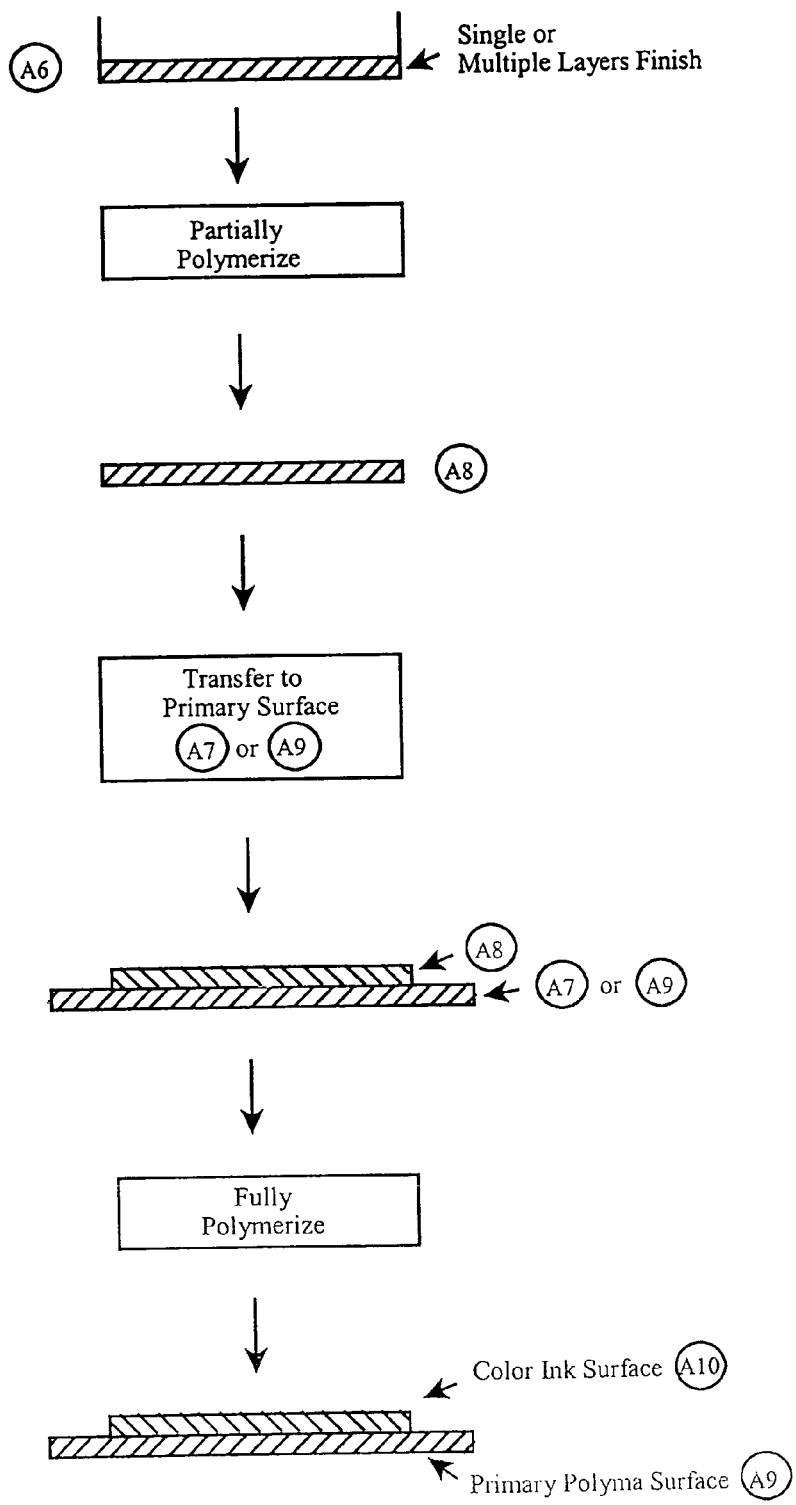
FIG. 3B depicts a method of applying ink to a surface.

In a preferred aspect of the present invention, the first portion of a structure is a non-polymerized monomer or semi-polymerized polymer that includes monomer onto which the digitally encoded image, which preferably comprises the same monomer as the first portion of a structure, is printed. This composite structure can be partially or fully polymerized and a second portion of a structure attached thereto to entrap the digitally encoded image therein. In the alternative, the second portion of a structure, which preferably includes monomer and optionally polymer, preferably the same as the first portion of a lens and the digitally encoded image, is contacted with this first portion of a structure and digitally encoded composite such that the digitally encoded image is trapped between the first portion of a structure and the second portion of a structure. The resulting laminate composite structure includes a digitally encoded image trapped within the structure. In one aspect of the present invention a partially polymerized layer of ink is contacted with a monomer, or alternatively a monomer is partially polymerized and contacted with a layer of ink. Each combination can be partially polymerized and transferred to a primary surface and fully polymerized such that the polymerized layer of ink is sandwiched in between a polymer layer and the primary polymerized surface (see, for example, FIG. 3).

The laminate composite structure can be fashioned into a lens using methods described herein and as they are known in the art or later developed, such as, for example, laser cutting, stamping, grinding, polishing or the like. In the alternative, the laminate composite structure made using the foregoing methods results in a lens. For example, the laminate composite can be made in a mold that has the shape of a lens. Such molds are known in the art and have been described herein. In the alternative, the method used to make the laminate can form a lens, such as spin-casting methods.

Lenses made using spin casting are preferable in the present method. In the alternative, other appropriate methods, such as those described herein, known in the art, or later developed, that can form at least a portion of a lens can also be used. In this aspect of the present invention, a first portion of a structure is printed with a digitally encoded image and the second portion of a structure is added thereon to form a laminate structure. Spin-casting or other lens forming methods and polymerizing can optionally take place any time during this process and the first portion the structure, the second portion of a structure and the digitally encoded image can be in various states of polymerization, such as non-polymerized, partially polymerized or polymerized. Optionally, the digitally encoded image need not include monomer or polymer.

For example, a first portion of a structure can be non-polymerized, polymerized or partially polymerized and can be spin-cast (or other lens forming method) or not spin-cast (or other lens forming method). A digitally encoded image including or not including a monomer and/or a polymer can be printed on the first portion of a lens to form a composite. This composite can be polymerized, not polymerized or partially polymerized and can optionally be spin-cast (or other lens forming method) or at least a portion of a lens formed by another appropriate method (the optional polymerization and optional spin-casting (or other lens-forming method) can take place in either order). This composite is then contacted with a second portion of a structure that can be polymerized, partially polymerized or non-polymerized and then can be optionally spin-cast (or other lens forming method) to form a portion of a lens to form a composite laminate. The composite laminate, or at least a portion thereof, is or are optionally polymerized. Preferably, the first portion of a structure, the digitally encoded image and the second portion of a structure all share at least one common monomer or polymer, but that need not be the case.

One example of this method includes a first portion of a structure dispensed into a receiving structure such as a mold, wherein the first portion of a structure is non-polymerized, partially polymerized or polymerized and is not spin-cast (or other method of forming at least a portion of a lens). The digitally encoded image is printed on the first portion of a structure, wherein the digitally encoded image optionally includes a monomer and/or a polymer to form a composite structure. A second portion of a structure is contacted with the composite structure, wherein the second portion of a structure is non-polymerized, partially polymerized or polymerized to form a laminate composite. The laminate composite is then spin-cast (or other method of forming at least a portion of a lens).

Another example of this method includes a first portion of a structure dispensed into a receiving structure, such as a mold, wherein the first portion of a structure is non-polymerized or partially polymerized and is optionally spin-cast (or other method of forming at least a portion of a lens) and is optionally polymerized. The digitally encoded image is printed on the first portion of a structure, wherein the digitally encoded image optionally includes a monomer and/or a polymer to form a composite structure and is optionally spin-cast (or other method of forming at least a portion of a lens) and optionally polymerized. A second portion of a structure is contacted with the composite structure, wherein the second portion of a structure is non-polymerized, partially polymerized or polymerized to form a laminate composite. The laminate composite is optionally spin-cast (or other method of forming at least a portion of a lens). Preferably, the first portion of a structure and second portion of a structure include the same or similar monomer and polymer and are partially polymerized such that a polymerization (such as a final polymerization of a laminate structure) results in a relatively or substantially "seamless" laminate structure (fused or connected). Preferably, the digitally encoded also includes the same or similar monomer and polymer (non-polymerized or partially polymerized) so that a polymerization (such as a final polymerization of a laminate structure) results in a relatively or substantially "seamless" laminate structure.

During this course of this method, the digitally encoded image can form a chemical bond with either or both of the first portion of a structure and the second portion of a structure. In this instance, the digitally encoded image comprises an ink that can form such a chemical bond.

Also, the digitally encode image can form a polymer-polymer bond with either one or both the first portion of a structure and second portion of a structure. In this instance, the digitally encoded image includes a monomer or polymer that formed a polymeric bond with at least one of the first portion of a structure and second portion of a structure.

In this aspect of the invention, the digitally encoded image preferably includes at least one pattern. The pattern can be any pattern, including naturally and non-naturally occurring patterns. For example, a naturally occurring pattern can include a fractile-like pattern. Non-naturally occurring patterns can include geometric patterns or non-geometric patterns, such as are used in vanity contact lenses. A digitally encoded image can include at least one color, but preferably includes a plurality of colors. A digitally encoded image preferably includes at least a portion of an image of an eye, such as the iris of an eye, such as the iris of a human eye.

The image can include at least one color, but preferably includes two or more colors. The colors used in the image can be derived from a mixture of separate colors, such as two or more separate colors, three or more separate colors or four or more separate colors. For the purposes of this aspect of the invention, black is considered a separate color. The separate colors are preferably primary colors that can be mixed in different proportions to form a wide array of colors on an image.

Polymers and Lenses

Structures, such as lenses, of the present invention preferably include at least one polymer. When the structure of the present invention is a lens, such as a contact lens, the at least one polymer is preferably a polymer that is compatible with the eye. Preferable polymers for use in making contact lenses include, but are not limited to acrylics, silicones, polycarbonates and others known in the art or later developed. Polymers useful in the present invention can be hydrophobic or hydrophilic. In the case of hydrophilic polymers, the polymer preferably forms a hydrogel. Generally, polymers used to make contact lenses result in "hard lenses," "soft lenses" or "hybrid lenses" as those terms are known in the art.

II Method of Making a Lens with a Digitallt Encoded Image-I

The present invention also includes a method of making an article of manufacture that includes a digitally encoded image and a polymer, including the steps of printing a digitally encoded image on a composition that includes a polymer, wherein the polymer forms a lens. The polymer can be any polymer, but is preferably a polymer in a wet state or a dry state, such as polymers used in the manufacture of lenses, such as contact lenses.

The article of manufacture is made by providing a composition that includes a polymer upon which the digitally encoded image is to be printed. The polymer is preferably a polymer used to make lenses, such as contact lenses, and include, but are not limited to, hydrophobic polymers, hydrophilic polymers, homopolymers, heteropolymers, copolymers, acrylic polymers, silicone polymers or polycarbonate polymers either alone or in combination. One preferred lens includes the following: HEMA (hydroxyethyl methacrylate), EOEMA (ethoxyethylmethacrylate, MAA (methacrylic acid), EGDMA (ethylene glycoldimethacrylate), Vazo-64 (azobisisobutyronitrile), BME (benzoin methylether), IPA (isopropyl alcohol), THF (tetrahydrofuran), Mercap-2 (mercaptoethanol), c-pentanone (cyclopentanone) and MEHQ (methylethyl hydroquinone) (see U.S. Pat. No. 5,271,874).

In this aspect of the present invention, the polymer at least in part forms a lens, such as a contact lens, such as a soft contact lens, a hard contact lens or a hybrid contact lens. It is the structure that forms at least in part a lens that a digitally encoded image is printed. Preferably, the digitally encoded image is printed on the lens and can be printed on either or both sides of the lens. The digitally encoded image can be printed on the entire lens or a portion thereof. For example, the digitally encoded image can depict the iris of an eye such that the area corresponding the pupil of the eye is not printed.

The digitally encoded image is preferably encoded electronically, such as in a database. The digitally encoded image can be prepared by any appropriate method, such as by scanning an image into a processing unit using appropriate scanning and storage hardware and software. The digitally encoded image can be selected and can be conveyed to a printing device as an electronic signal using appropriate hardware and software.

The digitally encoded image is preferably printed using a printing device that is capable of producing a digital image, such as an ink jet printing device, a piezo printing device, a thermal printing device or a laser printing device. The printing devices preferably include at least one ink, wherein if more than one ink is present in such printing device, the different inks are provided in separate containers or separate portions of the same containers, such as provided in Hewlett Packard Color DeskJet printer cartridges (HP51649A).

An ink preferably contains at least one monomer, such as a hydrophobic monomer or hydrophilic monomer that preferably corresponds to a polymer that is included in the lens. The ink can also include a variety of other components, such as an appropriate initiator, such as a UV initiator or a thermal initiator to initiate polymerization of the monomer after being dispensed by a printing device on a polymer. An ink can optionally also include at least one of a binder, an ant-bacterial agent, an anti-fungal agent, a disinfectant, or a humectant at an appropriate concentration for the intended function. Preferably inks include, but are not limited to, pigment black 7 (carbon black), pigment black 11 (iron oxide), pigment brown 6 (iron oxide), pigment red 101 (iron oxide), pigment yellow 42 (iron oxide), pigment while 6 (titanium dioxide), pigment green 17 (chromium oxide), pigment blue 36 (chromium aluminum cobaltous oxide), pigment blue 15 (copper phthaloxyanine), pigment violet 23 (3,amino-9-ethyl carbazole-chloronil) (U.S. Pat. No. 5,302,479), Millikan ink yellow 869, Millikan ink blue 92, Millikan ink red 357, Millikan ink black 8915-67 (see U.S. Pat. No. 5,621,022).

Preferably, four separate ink colors, which can include one or more individual inks, are used in a printing device FIG. 1. The four inks correspond to black, magenta, yellow and cyan. The printing device can mix these inks to provide a wide diversity of colors for use in the printing process. A typical ink formulation includes: monomer (HEMA), initiator (BME), crosslinker (EGDMA), pigment #1 (phthalocyanine blue), diluent (glycerine), solvent (isopropanol), pigment #2 (titanium dioxide), dispersant (polyvinyl alcohol), humectant (ethylene glycol), co-monomer (methacrylic acid), inhibitor (MEHQ), anti-kogating agent (methylpropanediol) and anti-oxidant (alkylated hydroquinone). The monomer can also be a mixture of two or more monomers. A preferred mix of monomers that results in a clear polymer, such as for a clear contact lens, includes monomer HEMA (hydroxyethyl methacrylate), monomer EOEMA (ethoxyethylmethacrylate), monomer MAA (methacrylic acid). Optionally included is at least one of the following: crosslinker EGDMA (ethylene glycoldimethacrylate), initiator Vazo 64 (azobisisobutyronitrile), solvent isopropyl alcohol, inhibitor MEHQ (methyletherhydroquinone) and diluent glycerine. All components are at appropriate concentrations for their intended purpose.

Optionally, a printing device can include a mixture as described above without an ink that can be dispensed along with at least one ink in a separate container such that the ink and monomer and other optional components are mixed and dispensed onto a polymer. In either instance, the monomer in the dispensed fluid can be polymerized, thus immobilizing the ink therein at a defined locus.

Preferably, during printing, a printing device, such as an ink jet printer, will dispense four different main colors (Black, Magenta, Cyan and Yellow) as discrete dots that correspond to one or more dispensation volumes of the printing device that do not mix. The dots are deposited as any combination of the main colors to form a collage of discrete dots of different main colors that, to the unaided human eye generally appear to be a color or pattern rather than a collage of discrete dots. Thus, what is formed is a matrix of individual color dots next to each other with a boundary between them.

Such a pattern under magnification may appear as:

OOOOOOOOO
OOOOOOOO
OOOOOOOOOO

Depending on the number of dots, their density and distribution the unaided human eye would perceive different colors, intensity, hue and brightness.

The ink used in available technology, such as pad transfer printing and pad transfer devices, is highly viscous, such as up to 40,000 cps and is partially polymerized. Such inks do not run and forms a large discrete dot on dispensation. Such printing results in a very unnatural appearance due to the large, unmixed dots. In the present technology, the viscosity of the ink can be low, such as less than about 100 cps, and can be between about 1 cps and about 10 cps. This low viscosity allows the dots to blend, either on their own, or upon the exertion of external forces, such as vibrational energy. In this instance, the dots do not remain discrete, but rather blend together, such as:

OOOOOOOO
OOOOOOO
OOOOOOOOO

The result being an image that is a color and pattern that is a "non-dot" color matrix that has a highly realistic appearance to the unaided human eye.

The printing device dispenses ink or mixtures of inks onto a polymer, such as a lens, that corresponds to the digitally encoded image. More than one digitally encoded image can be dispensed onto a polymer. Monomer in at least one ink can be appropriately polymerized such that the ink is immobilized on or within the polymer. This process can be repeated with the same or different digitally encoded image in the same or different orientation.

Figure 4:
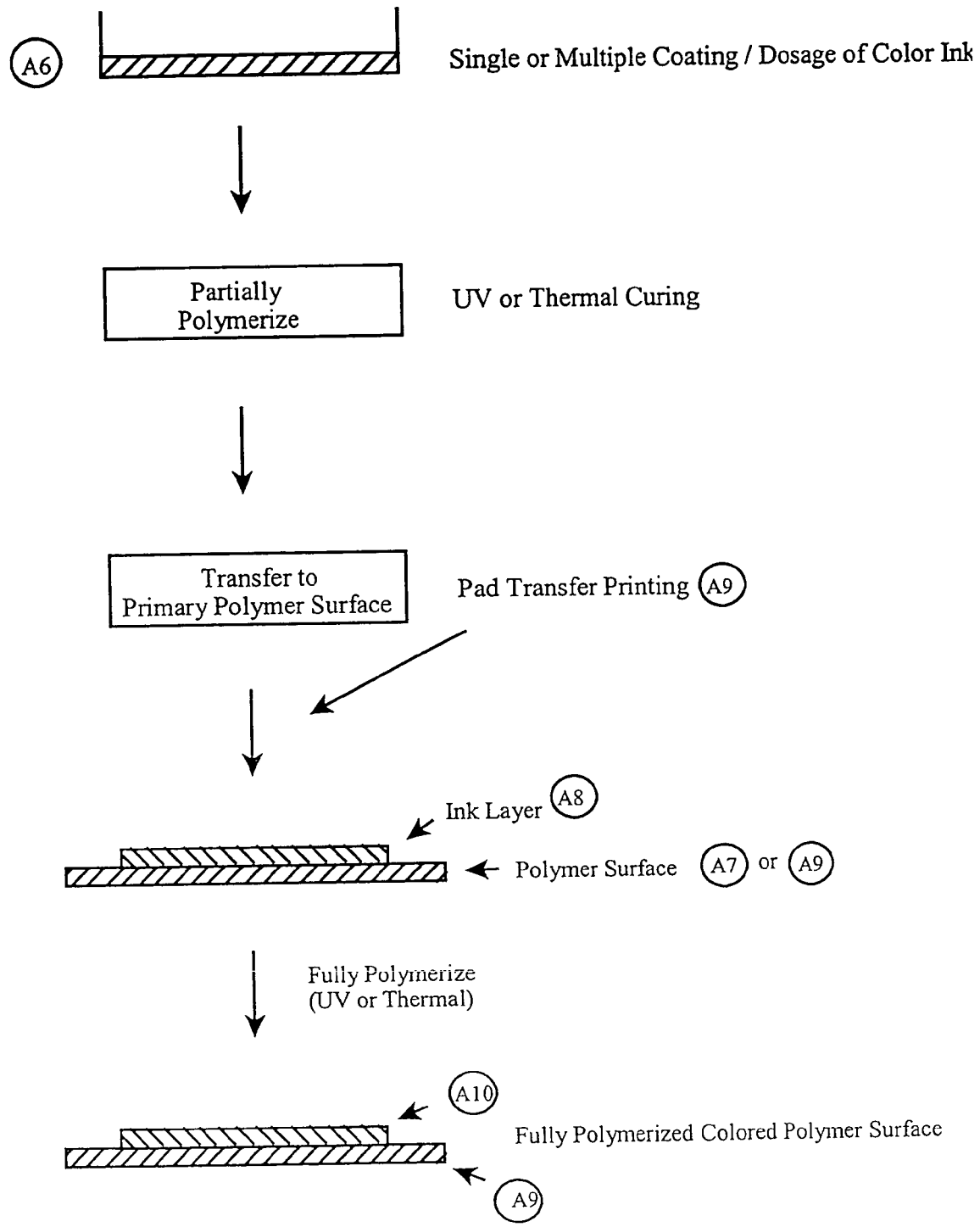
FIG. 4 depicts a diagram of pad transfer printing method of the present invention. A7 denotes partially polymerized monomer mix for clear lens; A8 denotes partially polymerized color ink coat/layer of black, magenta, yellow and cyan; A9 denotes fully polymerized clear lens. A10 denotes a fully polymerized A8.

In the alternative, the digitally encoded image can be printed on a pad transfer printing device where it is optionally polymerized. The printed image can then be transferred to a polymer, such as a contact lens, using appropriate pad transfer printing devices such as they are known in the art FIG. 4.

III Method of Making a Lens with a Degitally Encoded Image-II

The present invention includes a method of making an article of manufacture that includes a digitally encoded image and a polymer, including the steps of printing a digitally encoded image on a composition comprising a polymer, and forming a lens from said polymer.

In this aspect of the present invention, the digitally encoded image is printed on a polymer that does not form a lens using a printing device. The polymer with the digitally encoded image is then formed into a lens using an appropriate method, such as, for example, fabrication, cast-molding, spin-casting or a combination thereof.

Figure 6:
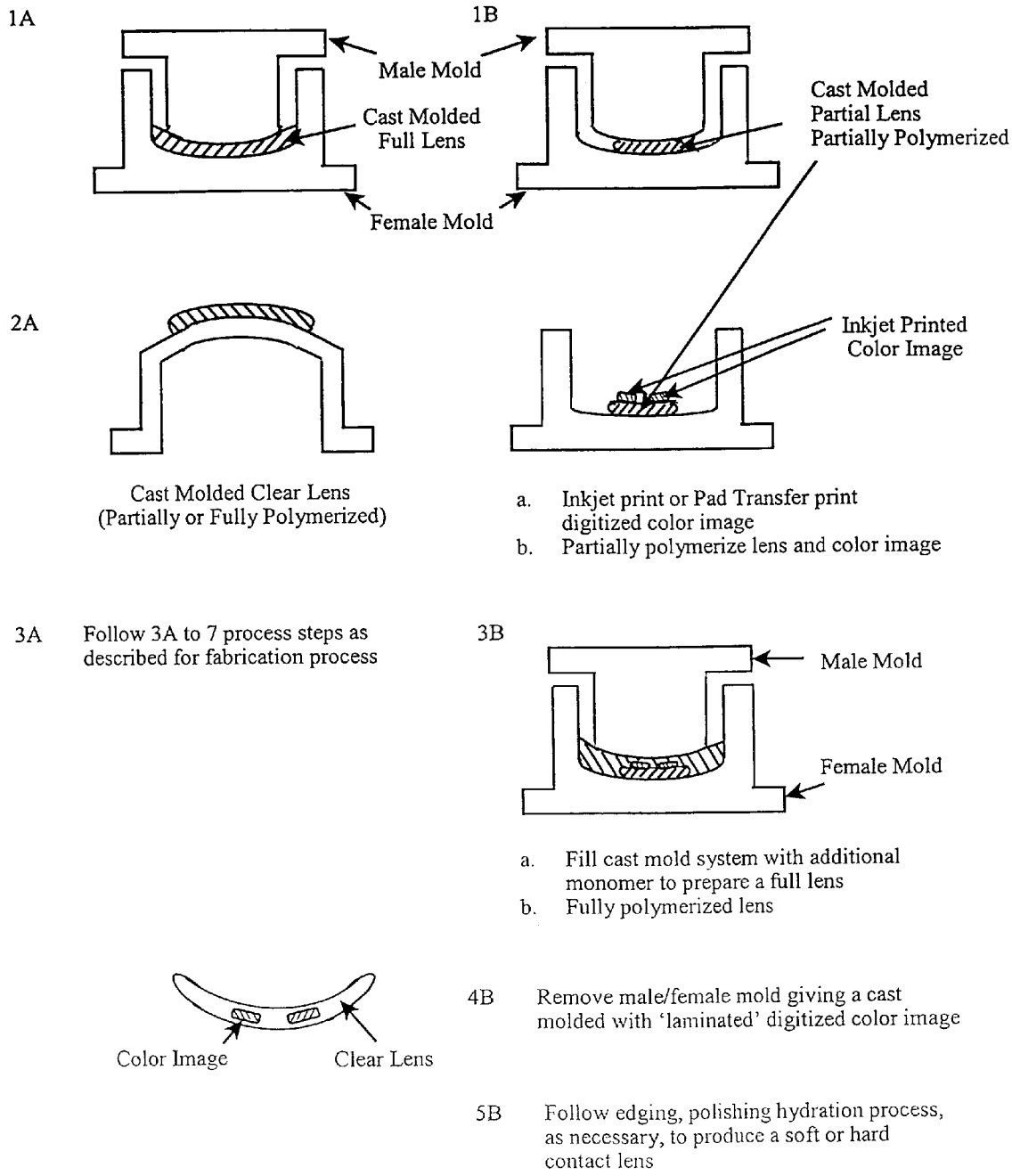
FIG. 6 depicts cast molded method that can be used to produce lens of the present invention.
Figure 7A:
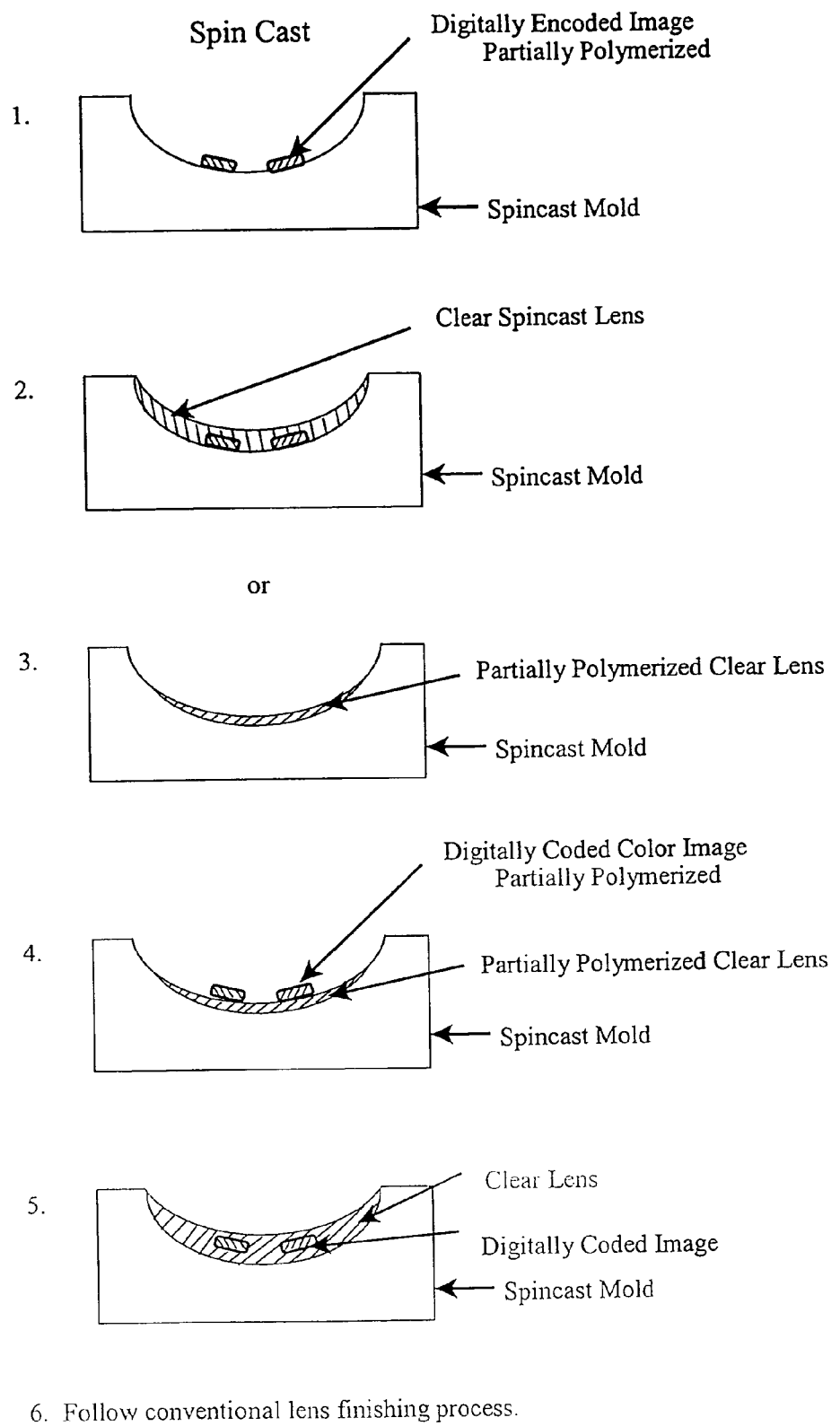

When the lens is made using fabrication, the polymer with the digitally encoded image is formed into a lens using appropriate fabrication methods, including, for example, stamping, grinding or trimming (see the FIG. 5). The lens can also be made using cast-molding and spin casting (see, for example, FIG. 6, FIG. 7A and FIG. 7B).

FIG. 7B depicts one preferred aspect of the present invention. A lens structure is made using, for example, spin casting. Etching, burning or cutting processes, such as methods using chemical, mechanical or laser methods, are used to create well(s) or indentations. These wells or indentations preferably are aligned at a locus that corresponds to the iris of an eye. A digitally encoded image is printed on the lens, preferably at the location of the wells or indentations. The ink can optionally be polymerized or partially polymerized when monomers are present in the ink. A layer of polymer is then created on top of this structure to form a lens structure. Any appropriate polymerization of the structure thus formed or portions thereof can be accomplished using appropriate methods.

In one instance, a digitally encoded image can be printed onto the surface of a spin casting device, where the printed digitally encoded image can be optionally polymerized or partially polymerized. A solution including at least one monomer that can be polymerized to form a lens, such as a contact lens, can be dispensed on the printed digitally encoded image and spin cast to form a lens. Preferably, the ink(s) used to print the digitally encoded image include the same monomer(s) used to make the lens, but that need not be the case. Preferably, the printed digitally encoded image is non-polymerized or partially polymerized and contacted with the solution including at least one monomer (preferably the same monomer used in the ink(s)). The lens is formed by spin-casting, and the polymerization process completed. In that way, a self-adhesion bond or a polymer-polymer bond between the printed digitally encoded image and the lens is made.

In another instance, a first solution including at least one monomer can be polymerized or partially polymerized to form a lens, such as a contact lens, in a spin cast device. A digitally encoded image can be printed on the exposed surface of the lens using a printing device and the printed digitally encoded image optionally polymerized. A second solution including at least one monomer that can be polymerized to form a lens, such as a contact lens, is placed on top of the printed digitally encoded image and is spin cast to form a lens. The second solution preferably is the same solution as the first solution. Preferably, the first solution is partially polymerized prior to the printing of the digitally encoded image, wherein the printed digitally encoded image includes the monomer of the first solution. This structure is optionally polymerized or partially polymerized. The second solution preferably includes the monomer of the first solution and the ink(s) used to make the digitally encoded image. Preferably, the first solution, the printed digitally encoded image and the second solution form a partially polymerized structure, and the polymerization is then completed. In that way a polymer-polymer bond form between the polymerized first solution and the polymerized printed digitally encoded image or between the polymerized printed digitally encoded image and the polymerized second solution. Preferably, such polymer-polymer bond forms between the polymerized first solution, the polymerized printed digitally encoded image and the polymerized second solution.

Figure 8A:
FIG. 8A depicts examples of indentation structures that can be formed on the convex portion of the present invention and are depicted as filled with an ink of the present invention.
Figure 8B:
FIG. 8B depicts examples of indentation structures that can be formed on the concave portion of the present invention and are depicted as filled with an ink of the present invention. The indentation structures are not necessarily shown to scale and preferably are relatively small such that they have a volume of less than about 10 microliters, less than about 5 microliters, less than about 1 microliter, less than about 0.1 microliter, less than about 1 nanoliter, less than about 0.1 nanoliter or less than about 0.01 nanoliters.

In another instance, the present invention includes a polymeric surface that includes indentation structures, such as but not limited to grooves or wells that can be formed in the polymeric surface by a variety of methods, including casting and etching, cutting, drilling or burning, such as by laser etching, physical etching or chemical etching (see, for example, FIG. 8A and FIG. 8B). Preferably, the indentation structures are made using appropriate laser etching technologies, such as those made by Lumonics Inc.

The indentation structures can be provided at any locus at any appropriate density of indentation structures on a surface, but are preferably located in areas where pigmentation or printing is targeted, such as where a desired cosmetic effect is desired for contact lenses. Locations where printing is not desired or desirable can be provided substantially without such indentation structures such that printing can be particularly directed or not directed to chosen locations.

Figure 9:
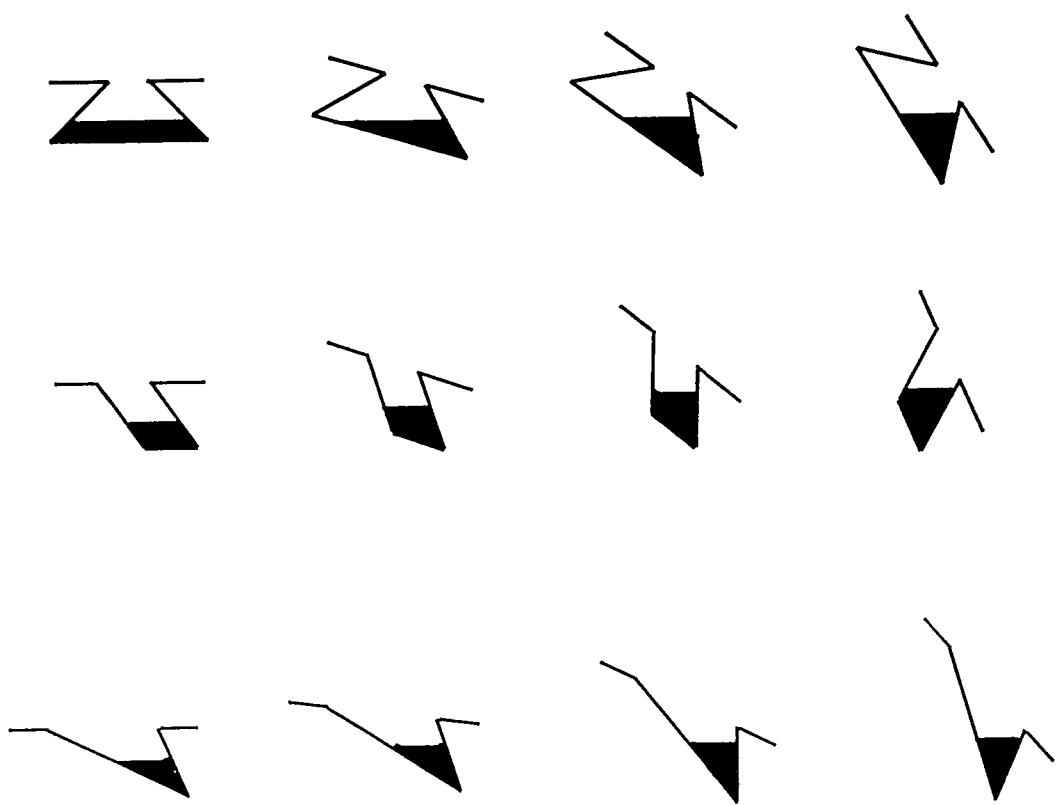
FIG. 9 depicts deposition of ink into a variety of indentation structures of the present invention. Different angles represent rotation of surface. The indentation structures are represented as being partially filled with an ink of the present invention. The remaining void volume in the indentation structures can be filled with, for example, a monomer or a polymer such as to trap the ink of the present invention. Droplets of one or more colors of ink can be deposited into such indentations to allow for a variety of colors to be present in such indentations.

The indentation structures can be of different sizes and shapes, but are preferably relatively small such that one, a few or many droplets of ink can be deposited into such indentation structures using appropriate printing methods or devices (see, for example, FIG. 9). Preferably, one or a few of the same color or different colors can be deposited in the indentation structures. In one aspect of the present invention, the indentation structures are partially filled or fully filled with ink during printing processes. If the indentation structures are over-filled, then steps can be taken to remove excess ink, such as, for example, blotting, scraping or machining, such as polishing, buffing or grinding.

In a particularly preferred aspect of the present invention, the ink includes at least one polymerizable monomer that can be polymerized after dispensation. If the indentation structures are not filled with such ink, then additional material, such as monomer with or without ink can be dispensed onto the polymer. As in other aspects of the present invention, the skilled artisan has the choice of when and how the ink or monomer can be polymerized. For example, in one preferred aspect of the present invention, the ink is dispensed into indentation structures such that the indentation structures are not filled. The ink is then optionally polymerized, and additional monomer is dispensed on the polymer to fill or overfill the indentation structures. The monomer is then polymerized, and the polymer is ready for final processing, if any.

Preferably, the indentation structures facilitate holding the dispensed ink in a location such that a digitally encoded image is localized and held in place. This aspect of the present invention is most appropriate for inks that are of relatively low viscosity such that the ink does not run due to the curvatures of printed surfaces, such as are present in lenses.

In one preferred aspect of the present invention, droplets of ink that include a monomer are deposited on a surface, such as a polymer, that includes indentation structures. One or more droplets of the same or different color are deposited in such indentation structures such that different combinations of colors, chroma, intensity and hues can be localized in one or more indentation structures.

Figure 10:
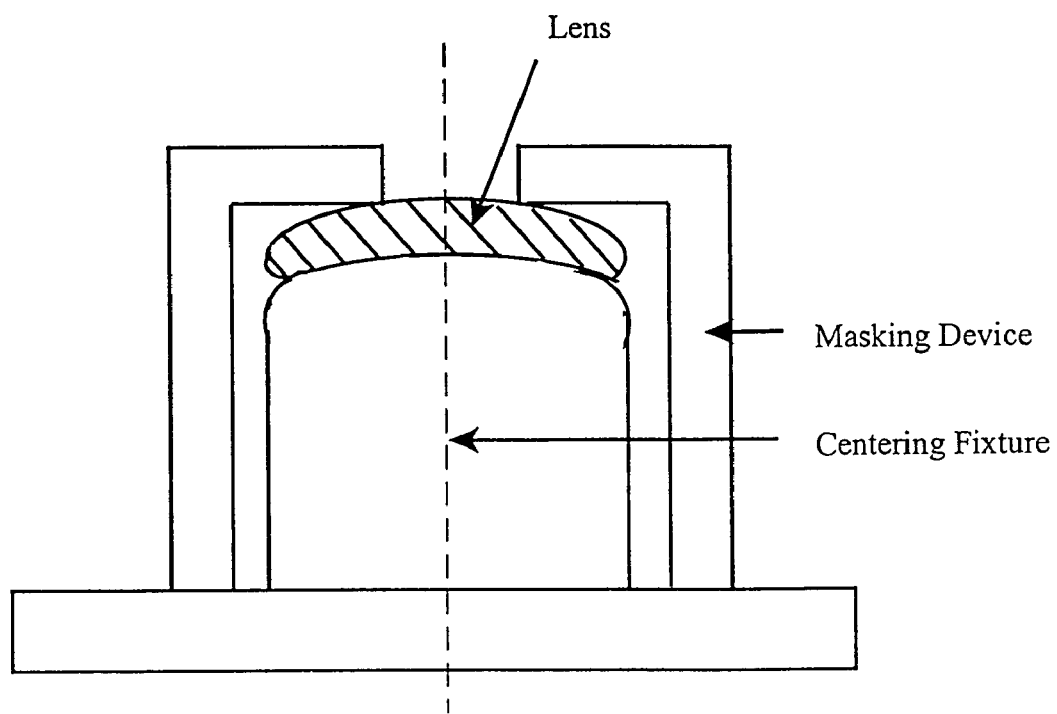
FIG. 10 depicts a fixture for centering and masking for lenses, preferably but not limited to hydrated or partially hydrated lenses.

In another aspect of the present invention, a lens such as a non-hydrated lens or hydrated lens, such as a partially hydrated or fully hydrated lens, can be mounted, preferably centered, and masked on a fixture (see, for example FIG. 10). When hydrated, water on or in the lens can optionally be removed, such as by blotting. A hydrated lens can optionally then be dehydrated, such as to partial or substantial dehydration, by appropriate methods such as by air, heat or centrifugation. The lens can be printed or tinted using appropriate methods such as those described herein. Preferably but optionally, the lens includes indentation structures such as those described herein. This process and device allow for the automation of printing processes and manufacture processes described herein.

The present invention also includes a method of making an article of manufacture that includes a digitally encoded image and a polymer, including the steps of printing a digitally encoded image on a composition comprising at least one monomer, polymerizing said at least one monomer to form at least one polymer, and forming a lens from said at least one polymer.

The present invention includes a method of making an article of manufacture that includes a digitally encoded image and a polymer, including the steps of printing an image on at least one first surface, transferring said image to at least one second surface comprising a monomer or a polymer, and forming a lens from said second surface.

IV Digital Images

The present invention includes an article of manufacture, including: at least one information storage medium, and at least one digital image, wherein the at least one digital image comprises at least a portion of an image, such as, but not limited to, the iris of an eye. The information storage medium can be any appropriate electronic storage medium and is preferably in a machine readable format and preferably associated with a central processing unit. A plurality of digital images can be stored in a database. The invention is drawn not only to digitally encoded images, but also to the digitally encoded images when provided in a format, such as data, such as data in a patentable format. Thus, for example, the present invention encompasses a format such as a machine-readable format comprising data such as one or more digitally encoded images of interest as determined or isolated according to the present invention.

For example, the invention includes data in any format, preferably provided in a medium of expression such as printed medium, perforated medium, magnetic medium, holographs, plastics, polymers or copolymers such as cyclo-olefin polymers. Such data can be provided on or in the medium of expression as an independent article of manufacture, such as a disk, tape or memory chip, or be provided as part of a machine, such as a computer, that is either processing or not processing the data, such as part of memory or part of a program. The data can also be provided as at least a part of a database. Such database can be provided in any format, leaving the choice or selection of the particular format, language, code, selection of data, form of data or arrangement of data to the skilled artisan. Such data is useful, for example, for comparing sequences obtained by the present invention with known sequences to identify novel sequences.

One aspect of the invention is a data processing system for storing and selecting at least a portion of data provided by the present invention. The data processing system is useful for a variety of purposes, for example, for storing, sorting or arranging such data in, for example, database format, and for selecting such data based on a variety of criteria, such as colors, patterns, sources and the like. Such a data processing system can include two or more of the following elements in any combination:

I. A computer processing system, such as a central processing unit (CPU). A storage medium or means for storing data, including at least a portion of the data of the present invention or at least a portion of compared data, such as a medium of expression, such as a magnetic medium or polymeric medium;

II. A processing program or means for sorting or arranging data, including at least a portion of the data of the present invention, preferably in a database format, such as a database program or an appropriate portion thereof such as they are known in the art (for example EXCEL or QUATRO-PRO);

III. A processing program or means for comparing data, including at least a portion of the data of the present invention, which can result in compared data, such as digital image comparing programs or an appropriate portion thereof;

IV. A processing program or means for analyzing at least a portion of the data of the present invention, compared data, or a portion thereof, particularly statistical analysis, such as programs for analyzing digitally encoded images using statistical analysis programs or image comparing programs or an appropriate portion thereof as they are known in the art;

V. A formatting processing program or means that can format an output from the data processing system, such as data of the present invention or a portion thereof or compared data or a portion thereof, such as database management programs or word-processing programs, or appropriate portions thereof as they are known in the art; or VI. An output program or means to output data, such as data of the present invention or a portion thereof or compared data or a portion thereof in a format useful to an end user, such as a human or another data processing system, such as database management programs or word-processing programs or appropriate portions thereof as they are known in the art. Such formats useful to an end user can be any appropriate format in any appropriate form, such as in an appropriate language or code in an appropriate medium of expression.

V Systems

The present invention also includes a system, including: an article of manufacture of the present invention and a printing device. The article of manufacture includes at least one digitally encoded image, preferably in the form of a database within a central processing unit. The central processing unit preferably is linked to a printing device that includes appropriate software and hardware to direct the printing device to print a digitally encoded image, such as during the operation of a method of the present invention. The system can include additional components, such as devices for the manufacture of lens structures of the present invention. For example, the system of the present invention can include a lens manufacturing device, such as a spin casting device or a pad transfer device. Preferably, the central processing unit includes hardware and software that allows the central processing unit to direct the manufacture of a lens using at least one method of the present invention.

As a preferred embodiment of the present invention, a system of the present invention includes a first central processing unit that optionally includes an article of manufacture of the present invention, wherein the article of manufacture of the present invention can be located on at least one second central processing unit separate in distance from the first central processing unit and is linked to the remainder of the system. The system preferably includes a printing device as described herein or known in the art that is capable of printing at least one digital image of the present invention. The system preferably includes a lens manufacturing device, such as a spin-cast device or a pad transfer device. In that regard, the system of the present invention includes dispensation and other hardware, software and reagents used to practice a method of the present invention. Preferably, the system is automated such that a user can select a digital image and the first central processing unit directs and coordinates the manufacture of at least one lens by the remainder of the elements of the system, such as the printing device and a lens manufacture device.

VI Compositions of Matter Including Ink

The present invention also includes a composition of matter, including at least one ink, dye, vat dye, particle, pigment, reactive dye or diazo dye. The composition of matter also includes at least one of a binder, monomer, polymer, homopolymer, heteropolymer, copolymer, and initiator, UV initiator, thermal initiator, solvent, dispersant, anti-bacterial agent, anti-microbial agent, anti-fungal agent, disinfectant, thickener, humectant, non-kogating agent, anti-corrosion agent, antiseptic agent or non-oxidizing agent. The indicated agents can be provided in any combination and at concentrations or amounts appropriate for the indicated function.

The compositions of matter of the present invention do not include the inks set forth in U.S. Pat. No. 4,303,9214 to Young, issued Dec. 1, 1981. In particular, the composition of matter of the present invention are preferably water resistant after polymerization such that pigments in the ink substantially stay where they have been deposited by printing processes. In addition, the compositions of matter of the present invention are preferably swellable after polymerization, particularly in solvents, preferably water. In addition, the inks of the present invention, are preferably capable of chemically bonding, cross-linking or otherwise binding with polymers or monomers on the surface being printed. For example, the ink of the present invention can include monomers that can be polymerized with a polymer or monomer on the surface being printed.

The composition of the present invention can be provided in a printing device, such as an ink jet printing device, a piezo printing device, a thermal printing device, a laser printing device or a pad transfer printing device.

VII Method of Doing Business

The present invention also includes a method of doing business, including the steps of: obtaining a digital image from a person, database (such as a database of the present invention) or image and printing said digital image to make at least one lens or a pair of lenses that includes the printed digital image. Preferably, the lens or lenses are made using a method of the present invention. Furthermore, the lens or lenses are preferably made using a system of the present invention.

In this aspect of the present invention, a customer selects an image that s/he would like as part of a lens. The image can be any image, such as a fanciful image or any type, such as novelty images including swirls and the like, or an image that is a high quality image of an iris, such as from a human or animal. The image can be selected from a database, such as a database of digital images. Alternatively, the customer can identify and select an image from a variety of sources, such as a collection of photographs of people or animals. Such collections can be in an appropriate storage medium, such as an electronic database or a collection or compilation of photographs or pictures. Alternatively, the customer can provide a selected image for use in the present method. A selected non-digital image can be transformed into a digital image using appropriate scanning technologies as they are known in the art. Such scanned images can become part of a database of the present invention. The selection process can take place at virtually any location, such as at a vendor's or manufacturer's physical location or via computer, such as via the Internet.

The digital image selected by the customer can then be conveyed to the vendor's or manufacturer's physical location via an appropriate method, such as through personal communication, phone communication, communication through printed materials such as order forms through the mail, or through electronic media, such as through the Internet. A selected image can be analyzed using appropriate software, such as image analysis and comparing software, for patterns, hue, chroma and intensity. The image can then be transformed into a signal for use by a printing device such that the image is reproduced as to colors and patterns by the printing device. The vendor notifies the manufacturer of the order and provides the manufacturer with the necessary information, such as the digital image. The vendor and manufacturer can be the same or different person, company or entity and can be at the same or different physical location. The manufacturer then manufactures the lens or lenses and delivers the manufactured lens or lenses to the vendor or customer by an acceptable method such as check, cash, credit, or credit card. The vendor or manufacturer receives payment as appropriate.

The digital image can be printed by a printing device following a method of the present invention or other method known in the art or later developed that results in the production of a lens, particularly a contact lens, of the present invention. Preferably, a printing device that utilizes at least two colors, at least three colors or at least four colors is used. This aspect of the present invention preferably utilizes a system of the present invention.

VIII Use of Polymer Substrate Pre-Treatment Processes and Image Receiver Layer

The present invention also includes an article of manufacture, including a polymer substrate and a digitally encoded image made with ink, wherein the polymer substrate forms a lens and is subjected to a pre-treatment process that precedes the application of the digitally encoded image to the polymer substrate. The pre-treatment process results in an enhanced image quality of the digitally encoded image.

A polymer substrate, such as a lens, on which an image is to be printed, may be pre-treated prior to the printing process in order to improve the quality of the image, the quality of the printed polymer substrate, or both. A suitable pre-treatment process may include one or more physical or chemical modifications of the polymer substrate. For example, a physical or chemical modification of the surface of the polymer substrate may improve reproduction, resolution, durability, or realism of the image. Pre-treatment processes may modify the polymer substrate or polymer substrate surface, for example, by increasing or decreasing the polymer substrate's wettability, porosity, or permeability. Pre-treatment processes may improve the polymer substrate's surface morphology, printability, stability, or durability. Formation of a lens from the polymer substrate may occur prior to, during, or after, one or more pre-treatment processes.

Physical modifications may include, but are not limited to, etching, cutting, burning, heating, cooling, grinding, buffing, polishing, texturing, engraving, scribing, permeabilizing, and other mechanical or non-mechanical treatments, which may roughen or smoothen the polymer substrate's surface. Physical modifications may be made by any suitable means. In one example, a mechanical polisher can be used to polish, grind, or mill the polymer substrate's surface. In other examples, a tool, such as a diamond tool, can be used to cut the surface of the lens, or the lens may be fabricated with a lathe. In another example, a laser can be used to smoothen the polymer substrate's surface, or, in one alternative, a laser can be used to add texture or pattern (such as indentations or wells) to the polymer substrate's surface.

Chemical modifications may include, but are not limited to, chemical cleaning; chemical texture modifications (for example, etching, texturing, permeabilizing, smoothening, polishing, or combinations thereof); chemical or electrochemical activation or creation of reactive groups on or within the polymer substrate (for example, surface activation or ionization by treatment with high voltage, flame, ozone, corona, plasma, or combinations thereof), chemical coating, and treatment with acid, base, oxidizer, reducer, solvent, diluent, monomer, co-monomer, polymer, initiator, crosslinker, inhibitor, or other chemicals including reactive or non-reactive components of the ink used in printing the image. Non-limiting examples of chemical modifications follow. A surfactant or wetting agent can be applied to the polymer substrate to improve wettability (for example, ethanol or isopropyl alcohol may be applied by means of a swab or aerosol spray to a hydrogel contact lens to improve the lens surface's wettability). The polymer substrate can be impregnated or soaked in a chemical that changes the polymer's degree of swelling (for example, a hydrogel contact lens may be impregnated with methanol to swell the lens). The polymer substrate can be treated by plasma or by corona treatment in order to provide a temporary electrochemical modification of the surface. A hydrogel contact lens can be coated with aziridine or with a primer to improve the bonding between a reactive dye ink and the lens substrate. Carboxylic acid functional groups on the surface of a polymer substrate can be esterified with alcohols or other hydroxyl-bearing agents, with or without a catalyst. A corrosive agent can be used to etch the polymer substrate (for example, hydrofluoric acid can be sprayed onto a hydrogel contact lens to etch the surface).

An enhancement in image resolution and improvement to overall image quality can be achieved by the use of an image receiver layer during the printing process. The image receiver layer includes a chemical coating that is applied in a layer, such as a thin layer, to the surface of the polymer substrate, which may form a lens. The polymer substrate can be porous, semi-porous, non-porous, or a combination thereof. Formation of a lens from the polymer substrate may occur prior to, during, or after, application of the image receiver layer to the polymer substrate. An image, such as a digitally encoded image, is printed, directly or indirectly (for example, directly by an ink jet printer) by transferring ink onto or into the image receiver layer. Formation of a lens from the polymer substrate may occur prior to, during, or after, printing of a digitally encoded image.

The image receiver layer serves to stabilize the ink by retaining the ink in discrete droplets or "dots" in the desired location within the image. Stabilizing the ink droplets can prevent excessive mixing or bleeding of the colors, for example, as may occur if the ink droplets were allowed to remain wet directly on the surface of a hydrophilic polymer substrate, or under humid conditions, such as those routinely used during the fixing process. The ink's reactive components (such as a polymerizable monomer or a reactive dye) contact the polymer substrate through the image receiver layer and, upon exposure to appropriate conditions, undergo a fixing reaction that fixes the reactive component non-transiently to the polymer substrate. The fixed reactive component is non-transiently fixed to the polymer substrate in that the fixed reactive component is not substantially removable from the polymer substrate by the normal post-fixation processes (such as lens hydration and sterilization) or during normal use (such as normal wearing of a contact lens by a subject). The fixing reaction can include, for example, covalent or non-covalent chemical bonding, cross-linking, or other bonding with the polymer substrate. The image receiver layer enhances the print quality by controlling the way in which the ink is presented for fixation to the polymer substrate. The image receiver layer retains the ink droplets in the desired position and prevents bleeding of the ink, but does not necessarily otherwise modify the fixing reaction of the ink's reactive components onto the polymer surface. In cases wherein the image receiver layer does modify the fixing reaction of the ink's reactive components onto the polymer surface, the modification is preferably an enhancement of the fixing reaction, for example, an increase in the efficiency, rate, or bond strength of the fixing reaction.

The image receiver layer can be applied to a porous, semi-porous, or non-porous polymer substrate such as, but not limited to, hydroxyethylmethacrylate (HEMA) homopolymers or copolymers, polymethylmethacrylate, glass, fluorosilicone acrylate, silicone, silicone acrylate, polystyrene, butylstyrene, alkylstyrene, glycidol (glycidyl) methacrylate, N,N-dimethylacrylamide, and polyvinylpyrrolidone. Alternatively, the image receiver layer can be applied to a prior layer on the polymer substrate. Such a prior layer can be, for example, one or more prior polymer layers, which may include the same polymer or a different polymer as that included in the polymer substrate. The prior layer can be a prior polymer layer that contains a coloring agent (for example, a dye or an opaque pigment, such as titanium dioxide). An image can be printed, directly or indirectly, by transferring ink to the prior layer, whereby the image receiver layer holds the ink in place and prevents bleeding of the ink, thus enhancing the image quality upon the prior layer (for example, by improving the final visibility of the fixed ink against an opaque pigment background).

The image receiver layer is applied in a thin layer, such as a layer of between about 0.1 micrometers to about 200 micrometers, or between about 0.1 micrometers to about 150 micrometers, or between about 0.1 micrometers to about 100 micrometers, or between about 0.1 micrometers to about 50 micrometers, or between about 0.1 micrometer to about 20 micrometers. Preferably, the image receiver layer is applied in a layer of between about 0.1 micrometer to about 20 micrometers. The image receiver layer can cover the entire area or only partial areas of the polymer substrate, preferably in areas wherein an image is to be printed, such as, but not limited to, a circular or annular area wherein an image of an iris is to be printed on a contact lens. The image receiver layer can be applied to the polymer substrate by any suitable means, such as, but not limited to, direct coating (for example, by application using a brush, swab, pipette, or sponge), application of droplets or microdroplets (for example, by application using an aerosol spray or an ink jet printer), soaking, impregnation, spin coating, dip coating, curtain coating, or pad printing.

The image receiver layer composition preferably has a viscosity and a surface tension suitable for the chosen method of application and compatible with the chosen reactive dye inks. One example of an image receiver layer composition suitable for application by direct coating (for example, by means of a pipette) or by soaking is a solution of 10% ViviPrint™ 121 (a neutralized poly(vinylpyrrolidone/dimethylamino-propylmethacrylamide) copolymer, CAS number 175893-71-1, supplied as a 10% in water composition with a viscosity of between about 7 to about 23 centipoises at about 25 degrees Celsius, a nominal molecular weight of about $1.05 \times 10^6$ grams per mole, and a glass transition temperature (Tg) of about 184 degrees Celsius) (product ID 72417D, International Specialty Products, 1361 Alps Road, Wayne, N.J. 07470) in industrial methylated spirits (IMS) having a viscosity of about 5.18 centipoises and a surface tension of about 25.5 dynes per centimeter. Another example of an image receiver layer composition suitable for application by direct coating or soaking is a solution of 10% ViviPrint™ 121 in water having a viscosity of about 30.5 centipoises and a surface tension of about 40.0 dynes per centimeter. A third example of an image receiver layer composition suitable for application by direct coating or soaking is a solution of 10% ViviPrint™ 121 in water containing 3.6% sodium hydroxide having a viscosity of about 4.54 centipoises and a surface tension of about 35.5 dynes per centimeter. A fourth example of an image receiver layer composition suitable for application by direct coating or soaking is a solution of 5.3% PVP K30 (polyvinylpyrrolidone supplied as a hygroscopic, amorphous white powder with a viscosity (for a 5% solution) of about 3 centipoises at about 25 degrees Celsius, a nominal molecular weight of about $60 \times 10^3$ grams per mole, and a glass transition temperature (Tg) of about 163 degrees Celsius) (International Specialty Products, Wayne, N.J.) in water containing 5.3% sodium phosphate having a viscosity of about 3.37 centipoises and a surface tension of about 55.5 dynes per centimeter. Another source for PVP K30 (also known as Povidone or PVP, CAS number 9003-39-8, polyvinylpyrrolidone with an average molecular weight of about 29,000) is catalogue number 23,425-7 (Sigma-Aldrich 2003–2004 catalogue, P. O Box 2060, Milwaukee, Wis.). These above examples and similar compositions can also be applied in microdroplets, for example, by ink jet printing or as an aerosol. Image receiver layer compositions with viscosities greater than about 20 centipoises may need a heated print head to reduce the composition viscosity to a range suitable for current ink jet technologies (between about 15 to about 20 centipoises). In another example, an image layer composition suitable for application by pad transfer printing is preferably formulated with a viscosity of between about 5000 to about 50,000 centipoises. After application, the image receiver layer optionally undergoes a drying process, for example by air-drying, or by exposure to low humidity conditions, or by exposure to gentle heat (such as from room temperature to about 90 degrees Celsius), in order to increase its absorbency for ink.

The image receiver layer preferably is compatible with the relative hydrophilicity or hydrophobicity of the solvent or other carrier components with which the ink is formulated. The image receiver layer preferably is capable of absorbing the solvent or other carrier components (such as, but not limited to, organic or aqueous solvents or co-solvents, humectants, surfactants, or diluents) with which the ink is formulated, and in this manner reduces migration or bleeding of the ink. Preferably, the image receiving layer is highly absorbent, able to absorb at least 5%, and more preferably at least 10%, of the image receiving layer's dry weight of the ink's solvent or other carrier compounds. Non-limiting examples of synthetic materials that may be suited to an image receiver layer include highly absorbent polymers such as polyvinylpyrrolidones, polyacrylamides, polyacrylates, and their homopolymers and copolymers (for example, a poly(vinylpyrrolidone/dimethylaminopropylmethacrylamide) copolymer). Examples of naturally derived materials that may be suited to an image receiver layer include proteinaceous materials such as, but not limited to, gelatin, collagen, albumin (for example, egg albumin or serum albumin), casein, and plant gluten proteins, and carbohydrate based materials such as cellulose or starch; synthetic or semi-synthetic homologues of such naturally derived materials may also be suitable. For example, where the ink to be used is water based, the image receiver layer is preferably compatible with water and capable of high water absorbency without itself becoming dissolved; an example of an image receiver layer that is compatible with a water based ink is polyvinylpyrrolidone, which can have a water absorptivity of between about 5% to about 35% water, or about 17% water at a relative humidity of 60% and at 20 degrees Celsius.

The image receiver layer preferably also functions to attract or associate with the ink colorants (such as reactive components) and thus hold these colorants in place and prevent bleeding. Preferably, this attraction or association should not be so strong as to inhibit transfer of the colorant from and through the image receiver layer to the polymer substrate for fixation. For example, polyvinylpyrrolidone is characterized by high polarity and an ability to hydrogen bond with active hydrogen donors (such as phenols or carboxylic acids) or anionic compounds, which may aid in attracting or associating with the ink colorants.

The composition of the image receiver layer is such that it will not substantially adversely react with the reactive components used in the ink, and thus does not substantially inhibit the fixing reaction of the reactive component onto the polymer substrate. For example, an image receiver layer, suitable for use with an ink that is fixed by a reaction involving displacement of a leaving group, preferably does not itself contain such displaceable leaving groups. In another example, an image receiver layer, suitable for use with an ink including components that react with reactive hydroxyl, amine, or thiol groups of the polymer substrate, preferably does not itself contain reactive hydroxyl, amine, or thiol groups. In another example, an image receiver layer, suitable for use with an ink that is fixed by a reaction involving base-catalysis (such as base-catalyzed opening of an epoxide ring, base-catalyzed solvolysis of esters or ethers, or base-catalyzed elimination), preferably does not itself contain such base-reactive groups. The image receiver layer preferably also does not substantially adversely react with (for example, substantially corrode or weaken) the polymer substrate.

The image receiver layer can form a discrete layer on the polymer substrate or can penetrate, wholly or partially, the polymer substrate. The image receiver layer can optionally have the ability to swell the polymer substrate sufficiently to aid in the transfer of the ink's reactive component onto or into the polymer substrate. Preferably, the image receiver layer should not swell the polymer substrate to an undesirable extent (for example, where oversaturation of the polymer substrate by the image receiver layer inhibits ink transfer or ink fixation, or where swelling of the polymer substrate causes distortion of the lens shape). One example of an image receiver layer composition that is capable of swelling a polymer substrate is a ViviPrint™ 121 or PVP K30 composition that includes a short chain alkyl alcohol (such as, but not limited to, methanol, ethanol, n-propanol, or iso-propanol), to be used with a hydroxyethylmethacrylate-based (HEMA-based) polymer substrate, such as a HEMA-based soft contact lens.

The image receiver layer may be non-transiently incorporated into or onto the polymer substrate, or may be temporary. A non-transient image receiver layer is one that is not substantially removed from the polymer substrate by the normal post-fixation treatment processes, such as lens hydration and sterilization. A non-transient image receiver layer can include an image receiver layer that is non-transiently bonded to the polymer substrate, or an image receiver layer that is non-transiently incorporated within the polymer substrate (for example, copolymerized within the polymer substrate). A temporary image receiver layer is preferably substantially or completely removable from the polymer substrate, for example, by washing with warm or hot water, exposure to steam, or by washing with base solution. More preferably, a temporary image receiver layer is conveniently removable during the normal post-fixation treatment processes. For example, in the manufacture of HEMA-based soft contact lenses, lenses may be hydrated by placing them in an aqueous solution of 0.5% sodium bicarbonate containing 0.005% surfactant, heating the solution to about 50 degrees Celsius, and maintaining the temperature between about 50 to about 60 degrees Celsius for about 30 minutes. HEMA-based soft contact lenses may be sterilized by placing in vials containing a 0.9% aqueous sodium chloride solution containing 0.015% sodium bicarbonate and 0.005% surfactant, capping and crimping the vials, placing the vials in an autoclave, and steam-sterilizing the lenses for about 25 minutes at about 121 degrees Celsius.

Use of the image receiver layer is preferably compatible with other treatments of the polymer substrate that occur prior to, during, or after printing of the image. For example, it may be desirable to treat the polymer substrate with an activating substance, such as, but not limited to, a base (for example, sodium hydroxide, sodium carbonate, or sodium phosphate) in order to activate the polymer substrate or to catalyze the fixing reaction between the polymer substrate and the reactive components of the ink. In such a case, the image receiver layer is preferably compatible with the base treatment and will not adversely react with the reactive components used in the ink. Preferably, the image receiver layer may be applied prior to, after, or simultaneously (for example, as a single solution containing both the image receiver layer composition and the base treatment composition) with the base treatment. An example of a single solution containing both the image receiver layer composition and the base treatment composition is PVP K30 combined at up to 5% with a 5% solution of sodium phosphate aqueous solution. Another example of base compatibility is ViviPrint™ 121, which may be added to sodium hydroxide solutions (although not to sodium phosphate solutions).

Optionally, the image receiver layer composition may be added to an ink, either a stand-alone ink to apply the image receiver layer prior to printing with an ink containing a reactive dye, or an ink containing a reactive dye. The viscosity of such an image receiver layer/ink combination must be within the range suitable to the requirements of the printing process, for example, within an acceptable viscosity range for an ink jet print head where the image is applied by ink jet printing.

IX Method of Using Pre-Treatment Processes and Image Receiver Layer in Making a Lens The present invention also includes a method of making an article of manufacture that includes a polymer substrate and a digitally encoded image made with ink, wherein the polymer substrate forms a lens, including subjecting the polymer substrate to a pre-treatment process that precedes the application of the digitally encoded image to the polymer substrate. The pre-treatment process results in an enhanced image quality of the digitally encoded image.

The method may include pretreating a polymer substrate, such as a lens, on which an image is to be printed, prior to the printing process in order to improve the quality of the image, the quality of the printed polymer substrate, or both. A suitable pre-treatment process may include one or more physical or chemical modifications of the polymer substrate. Formation of a lens from the polymer substrate may occur prior to, during, or after, one or more pre-treatment processes. Physical modifications may include, but are not limited to, etching, cutting, burning, heating, cooling, grinding, buffing, polishing, texturing, engraving, scribing, permeabilizing, and other mechanical or non-mechanical treatments, which may roughen or smoothen the polymer substrate's surface. Physical modifications may be made by any suitable means. Chemical modifications may include, but are not limited to, chemical cleaning; chemical texture modifications (for example, etching, texturing, permeabilizing, smoothening, polishing, or combinations thereof); chemical or electrochemical activation or creation of reactive groups on or within the polymer substrate (for example, surface activation or ionization by treatment with high voltage, flame, ozone, corona, plasma, or combinations thereof), chemical coating, and treatment with acid, base, oxidizer, reducer, solvent, diluent, monomer, co-monomer, polymer, initiator, crosslinker, inhibitor, or other chemicals including reactive or non-reactive components of the ink used in printing the image.

The method may include the use of an image receiver layer during the printing process to enhance image resolution and improve overall image quality. The image receiver layer includes a chemical coating that is applied in a layer, such as a thin layer, to the surface of the polymer substrate, which may form a lens. Formation of a lens from the polymer substrate may occur prior to, during, or after, application of the image receiver layer to the polymer substrate. The polymer substrate can be porous, semi-porous, non-porous, or a combination thereof. An image, such as a digitally encoded image, is printed, directly or indirectly (for example, directly by an ink jet printer) by transferring ink onto or into the image receiver layer. Formation of a lens from the polymer substrate may occur prior to, during, or after, printing of a digitally encoded image.

The image receiver layer serves to stabilize the ink by retaining the ink in discrete droplets or "dots" in the desired location within the image. The ink's reactive components (such as a polymerizable monomer or a reactive dye) contact the polymer substrate through the image receiver layer and, upon exposure to appropriate conditions, undergo a fixing reaction that fixes the reactive component non-transiently to the polymer substrate. The fixed reactive component is non-transiently fixed to the polymer substrate in that the fixed reactive component is not substantially removable from the polymer substrate by the normal post-fixation processes (such as lens hydration and sterilization) or during normal use (such as normal wearing of a contact lens by a subject). The image receiver layer enhances the print quality by controlling the way in which the ink is presented for fixation to the polymer substrate. The image receiver layer retains the ink droplets in the desired position and prevents bleeding of the ink, but does not necessarily otherwise modify the fixing reaction of the ink's reactive components onto the polymer surface.

The image receiver layer can be applied to a porous, semi-porous, or non-porous polymer substrate such as, but not limited to, hydroxyethylmethacrylate (HEMA) homopolymers or copolymers, polymethylmethacrylate, glass, fluorosilicone acrylate, silicone, silicone acrylate, polystyrene, butylstyrene, alkylstyrene, glycidol(glycidyl) methacrylate, N,N-dimethylacrylamide, and polyvinylpyrrolidone. Alternatively, the image receiver layer can be applied to a prior layer on the polymer substrate. Such a prior layer can be, for example, one or more prior polymer layers, which may include the same polymer or a different polymer as that included in the polymer substrate. The prior layer can be a prior polymer layer that contains a coloring agent (for example, a dye or an opaque pigment, such as titanium dioxide). An image can be printed, directly or indirectly, by transferring ink to the prior layer, whereby the image receiver layer holds the ink in place and prevents bleeding of the ink, thus enhancing the image quality upon the prior layer.

The image receiver layer is applied in a thin layer, such as a layer of between about 0.1 micrometers to about 200 micrometers, or between about 0.1 micrometers to about 150 micrometers, or between about 0.1 micrometers to about 100 micrometers, or between about 0.1 micrometers to about 50 micrometers, or between about 0.1 micrometer to about 20 micrometers. Preferably, the image receiver layer is applied in a layer of between about 0.1 micrometer to about 20 micrometers. The image receiver layer can cover the entire area or only partial areas of the polymer substrate, preferably in areas wherein an image is to be printed, such as, but not limited to, a circular or annular area wherein an image of an iris is to be printed on a contact lens. The image receiver layer can be applied to the polymer substrate by any suitable means, such as, but not limited to, direct coating (for example, by application using a brush, swab, pipette, or sponge), application of droplets or microdroplets (for example, by application using an aerosol spray or an ink jet printer), soaking, impregnation, spin coating, dip coating, curtain coating, or pad printing.

The image receiver layer composition preferably has a viscosity and a surface tension suitable for the chosen method of application and compatible with the chosen reactive dye inks. For example, image receiver layer compositions with a viscosity of between about 15 to about 20 centipoises at room temperature can also be applied in microdroplets at room temperature, for example, by ink jet printing or as an aerosol. Image receiver layer compositions with viscosities greater than about 20 centipoises may need a heated print head to reduce the composition viscosity to a range suitable for current ink jet technologies (between about 15 to about 20 centipoises). In another example, an image layer composition suitable for application by pad transfer printing is preferably formulated with a viscosity of between about 5000 to about 50,000 centipoises. After application, the image receiver layer optionally undergoes a drying process, for example by air-drying, or by exposure to low humidity conditions, or by exposure to gentle heat (such as from room temperature to about 90 degrees Celsius), in order to increase its absorbency for ink.

The image receiver layer preferably is compatible with the relative hydrophilicity or hydrophobicity of the solvent or other carrier components with which the ink is formulated. The image receiver layer preferably is capable of absorbing the solvent or other carrier components with which the ink is formulated, and in this manner reduces migration or bleeding of the ink. Preferably, the image receiving layer is highly absorbent, able to absorb at least 5%, and more preferably at least 10%, of the image receiving layer's dry weight of the ink's solvent or other carrier compounds. Non-limiting examples of synthetic materials that may be suited to an image receiver layer include highly absorbent polymers such as polyvinylpyrrolidones, polyacrylamides, polyacrylates, and their homopolymers and copolymers (for example, a poly(vinylpyrrolidone/dimethylaminopropylmethacrylamide) copolymer). Examples of naturally derived materials that may be suited to an image receiver layer include proteinaceous materials such as, but not limited to, gelatin, collagen, albumin (for example, egg albumin or serum albumin), casein, and plant gluten proteins, and carbohydrate based materials such as cellulose or starch; synthetic or semi-synthetic homologues of such naturally derived materials may also be suitable.

The image receiver layer preferably also functions to attract or associate with the ink colorants (such as reactive components) and thus hold these colorants in place and prevent bleeding. Preferably, this attraction or association should not be so strong as to inhibit transfer of the colorant from and through the image receiver layer to the polymer substrate for fixation.

The composition of the image receiver layer is such that it will not substantially adversely react with the reactive components used in the ink, and thus does not substantially inhibit the fixing reaction of the reactive component onto the polymer substrate. The image receiver layer preferably also does not substantially adversely react with (for example, substantially corrode or weaken) the polymer substrate.

The image receiver layer can form a discrete layer on the polymer substrate or can penetrate, wholly or partially, the polymer substrate. The image receiver layer can optionally have the ability to swell the polymer substrate sufficiently to aid in the transfer of the ink's reactive component onto or into the polymer substrate. Preferably, the image receiver layer should not swell the polymer substrate to an undesirable extent.

The image receiver layer may be non-transiently incorporated into or onto the polymer substrate, or may be temporary. A non-transient image receiver layer is one that is not substantially removed from the polymer substrate by the normal post-fixation treatment processes, such as lens hydration and sterilization. A non-transient image receiver layer can include an image receiver layer that is non-transiently bonded to the polymer substrate, or an image receiver layer that is non-transiently incorporated within the polymer substrate (for example, copolymerized within the polymer substrate). A temporary image receiver layer is preferably substantially or completely removable from the polymer substrate, for example, by washing with warm or hot water, exposure to steam, or by washing with base solution. More preferably, a temporary image receiver layer is conveniently removable during the normal post-fixation treatment processes.

Use of the image receiver layer is preferably compatible with other treatments of the polymer substrate that occur prior to, during, or after printing of the image. For example, it may be desirable to treat the polymer substrate with an activating substance, such as, but not limited to, a base (for example, sodium hydroxide, sodium carbonate, or sodium phosphate) in order to activate the polymer substrate or to catalyze the fixing reaction between the polymer substrate and the reactive components of the ink. In such a case, the image receiver layer is preferably compatible with the base treatment and will not adversely react with the reactive components used in the ink. Preferably, the image receiver layer may be applied prior to, after, or simultaneously (for example, as a single solution containing both the image receiver layer composition and the base treatment composition) with the base treatment.

Optionally, the image receiver layer composition may be added to an ink, either a stand-alone ink to apply the image receiver layer prior to printing with an ink containing a reactive dye, or an ink containing a reactive dye. The viscosity of such an image receiver layer/ink combination must be within the range suitable to the requirements of the printing process, for example, within an acceptable viscosity range for an ink jet print head where the image is applied by ink jet printing.

X Separation of Ink Reactive Components

The present invention also includes an article of manufacture, including a polymer substrate and a digitally encoded image made with ink that includes reactive components, wherein the polymer substrate forms a lens and wherein the digitally encoded image is applied to the polymer substrate by ink jet printing. Each reactive component is stored in an ink jet printer cartridge. The reactive components may be stored in separate ink jet printer cartridges.

When using an ink that includes one or more reactive components, it is generally undesirable for such a reactive component to decrease the ink's stability or shelf-life. For example, an ink that includes polymerizable monomers or polymers (such as hydroxyethylmethacrylate) or crosslinking agents (such as hexamethyldiisocyanate) in its formulation may, when stored over time, undergo polymerization or crosslinking, which is undesirable during storage. One solution to this is to compartmentalize the reactive component or components and thus retard or prevent such undesirable reactions from occurring. Such compartmentalization would require formulation of the separate components in such a manner as to ensure no undesirable side reactions (for example, side reactions between a crosslinking agent and a polymer). For example, it may be desirable to separately store the polymerization initiator from the other components of a polymerization reaction (such as polymerizable monomers and crosslinking agents). Where the printing process uses an ink jet printer, the reactive components may be stored in separate or individual cartridges, thereby increasing the stability and shelf-life of the ink. The reactive components as well as the other components of the ink may then be applied as required to the substrate on which the image is to be printed. For example, aziridine may be formulated with a pigment and stored in one cartridge, while suitably formulated methacrylic acid may be stored in a separate cartridge, thus increasing the shelf life of both formulations relative to a single formulation stored in a single cartridge. The two formulations may be ink jetted separately and sequentially, in order for the polymerization reaction to begin only after ink jet application of both formulations to the same spot.

EXAMPLES

Example 1

Preparation of Inks

This example provides ink compositions used to make lenses that include a digitally encoded image. Four ink preparations are preferred for use in printing devices, although more or less can be used.

The ink preparations include a base ink formulation that include the following: monomer (HEMA), initiator (BME), crosslinker (EGDMA), pigment #1, diluent (glycerine), solvent (isopropanol), optional pigment #2 (titanium oxide), dispersant (polyvinyl alcohol), humectant (ethylene glycol), co-monomer (methacrylic acid), inhibitor (MEHQ), antikogating agent (methyl propanediol), and antioxidant (alkylated hydroquinone). The concentration of these constituents are as appropriate for making a lens of desired characteristics and physical properties. Pigment #1 can be any ink or combination of inks to provide a desired color. The preferred colors for four ink formulations are A1: Black; A2: Magenta, A3: Yellow and A4: Cyan. Appropriate inks for A1, A2, A3, and A4 are described in U.S. Pat. No. 5,176,745, U.S. Pat. No. 4,889,520, U.S. Pat. No. 5,658,376, U.S. Pat. No. 4,793,264, U.S. Pat. No. 5,389,132, U.S. Pat. No. 5,271,765, U.S. Pat. No. 5,062,892 and U.S. Pat. No. 5,372,852.

A preferred monomer mixture for making clear lenses is designate A5, and has the following formulation: monomer (HEMA), monomer (EOEMA), monomer (MAA), crosslinker (EGDMA), initiator (Vazo-64), inhibitor (MEHQ) and diluent (glycerine). The concentration of these constituents are as appropriate for making a lens of desired characteristics and physical properties.

When inks are used in jet printing devices, the ink is preferably water based or monomer based (U.S. Pat. No. 5,658,376). The ink is preferably soluble in water and an organic solvent and preferably includes a disperse dye or pigment. A water soluble polymer such as polyvinyl alcohol and a dispersant such as polyvinylpyrrolidone are preferred. A surfactant is preferably provided, such as polyoxyethylene alkyl ether or polyoxyethylene alkylphenyl ether having an aminic acid group. The ink preferably includes a surfactant, such as between about 0.3% and about 1% by weight. The ink preferably includes an antiseptic agent such as Proxel (Zeneca, U.K.). The ink preferably has a pH of between about 7 and about 10 and a viscosity at about 25 C of between about 2 mPas and about 6 mPas. Antioxidants, such as low corrosion or antioxidant agents, such as alkylated hydroquinone can also be included, preferably between about 0.1% and about 0.5% by weight (U.S. Pat. No. 5,389,132). An ink can also include a humectant such as 1,3-dioxane-5,5-dimethanol, 2-methyl-1,3-propane diol, ethylene glycol or diethylene glycol. When used in printing, the driving frequency is preferably between about 3 kHz and about 8 kHz (see generally, U.S. Pat. No. 5,658,376). Preferred ink properties include a surface tension of between about 20 dynes/cm and about 70 dynes/cm and a viscosity between about 1.0 cp and about 2.0 cp (U.S. Pat. No. 5,271,765).

Example 2

Printing Methodologies—Surfaces and Laminates

Figure 11:
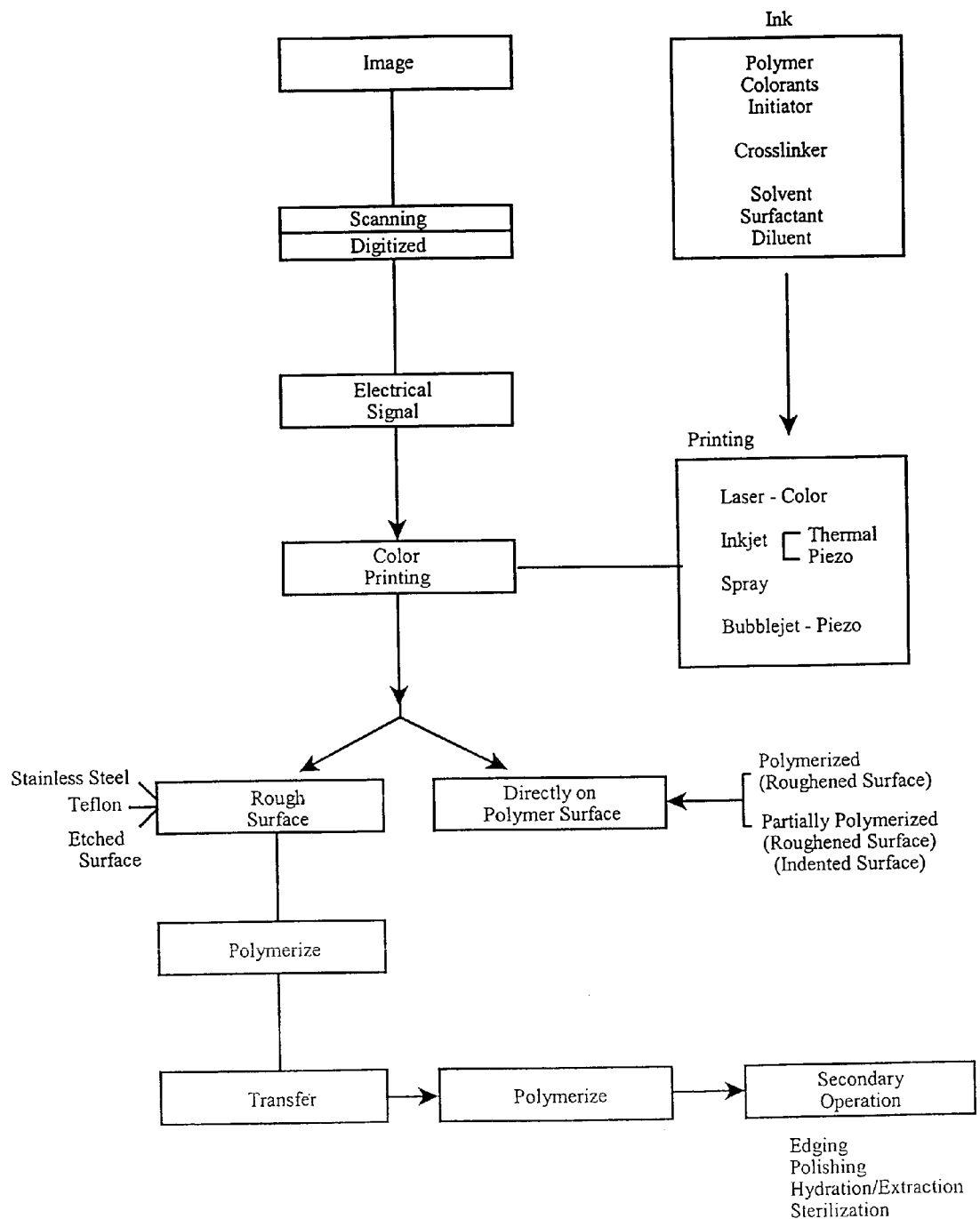
FIG. 11 depicts schematic diagram of a variety of methods for printing digitally encoded images in conjunction with the present invention.

This example, as depicted in FIG. 1 and FIG. 11, provides a methodology for printing digitally encoded images. An image, such as of an iris, is scanned into a digital form using appropriate hardware and software to provide a digitally encoded image. The digitally encoded image is stored in an appropriate storage medium, such as an electronic medium, such as in a database. A selected image is sent via an electronic signal to a printing device, such as an inkjet printing device, a bubble jet printing device or a laser printing device, through a processing unit. The printing device preferably includes ink formulations A1, A2, A3 and A4 in separate compartments, such as in a printing cassette (Formulation A6), and optionally formulation A5 in a separate compartment or in a separate cassette. The printing device, under the direction of a processing unit, prints the digitally encoded image by mixing and dispensing, or dispensing individually, the inks of formulation A6 onto a surface, such as a polymerized polymer, a partially polymerized polymer or an unpolymerized polymer. After a printing step or other time during the manufacture process, the structure can be subjected to energy, such as vibrational energy, that can smear the printed digital image, particularly when in an unpolymerized or partially polymerized state, such that the resulting printed digital image has a natural appearance. This process can be repeated a plurality of times using the same or different digitally encoded image. The surface can be maintained in the same orientation or rotated between printing steps. The printed digitally encoded image can be polymerized or partially polymerized after each printing step or after all printing steps are completed.

Figure 12:
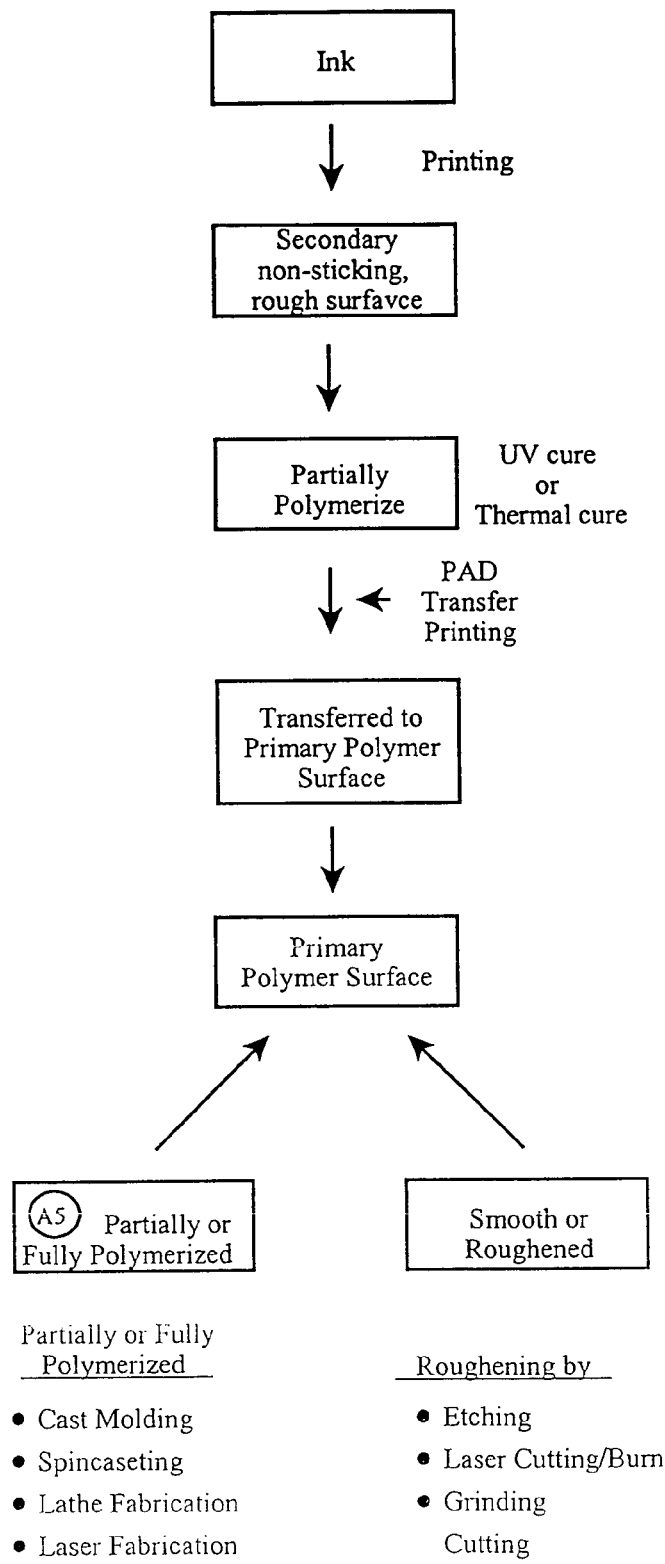
FIG. 12 depicts schematic diagrams of a variety of methods of making polymers having printed digitally encoded images. A5 denotes a monomer mix for clear lens.

In the alternative, as depicted in FIG. 12 a digitally encoded image can be printed on a structure designed to transfer a printed digitally encoded image to a surface. Such structures known in the art include pad transfer devices. The digitally encoded image can be printed onto the structure and polymerized or partially polymerized prior to the printed digitally encoded image being transferred to a surface.

The surface that the digitally encoded surface is printed upon, or transferred to, can be partially polymerized or fully polymerized, and can be rough or smooth. Roughened surfaces are obtained by methods known in the art, such as etching, laser cutting or burning, grinding or cutting. The surfaces can be made by appropriate methods, such as by cast molding, spin casting lathe fabrication or laser fabrication.

Figure 13:
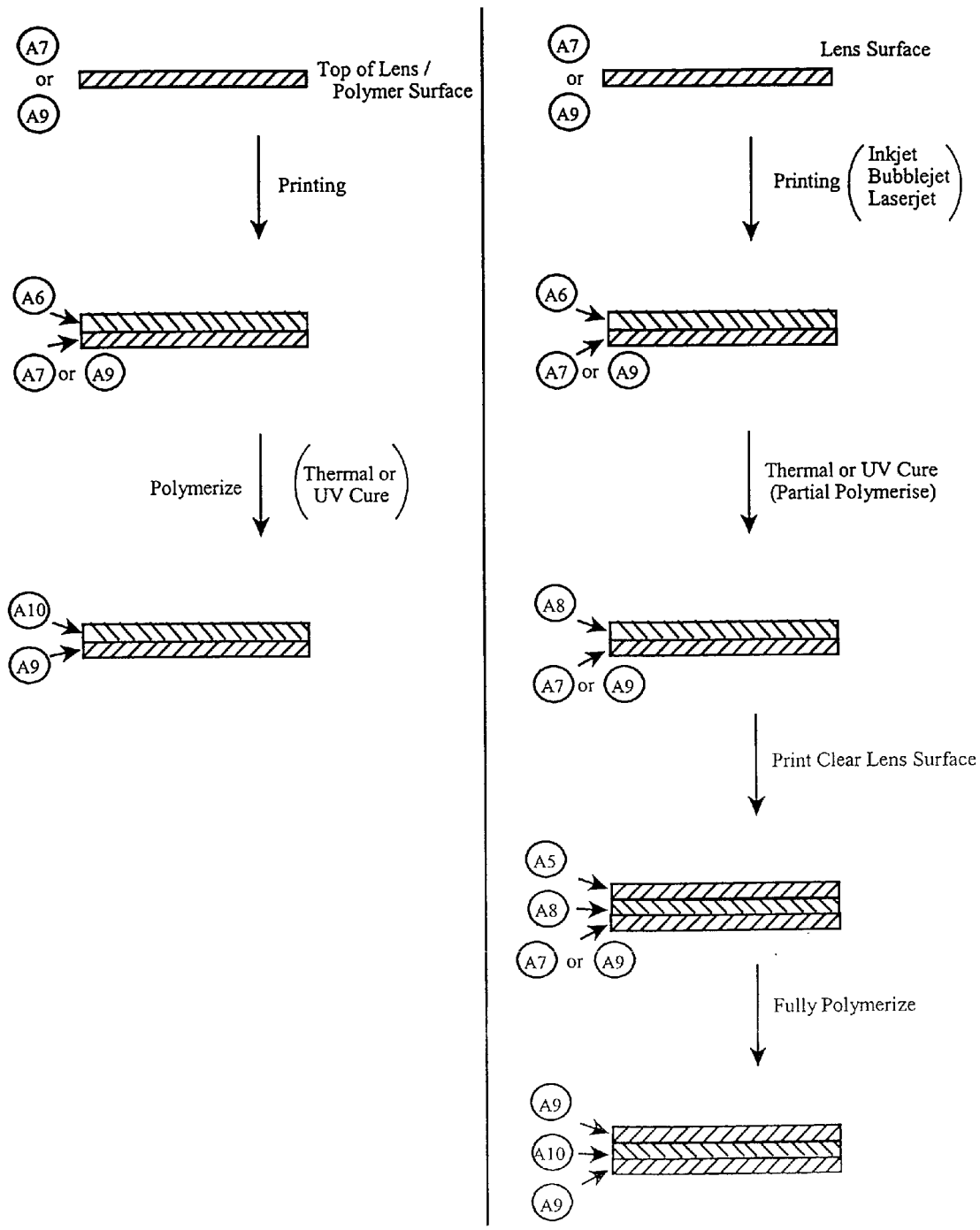
FIG. 13 depicts diagram of laminate digitally encoded images within a structure of the present invention. A5 denotes a monomer mix for clear lens; A6 denotes color ink coat/layer of black, magenta, yellow and cyan; A7 denotes partially polymerized A5; A8 denotes partially polymerized A6; A9 denotes fully polymerized clear lens; A10 denotes fully polymerized A6.

Laminate structures that include printed digitally encoded images can be made by forming a surface with printed digitally encoded image on such surface. Additional monomer, such as formulation A5, can be placed on the printed digitally encoded image and polymerized to form a laminate structure that includes a first polymer layer (preferably clear), a printed digitally encoded image, and a second polymer layer (preferably clear). In making these laminate structures, the first polymer layer can be partially or fully polymerized prior to printing of the digitally encoded image. This structure in turn can be partially or fully polymerized. The monomer for the second polymer layer is then dispensed, and this structure is then partially or fully polymerized (see, for example, FIG. 2 and FIG. 13).

Example 3

Printing Methods—within a Well or Indentation on a Surface

Figure 14:
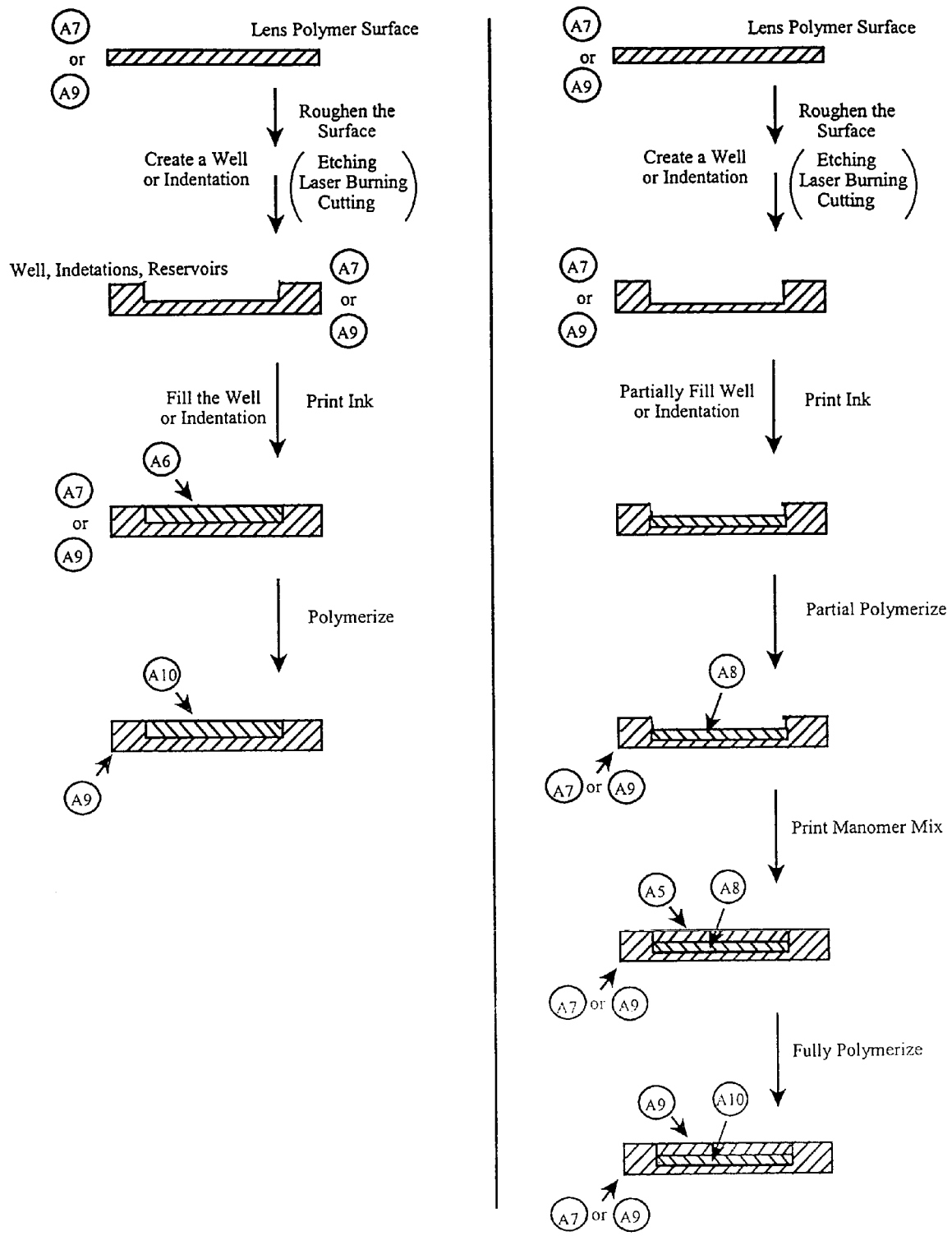
FIG. 14 depicts printing methods within a well on a surface of the present invention. A5 denotes a monomer mix for clear lens; A6 denotes color ink coat/layer of black, magenta, yellow and cyan; A7 denotes partially polymerized A5; A8 denotes partially polymerized A6; A9 denotes fully polymerized clear lens.

This example, as depicted in FIG. 14 provides methods of making lenses that include a digitally encoded image, wherein the digitally encoded image is provided in a well structure(s) or an indentation(s). In this aspect of the present invention, a structure including a surface of fully polymerized or partially polymerized polymer is provided. A well or indentation is created on the structure that corresponds at least in part to the size and shape of the digitally encoded image to be printed. The well can be larger in size or of a different shape than the digitally encoded image to be printed. The methods descried in Example 2 are used to print the digitally encoded image on the surface of the well. A laminate structure within the well can also be made following the methods described in Example 2.

Example 4

Finishing of Lenses

The structure resulting for these methods can be finished using secondary operations known in the art as they are needed, such as, for example, cutting, grinding, edging, polishing or the like to form a lens of desired optical, cosmetic or functional quality or characteristics. For soft contact lenses, the dry lenses may be hydrated using conventional methods to form a finished product. The finished lenses can be packaged in any appropriate packaging as they are known in the art, such as vials, tubes, blisters or other structures. The packaging can include appropriate solutions and instructions for use or description of the product and its care.

Example 5

Polyfunctional Aziridine as a Crosslinker

The present invention provides additional bonding agents to improve adhesion of inks such as pigments to polymers, such as lenses. This example provides improved adhesion of pigments to a polymer lens by using a bonding agent that is believed to form a cross linked network. The crosslinked network is believed to be formed by exposing a polymer having a carboxyl group with about one percent to about five percent, preferably two percent, of a compound containing protonated aziridine groups for example the polyfunctional aziridine crosslinker IONAC® PFAZ®-322 supplied by Sybron Chemicals (Birmingham, N.J.) (See, for example, Sybron Chemicals Inc. product sheet for IONAC→PFAZ→322 Polyfunctional Aziridine, which is incorporated by reference herein; IONAC® PFAZ®-322 is now supplied by Bayer·Corporation, Pittsburgh, Pa.) Reactions that protonate aziridine rings is believed to allow binding between the protonated aziridine group and an oxygen within a carboxyl group thereby crosslinking the polymer and enabling stabilization of localization of a dye such as a pigmented dyes. Typically, active hydrogens eligible to participate in cross linking with aziridine include: carboxyl, hydroxyl, primary or secondary amine, primary or secondary amide and thiol or mercaptan. Not intending to be limited to a mode of action, the resulting crosslinked network may entrap the dye such as a pigmented dye.

The purpose of this example is to evaluate the mechanical bonding of an ink to a polymer and establishes the stabilization of the location of a pigmented dye in a polymer. Various formulations used in these examples are provided as follows:

Reagents

| Cyan ink, Formula TD 70A | | |
|---|---|---|
| Materials | Percent | Range |
| Cyan dispersion X17802 | 20 | 10–30 |
| White dispersion X6985-185 | 7 | 5–15 |
| 30% Elvacite 2008 in EB Acetate | 9 | 5–15 |
| 30% Epon 2004 in EB Acetate | 9 | 5–15 |
| Cyclohexanone | 7 | 3–10 |
| EB acetate | 47.2 | 25–50 |
| BYK UV 3500 | 0.8 | 0.1–2 |
| Total | 100 | |

| Cyan dispersion X17802 | | |
|---|---|---|
| Material | Percent | Range |
| Diacetone alcohol | 20.77 | 10–30 |
| 50% DM55 resin in DAA | 20.77 | 10–30 |
| Efka 47 | 35.61 | 20–50 |
| Solsperse 5000 | 2.08 | 0.5–10 |
| Irgalite Blue LGE | 20.77 | 10–30 |
| Total | 100 | |

| | |
|---|---|
| DAA | Diacetone alcohol solvent |
| DM55 | Acrylic resin made by Rhom & Hass. Resin is used in the Dispersion to provide surface for the pigment and dispersant particles to anchor. Resin also increase viscosity needed in Milling process, and wet the pigment. |
| Efka 47 | A polymeric dispersant with pigment affinity groups, made by Lubrizol. The main purpose of dispersant is to disperse the pigment, separate them so they will not agglomerate together. Another purpose is to wet the pigment. |
| Solsperse 5000 | A synergist made by Avecia (former Zeneca). Synergist is used in a Pigment dispersion to help stabilize the pigment. It serves as a bridge to connect between the pigment particle and the main polymeric Dispersant, in this case Efka 47. |
| Irgalite Blue LGE | A phthalocyanine blue 15:3 pigment, made by Ciba Geigy, Inc. This Product is no longer commercially available. A substitution pigment is Irgalite Blue NGA, also a phthalocyanine 15:3 pigment. |
| BYK UV 3500 | A surface additive made by BYK Chemie. This additive is to help the ink wet the non porous substrates such as glass, vinyl, metal, plastic, PVC, and the like and it helps the ink to flow well inside the print head. |

| White Pigment Dispersion X6985-185 | | |
|---|---|---|
| Material | Percent | Range |
| Diacetone alcohol | 21.41 | 10–30 |
| 50% DM55 resin in Diacetone Alcohol | 35.66 | 20–50 |
| Disperbyk 110 | 4.13 | 1–10 |
| White pigment Tioxide Comet 300 | 38.80 | 30–60 |
| Total | 100 | |

| | |
|---|---|
| Disperbyk 110 | A dispersing agent copolymer made by BYK Chemie. |
| Tioxide Comet 300 | A white pigment, chemical index White 6, made by TIOXIDE company. |

| 30% Elvacite 2008 in Ethylene Glycol Butyl Ether Acetate (EB Acetate) | |
|---|---|
| Ethylene Glycol butyl ether acetate | 70% |
| Elvacite 2008 dry resin | 30% |
| Total | 100 |

Elvacite 2008 Acrylic resin supplied by Ineo Acrylic (Cordova, TN)

| 30% Epon 2004 in Ethylene Glycol butyl ether Acetate (EB Acetate) | |
|---|---|
| EB Acetate | 70% |
| Epon 2004 resin | 30% |
| Total | 100% |

Epon 2004 resin An Epoxy resin made by Shell Chemical.

| Other Reagents | |
|---|---|
| BX-HEMA LLT | A mixture of about 97.8% HEMA, about 0.7% EGDMA and about 1.5% MAA. |
| Ionac PFAZ-322 | A bonding agent, Aziridine type, previously supplied by Sybron, Birmingham, currently supplied by Bayer, Pittsburg PA as PFAZ-322. |

Experiment

Control Formulation A:
1. TD-70A Cyan ink

Experimental Formulation B:
1. TD-70A Cyan ink
2. Ionic® PFAZ®-322 (Sybron Chemicals, Inc., Birmingham, N.J.) 2%

Experimental Formulation C:
1. TD-70A Cyan ink
2. Ionac® PFAZ®-322 (Sybron Chemicals, Inc., Birmingham, N.J.) 2%
3. BX-HEMA LLT 40%

Each formulation was mixed and ink jet printed on HEMA lenses using a Budjet IV printer (Fas-co Encoder, Chandler, Ariz.). in addition, thermal initiators and/or UV initiators of polymerization are contemplated for these formulations to improve adhesion and/or time for polymerization. Digitally encoded images of letters were ink jet printed onto the HEMA lenses. The lenses were cured at 70 degrees Celsius for 16 hours. The lenses were then hydrated and extracted in distilled water at 80 to 90 degrees Celsius for 12 hours. The lenses were vialed and steam sterilized using one, three, and five autoclave cycles. Samples were evaluated for bonding and ink adhesion by finger rubbing after the one, three, and five autoclave cycles.

Summary of Results:
1. The bonding with control formulation was very poor. It rubbed off using a finger rub test.
2. Bonding with the experimental formulations B and C was good using a finger rub test.
3. Cracking in the digitally encoded image made with ink with higher level HEMA was noticeably lower.

Formulations having polyfunctional aziridine Crosslinker such as Ionac® PFAZ®-322 (Sybron Chemicals, Inc., Birmingham, N.J.) with 40% BX-HEMA LLT reduce cracking in the digitally encoded image made with ink and improved ink adhesion to a HEMA lens compared to TD-70A ink alone. Effective mechanical bonding is achievable with polyfunctional aziridine crosslinker.

Example 6

Multifunctional Carbodiimide as a Crosslinker

This example provides improved adhesion of a pigmented dye to polymer lens by using multifunctional carbodiimides as bonding agent. A crosslinked network is believed to be formed by such multifunctional carbodiimides (see, for example, Dow Chemical Company's product description of UCARLNK™ CROSSLINKERS for UCARLNK™XL-29SE Crosslinker, which is incorporated by reference herein). The carbodiimide is believed to cause a reaction between carboxylic acid groups contained in the lens polymer and either a hydroxyl end group or amine end group contained in the dye preparation (see, for example, March, Advanced Organic Chemistry, Second Edition, McGraw-Hill Book Company, New York, in particular pages 363 through 365). Such a crosslinked network is believed to enable entrapment of dyes such as pigmented dye.

An example of a multifunctional carbodiimide usable with the present invention is UCARLNK™ XL-29SE (Dow Chemical Co., Midland, Mich.). In addition low viscosity of UCARLNK™ XL-29SE may provide added benefit when utilizing the ink with an inkjet printer. About 1 to 10 percent by weight UCARLNK™ XL-29SE may be reacted with a carboxylated hydroxyethylmethyl acrylate polymer. The reaction may take place below, at, or above room temperature however elevated temperatures reduce reaction time. The range of temperature may be room temperature to 900° C.

The purpose of this example is to evaluate the bonding of ink to a polymer using UCARLNK™ XL-29SE as a crosslinker and establishes the stabilization of the location of a pigmented dye in a polymer.

Reagents

Various formulations used in these examples are described herein.

Experiment

Control Formulation A:
1. TD-70A Cyan ink

Experimental Formulation B:
1. TD-70A Cyan ink
2. UCARLNK® XL-29SE (Dow Chemicals, Midland, Mich.) 2%

Experimental Formulation C:
1. TD-70A Cyan ink
2 UCARLNK™ XL-29SE (Dow Chemicals, Midland, Mich.) 2%
3. HEMA formulation BX-HEMA LLT 40%

Each formulation was mixed and ink jet printed on HEMA lenses using a Budjet IV printer (Fas-co Encoder, Chandler, Ariz.). In addition, thermal initiators and/or UV initiators of po lymerization are contemplated for these formulations to improve adhesion and/or time for polymerization. Digitally encoded images of letters were ink jet printed onto the HEMA lenses. The lenses were cured at 70 degrees Celsius for 16 hours. The lenses were then hydrated and extracted in distilled water at 80 to 90 degrees Celsius for 12 hours. The lenses were vialed and steam sterilized using one, three, and five autoclave cycles. Samples were evaluated for bonding and ink adhesion by finger rubbing after the one, three, and five autoclave cycles.

Summary of Results:
1. The bonding with control formulation A was very poor. It rubbed off using a finger rub test.
2. Bonding with the experimental formulations B and C was good using a finger rub test.
3. Cracking in the digitally encoded images made with ink with higher level HEMA was noticeably lower.

These results showed that formulations having a multifunctional carbodiimide crosslinkers such as UCARLNK™ XL29SE (Dow Chemicals, Midland, Mich.) with 40% BX-HEMA LL T reduce cracking and improved ink adhesion to a HEMA lens compared to TD-70 ink alone. Effective mechanical bonding is achievable with multifunctional carbodiimide crosslinkers such as UCARLNK™ XL29SE.

Example 7

Titanates and Zirconates as Crosslinkers

In addition to the polyfunctional aziridines and multifunctional carbodiimides discussed in the previous examples, a variety of other bonding agents can also be used in the present invention. Alternatives include, organic titanates and zirconates, such as those distributed by Synetix and DuPont. These organic titanates and zirconates can promote the adhesion of ink of digitized images to polymer surface. Preferred examples are the TYZOR→series of DuPont Chemicals (see for example DuPont Tyzor→Organic Titanates publications, (General Brochure (2001)), (Product Selection Guide—USA (2001)), (Product List—USA (2001)), (Technical Note—Grade Chart (2001)), (Technical Note—Grade Selection Chart (2001)), (Technical Note—Printing Ink Additive (2001)), and (Technical Note—FDA—Food Contact (2001))) and the VERTEC™ series (such as VERTEC™ IA10) of Synetix and ICI Chemical (see, for example www.synetix.com and Material Safety Data Sheets for these products).

For application to the present invention, these compounds may be used alone or in combination with other bonding agents, including cross-linkers, such as polyfunctional aziridines and multifunctional carbodiimides, to improve adhesion. Organic titanates are believed to crosslink ink resin and polymer through reaction with active hydrogen of hydroxyl or carboxyl groups in lens polymers with ink resin. As a result of such cross-linking, adhesion of ink to polymer is improved, as well as heat stability and water or solvent resistance. There are a number of preferred organic titanates commercially available, for example VERTEC™ IA10, VERTEC™ PA12, TYZOR→AA-75, TYZOR→TBT, TYZOR→TPT and TYZOR→BPT.

Generally, organic titanates and zirconates can be used in the finished ink at a concentration between about 1% and about 20%, preferably between about 3% and about 10%, of weight of finished ink. Reaction speed may increase with temperature.

Reagents

Typical inks that can include organic titanates as a crosslinker include:

| | Reagent | % by weight |
|---|---|---|
| A. | TD-70A | 40–80 |
| B. | BX-HEMA LLT | 5–70 |
| C. | VERTEC IA10 | 1–10 |
| D. | Thermal or UV initiator | 0.1–3 |

A. TD-70A is described herein. This reagent should be anhydrous because organic titanates hydrolyze which cause inks to gel.
B. BX-HEMA LLT
C. VERTEC IA10 from Syntix, Oakbrook Terrace, IL
D. Thermal initiator such as benzoyl peroxide (Sigma, St. Louis MO or Aldrich, Milwaukee, WI) or UV initiator such as Irgacure 184 from Ciba Geigy, Basel, Switzerland.

Experimental

Inks including organic titanates, zirconates or both are mixed and ink jet printed on HEMA lens using an appropriate printer such as the Budjet IV printer (Fas-co Encoder, Chandler, Ariz.). The lenses are cured for an appropriate period of time. The lenses are then hydrated and extracted in distilled water at an appropriate temperature for an appropriate time. The lenses are vialed and steam sterilized using one, three, and five autoclave cycles. Samples are evaluated for bonding and ink adhesion by finger rubbing after the one, three, and five autoclave cycles.

Example 8

Ink Jet Printing of Digitally Encoded Images on Lenses Using Reactive Dyes

Reagents

Various formulations used in these examples are described herein.

TD 103A: White pigmented printing ink

| Material | Percent |
| --- | --- |
| TD 103 | 46.7 |
| BX-HEMA LL T | 46.7 |
| IONAC PFAZ 322 | 4.7 |
| Benzoyl Peroxide | 1.9 |
| Total | 100 |

TD103: White solvent based pigment ink

| Material | Percent | Range |
| --- | --- | --- |
| White dispersion X6985–185 | 43.8 | 30–50 |
| 30% Epon 2004 in EB Acetate | 35.4 | 25–45 |
| PM acetate | 9.4 | 5–15 |
| Suresol 150ND | 10.4 | 5–15 |
| BYK UV 3500 | 1.0 | 0.5–2 |
| Total | 100 | |

Viscosity = 8.6 cps, UL, 60 rpm, 25° C.
Surface tension = 26 dyne/cm
(A detailed formulation for White dispersion 6985–185 is given herein such as in Example 5)

TD46: Red (Magenta) Reactive dye ink

| Materials | Percent | Range |
| --- | --- | --- |
| DI water | 71.47 | 60–80 |
| Glycerin | 6.67 | 1–20 |
| 1,3-propandiol | 6.67 | 1–20 |
| Reactive Red .180 | 13.33 | 10–20 |
| Surfynol CT 121 | 0.53 | 0.2–2.0 |
| Triethyl Amine 10% in water | 1.33 | 1–5 |
| Total | 100 | |

Viscosity = 3.5 centipoise, UL, 60 rpm, 25° C. Surface tension = 32 dynes/cm; pH = 8.4.
The ink was filtered through 0.45 micron Nylon filter membrane.
Water = Main vehicle, carrier
Glycerin, 1,3-propandiol = co-solvents
Surfynol CT121 and 10% TEA solution = additive TD47: Yellow Reactive dye ink

| Materials | Percent | Range |
| --- | --- | --- |
| DI water | 69 | 60–80 |
| Glycerin | 10 | 5–20 |
| 1,3-propandiol | 10 | 5–20 |
| Reactive Yellow 15 | 10 | 5–20 |
| Surfynol CT-121 | 0.8 | 0.2–2.0 |
| 10% TEA solution | 0.2 (5 drops) | 0.1–1.0 |
| Total | 100 | |

Viscosity = 3.5 centipoise, UL, 60 rpm, 25° C.; Surface tension = 32 dynes/cm; pH = 7.5
The ink was filtered through 0.45 micron Nylon membrane
Water = main vehicle, main carrier
Glycerin and 1,3-propandiol = co-solvent
Surfynol CT 121 and TEA solution = additive TD92: Black Reactive dye ink

| Materials | Percent | Range |
| --- | --- | --- |
| DI water | 62.8 | 50–70 |
| Versene 100XL | 1 | 0.5–2.0 |
| 2-pyrolidone | 8 | 5–20 |
| Ethylene Glycol | 8 | 5–20 |
| Glycerin | 10 | 5–20 |
| Reactive Black 5 | 10 | 5–20 |
| Surfynol 2502 | 0.2 | 0.1–1.0 |
| Total | 100 | |

Viscosity = 3.1 centipoise, UL, 60 rpm, 25° C.; Surface tension = 31.5 dynes/cm; pH = 6.8
Water = main carrier
Ethylene Glycol, Glycerin, 2-pyrolidone = Co-solvents
Versene 100XL, Surfynol 252 = additive TD 106: Formula TD-106: Blue reactive dye ink

| Material | Percent | Range |
| --- | --- | --- |
| DI water | 17.8 | 10–25 |
| Versene 100XL | 1.0 | 0.5–2.0 |
| NMMNO | 7 | 3–10 |
| PEG 200 | 3 | 1–5 |
| PEG 400 | 2 | 1–5 |
| PEG 600 | 2 | 1–5 |
| Glycerin | 3.5 | 1–10 |
| Giv-Gard DXN | 0.4 | 0.1–1.0 |
| Surfynol 504 | 0.1 | 0.05–0.5 |
| Surfynol 465 | 0.2 | 0.05–0.5 |
| Papicel Blue IJ-PG dye solution | 63 | 50–80 |
| Total | 100 | |

Viscosity = 3.01 cps, UL, 60 rpm, 25° C.
Surface tension = 27.5 dynes/cm
pH = 6.5
Versene 100 XL is a chelating agent from DOW chemical, San Carlos, CA
Giv Gard DXN is a biocide from ANGUS CHEMICAL COMPANY, Buffalo Grove, IL
NMMNO is 4-methylmorpholine N-Oxide 97% from ALDRICH CHEMICAL, WI
PEG 200, PEG 400, PEG 600 are Polyethylene Glycols from DOW chemical, San Carlos, CA
Surfynol 504, Surfynol 465 are surfactants from Air Product from Allentown, PA
Papicel Blue IJ-PG dye solution from Eastwell Company in Korea Experiment A digital image of an annular ring about the size of the iris of a human eye was created in Photoshop 6.0 program and stored on the computer of a piezo (Ultramark) 2000, Inkjet printer (Fas-Co Coders, Chandler, Ariz.). TD103, a titanium dioxide based, solvent based ink, was mixed with monomer mix BX-HEMA LLT, crosslinker aziridine and thermal initiator benzoyl peroxide per formulation TD103A. The digital image of the annular ring was then inkjet printed on lenses and the lens with image was cured for 16 hours at 70 C.

A digital image of an annular circle about the size of the iris of a human eye was divided into four quadrants colored cyan, yellow, magenta and black was created in Photoshop 6.0. TD46, TD47, TD92 and TD106 reactive dye based inks were placed in the ink cartridge of a modified HP550C thermal inkjet printer. The printer was modified to allow a contact lens to pass under the printhead by raising the printhead a distance sufficient to allow the curvature of the contact lens to not be in direct contact with the printhead while maintaining printing quality. The digital image was printed on both titanium dioxide printed and clear, unprinted lenses on the modified HP550C printer. The lenses were exposed to a hot steam environment at 110 C for 30 minutes in an autoclave. After steaming, the lenses were hydrated and extracted in 0.3% sodium carbonate saline of pH 11.1 at 50 to 60 C and evaluated for color intensity. The lenses were then vialed, packaged in saline solution and autoclaved. Lenses were evaluated for mechanical bonding by finger rubbing after one and three sterilization cycle.

Results:
1. All samples had well defined deep colors before hydration
2. After hydration, as determined by finger rub test;
    All lenses remained opaque
    Magenta and Cyan color were little lighter, possibly due to
    expansion/swelling of lens polymer
    Yellow and black color faded.
3. After sterilization, some samples exhibited reduced bonding of opaque material and colors to lenses as determined by a finger-rub test.

Example 9

Use of an Image Receiver Layer on a Contact Lens

The following example describes the use of an image receiver layer applied to a polymer substrate, such as a contact lens, to improve the resolution and definition of an image printed on the polymer substrate.

ViviPrint™ 121

The contact lens was a (dry) hydrogel contact lens that was cast molded from polymerizable hydrophilic monomers (2-hydroxyethylmethacrylate and methacrylic acid), a crosslinking agent, and an initiator. During the processes of applying an image receiver layer, printing an image, and fixation, the dry hydrogel contact lens remained on the mold on which it was formed.

The image receiver layer was composed of a 10% solution in industrial methylated spirits (IMS) or 3A alcohol of ViviPrint™ 121, which is a neutralized poly(vinylpyrrolidone/dimethylaminopropylmethacrylamide) copolymer, CAS number 175893-71-1, supplied as a 10% in water composition with a viscosity of between about 7 to about 23 centipoises at about 25 degrees Celsius, a nominal molecular weight of about $1.05 \times 10^6$ grams per mole, and a glass transition temperature (Tg) of about 184 degrees Celsius) (lot number 0M00054427, product ID 72417D, International Specialty Products, 1361 Alps Road, Wayne, N.J. 07470). The solution of 10% ViviPrint™ 121 in IMS had a viscosity of about 5.18 centipoises and a surface tension of about 25.5 dynes per centimeter. Three drops of this solution was applied by pipette to a dry hydrogel (hydroxyethylmethacrylate) lens that had been previously treated with base, and allowed to air-dry. The digital image file to be printed was opened in a suitable graphics package (such as Paintshop Pro or Adobe Photoshop) on a personal computer and the digital image was printed, using inks containing reactive dyes, onto the image receiver layer-coated lens by a desktop inkjet printer, such as a Lexmark 45SE ink jet printer modified to print onto a lens. Any desktop inkjet printer (for example, those manufactured by Hewlett Packard, Lexmark, and Canon), when modified to print onto a lens may be used. A desktop inkjet printer can be modified to print onto a lens by use of the carriage containing the print heads and the rail on which the carriage is mounted, and of a separate, independent linear slide system to transport the lens in a manner. The carriage and transport systems are independent. The throw distance from the print head to the lens is set by the height at which the carriage is mounted over the transport, and can be adjusted to the desired distance. The range of the throw distance can be from between about 0.1 mm to about 3.0 mm, or from between about 0.25 to about 2.0 mm. Preferably the throw distance is between about 0.5 mm to about 1.5 mm.

After the image was printed on the lens, the lens was subjected to a fixation process wherein the lens was placed on a tripod inside a glass jar, which was in a laboratory oven that had been pre-heated to about 100 to about 110 degrees Celsius. A sufficient amount of water was also in the jar such that when the jar was sealed there was heat and steam present during the 60-minute fixation period. After the fixation process, the lens was hydrated and sterilized as follows: the lens was removed from its mold and hydrated in a 0.5% sodium bicarbonate solution at about 60 degrees Celsius for between about 30 to about 40 minutes; the lens was then removed from the hydration solution, placed in a 0.9% sodium chloride solution, and sterilized in a pressure cooker or autoclave for about 25 minutes at between about 127 to about 132 degrees Celsius.

Following printing, fixation, hydration, and sterilization, the image quality was visually assessed by observing inter-color bleed (the degree of mixing between two colors printed next to each other), dot roundness and spread, and the overall aesthetic appeal of the printed image. This method gave a better quality than that obtained with the PVP K30 treatment but required a two-step process (separate application of the base treatment and the image receiver layer).

PVP K30

The contact lens was a (dry) hydrogel contact lens that was cast molded from polymerizable hydrophilic monomers (2-hydroxyethylmethacrylate and methacrylic acid), a crosslinking agent, and an initiator. During the processes of applying an image receiver layer, printing an image, and fixation, the dry hydrogel contact lens remained on the mold on which it was formed.

The image receiver layer was composed of a 5% solution in a 5% sodium phosphate aqueous solution of PVP K30, which is polyvinylpyrrolidone supplied as a hygroscopic, amorphous white powder with a viscosity (for a 5% solution) of 3 centipoises at 25 degrees Celsius, a nominal molecular weight of $60 \times 10^3$ grams per mole, and a glass transition temperature (Tg) of 163 degrees Celsius (lot number G80920A, catalogue number 23,425-7, Sigma-Aldrich, Milwaukee, Wis.). This composition allowed the simultaneous application of the image receiver layer and the base treatment as a single solution. The dry hydrogel (hydroxyethylmethacrylate) lens was immersed in this solution for up to 30 minutes, removed, the excess solution removed by wicking with an absorbent material in contact with an edge of the lens, and allowed to air-dry. The digital image file to be printed was opened in a suitable graphics package (such as Paintshop Pro or Adobe Photoshop) on a personal computer and the digital image was printed, using inks containing reactive dyes, onto the image receiver layer-coated lens by a desktop inkjet printer, such as a Lexmark 45SE ink jet printer modified to print onto a lens. Any desktop inkjet printer (for example, those manufactured by Hewlett Packard, Lexmark, and Canon), when modified to print onto a lens may be used. After the image was printed on the lens, the lens was subjected to a fixation process wherein the lens was placed on a tripod inside a glass jar, which was in a laboratory oven that had been pre-heated to about 100 to about 110 degrees Celsius. A sufficient amount of water was also in the jar such that when the jar was sealed there was heat and steam present during the 60-minute fixation period. After the fixation process, the lens was hydrated and sterilized as follows: the lens was removed from its mold and hydrated in a 0.5% sodium bicarbonate solution at 60 degrees Celsius for 30 to 40 minutes; the lens was then removed from the hydration solution, placed in a 0.9% sodium chloride solution, and sterilized in a pressure cooker or autoclave for 25 minutes at 127 to 132 degrees Celsius.

Following printing, fixation, hydration, and sterilization, the image quality was visually assessed by observing inter-color bleed (the degree of mixing between two colors printed next to each other), dot roundness and spread, and the overall aesthetic appeal of the printed image. This method gave a slightly lower quality image in comparison to that obtained by the ViviPrint™ 121 treatment described above in this example, but had the advantage of requiring only a single step to apply both the base treatment and the image receiver layer.

Example 10

Use of an Image Receiver Layer on a Prior Layer on a Contact Lens

The following example describes the use of an image receiver layer applied to a prior polymer layer on a polymer substrate, such as a contact lens, to improve the resolution and definition of an image printed on the prior polymer layer. The polymer substrate was a HEMA hydrogel contact lens, and the prior polymer layer contained an opaque pigment.

Application of a prior polymer layer: The contact lens was a (dry) hydrogel contact lens that was cast molded from polymerizable hydrophilic monomers (2-hydroxyethyl-methacrylate and methacrylic acid), a crosslinking agent, and an initiator. During the processes of applying a prior polymer layer, base treatment, applying an image receiver layer, and printing an image, the dry hydrogel contact lens remained on the mold on which it was formed.

A first polymer layer, containing the coloring agent titanium dioxide, was applied to the contact lens. This was achieved by ink jet printing using a white-pigmented ink, containing titanium dioxide in a polymerizable hydrophilic monomer formulation that had a viscosity suitable to ink jet printing and that had physical properties (such as flexibility and linear expandability) compatible with the lens material. Preferred polymerizable hydrophilic monomers include, but are not limited to, glyceryl methacrylate, N-N-dimethylacrylamide, and N-vinyl-2-pyrrolidinone.

A single print pass at a print resolution of 1085 dots per inch (down web) by 185 dots per inch (cross web) was made with a piezo ink jet printing head (Xaar XJ 128/200 dpi) to produce a ring-shaped image, white-pigmented polymer layer on the contact lens. The ring-shaped image had good wetting and opacity. The printed white-pigmented ink was cured using ten cycles through a Fusion ultraviolet light system with 500 W H-bulbs, at a speed of 10 meters per minute, to produce cured, generally tack-free lenses. The resulting cured, white-pigmented polymer layer served as a prior polymer layer onto which the image receiver layer and CYMK (that is to say, a Cyan, Yellow, Magenta, Black four-color process) ink image were later applied.

Base treatment: The lens was soaked in a 10% sodium phosphate solution at 60 degrees Celsius for 30 minutes, avoiding full hydration or distortion. After removal from the base solution, excess fluid was removed from the lens with a lint-free cloth, with care taken to avoid direct contact of the cloth to the lens. The lens was air-dried for 5 minutes.

Image receiving layer: Two to three drops of a 10% solution in industrial methylated spirits (IMS) of ViviPrint™ 121 was pipetted onto the lens to evenly coat the lens surface, with the excess solution allowed to flow off the lens onto the mold. Ethanol or denatured ethanol (for example, 3A alcohol) may be used as an alternative solvent. The lens was air-dried until the alcohol had evaporated, resulting in a thin layer of ViviPrint™ 121 on the lens, that appeared matte and felt dry to the touch.

Reactive dye printing: Aqueous inks containing reactive dyes were used in a CYMK four-color printing process. The reactive dyes included FDA-approved Reactive Red 180, Reactive Blue 21, Reactive Yellow 15, and Reactive Black 5. Examples of ink formulations are given in TABLE 1.

TABLE 1

| | INK COLOR | | | |
| --- | --- | --- | --- | --- |
| MATERIALS | BIR 1 C (Cyan) | BIR 11 Y (Yellow) | BIR 2 M (Magenta) | BIR 12 K (Black) |
| Reactive Blue 21 (23%) | 44% | 0% | 0% | 0% |
| Reactive Red 180 (25%) | 0% | 0% | 66.67% | 0% |
| Reactive Yellow 15 (10%) | 0% | 50% | 0% | 0% |
| Reactive Black 5 (25%) | 0% | 0% | 0% | 10% |
| N-methylmorpholine N-oxide | 0% | 18.7% | 0% | 0% |
| 2-pyrrolidinone | 6% | 2% | 6% | 6% |
| De-ionized water | 29.2% | 18.7% | 8.48% | 66.5% |
| Ethylene glycol | 0% | 10% | 0% | 0% |
| Glycerol | 10% | 0% | 8% | 8% |
| Polyethyleneglycol (PEG 200) | 10% | 0% | 10% | 9% |
| Versene 100XL (Dow) | 0.4% | 0.4% | 0.4% | 0.4% |

TABLE 1-continued

|  | INK COLOR | | | |
| --- | --- | --- | --- | --- |
| MATERIALS | BIR 1<br>C<br>(Cyan) | BIR 11<br>Y<br>(Yellow) | BIR 2<br>M<br>(Magenta) | BIR 12<br>K<br>(Black) |
| Proxel GXL (Avecia) | 0.3% | 0.1% | 0.3% | 0.1% |
| Dynol 604 (Air Products) | 0.1% | 0.1% | 0.15% | 0% |
| Filtration | 1.0 micron | 1.0 micron | 1.0 micron | 1.0 micron |
| Viscosity at 25 degrees Celsius (centipoises) | 3.00 | 3.33 | 3.08 | 3.03 |
| Original pH | 6.45 | 7.38 | 6.71 | 6.4 |
| Adjusted pH | — | 6.49 | — | — |
| Surface tension (dynes per centimeter) | 28.0 | 31.0 | 30.5 | 38.2 |

The mold bearing the attached contact lens was fed through an ink jet printer (model Lexmark 45se). The digital image file to be printed was opened in a suitable graphics package (such as Paintshop Pro or Adobe Photoshop) on a personal computer and the digital image was printed, using inks containing reactive dyes, onto the image receiver layer-coated lens by a desktop inkjet printer, such as a Lexmark 45SE ink jet printer modified to print onto a lens. Any desktop inkjet printer (for example, those manufactured by Hewlett Packard, Lexmark, and Canon), when modified to print onto a lens may be used. A desktop inkjet printer can be modified to print onto a lens by use of the carriage containing the print heads and the rail on which the carriage is mounted, and of a separate, independent linear slide system to transport the lens in a manner. The carriage and transport systems are independent. The throw distance from the print head to the lens is set by the height at which the carriage is mounted over the transport, and can be adjusted to the desired distance. Print resolution was 600 dots per inch (normal mode). After printing, the lens was air-dried for a few minutes then subjected to post-printing processes (fixation, hydration, and sterilization).

Post-printing processes: After the image was printed on the lens, the lens was subjected to a fixation process wherein the lens was placed on a tripod inside a glass jar, which was in a laboratory oven that had been pre-heated to about 100 to about 110 degrees Celsius. A sufficient amount of water was also in the jar such that when the jar was sealed there was heat and steam present during the 60-minute fixation period. After the fixation process, the lens was hydrated and sterilized as follows: the lens was removed from its mold and hydrated in a 0.5% sodium bicarbonate solution at 60 degrees Celsius for 30 to 40 minutes; the lens was then removed from the hydration solution, placed in a 0.9% sodium chloride solution, and sterilized in a pressure cooker or autoclave for 25 minutes at 127 to 132 degrees Celsius.

Following printing, fixation, hydration, and sterilization, the image quality was visually assessed by observing color intensity, inter-color bleed (the degree of mixing between two colors printed next to each other), dot roundness and spread, and the overall aesthetic appeal of the printed image. This method gave a good quality image in comparison to the desired level of image quality (for example, an inkjet image printed conventionally onto paper).

All publications, including patent documents and scientific articles, referred to in this application and the bibliography and attachments are incorporated by reference in their entirety for all purposes to the same extent as if each individual publication were individually incorporated by reference.

All headings are for the convenience of the reader and should not be used to limit the meaning of the text that follows the heading, unless so specified.

What is claimed is:

1. An article of manufacture, comprising:
   a) a polymer substrate, and
   b) a digitally encoded image made with ink;
      wherein said polymer substrate forms a lens;
      wherein said polymer substrate is subjected to a pre-treatment process that precedes the application of said digitally encoded image to said polymer substrate; and
      wherein said pre-treatment process results in an enhanced image quality of said digitally encoded image.

2. The article of manufacture of claim 1, wherein said digitally encoded image is made at least in part using said pre-treatment process.

3. The article of manufacture of claim 1, wherein said pre-treatment process comprises one or more chemical modification of said polymer substrate.

4. The article of manufacture of claim 3, wherein said one or more chemical modification of said polymer substrate is selected from the group consisting of: chemical cleaning, chemical texture modification, chemical or electrochemical activation or creation of reactive groups on or within said polymer substrate, application of one or more chemicals to said polymer substrate, and combinations thereof.

5. The article of manufacture of claim 1, wherein said pre-treatment process comprises the application of an image receiver layer.

6. The article of manufacture of claim 5, wherein said image receiver layer comprises a chemical coating applied to the surface of said polymer substrate.

7. The article of manufacture of claim 5, wherein said image receiver layer has a thickness of between about 0.1 micrometers to about 200 micrometers.

8. The article of manufacture of claim 5, wherein said image receiver layer has a thickness of between about 0.1 micrometers to about 100 micrometers.

9. The article of manufacture of claim 5, wherein said image receiver layer has a thickness of between about 0.1 micrometers to about 20 micrometers.

10. The article of manufacture of claim 5, wherein said image receiver layer is applied to the entire area of said polymer substrate.

11. The article of manufacture of claim 5, wherein said image receiver layer is applied to one or more partial area of said polymer substrate.

12. The article of manufacture of claim 5, wherein said image receiver layer is applied to a prior layer on or in said polymer substrate.

13. The article of manufacture of claim 12, wherein said prior layer is a prior polymer layer containing a coloring agent.

14. The article of manufacture of claim 5, wherein said image receiver layer comprises a highly absorbent polymer.

15. The article of manufacture of claim 14, wherein said highly absorbent polymer comprises a polyvinylpyrrolidone homopolymer, a polyvinylpyrrolidone copolymer, a polyacrylamide homopolymer, a polyacrylamide copolymer, a polyacrylate homopolymer, a polyacrylate copolymer, a proteinaceous material, a carbohydrate, or a combination thereof.

16. The article of manufacture of claim 5, wherein said image receiver layer is non-transiently incorporated into or onto said polymer substrate.

17. The article of manufacture of claim 5, wherein said image receiver layer is a temporary coating.

18. The article of manufacture of claim 17, wherein said image receiver layer is substantially removable during the normal post-fixation processes.

19. The article of manufacture of claim 5, wherein said image receiver layer is applied prior to, simultaneously with, or after exposure of said polymer substrate to an activating substance.

20. The article of manufacture of claim 5, wherein said image receiver layer is compatible with a base treatment of said polymer substrate.

21. The article of manufacture of claim 19, wherein said activating substance comprises a base.

22. The article of manufacture of claim 5, wherein said image receiver layer is applied by direct coating, application of droplets or microdroplets, ink jet printing, soaking, impregnation, spin coating, dip coating, curtain coating, or pad printing.

23. A method of making an article of manufacture comprising a polymer substrate and a digitally encoded image made with ink, wherein said polymer substrate forms a lens, comprising:
a) subjecting said polymer substrate to a pre-treatment process; and
b) applying said digitally encoded image to said polymer substrate,
wherein said pre-treatment process results in an enhanced image quality of said digitally encoded image.

24. The method of claim 23, wherein said pre-treatment process is applied to said lens.

25. The method of claim 23, wherein said digitally encoded image is applied to said lens.

26. The method of claim 25, wherein said digitally encoded image is applied in whole or in part directly to said lens.

27. The method of claim 25, wherein said digitally encoded image is applied in whole or in part indirectly to said lens.

28. The method of claim 25, wherein said digitally encoded image is applied to one or more portions of said lens.

29. The method of claim 23, wherein said digitally encoded image is made at least in part using said pre-treatment process.

30. The method of claim 23, wherein said pre-treatment process is applied to one or more portions of the polymer substrate.

31. The method of claim 23 wherein said pre-treatment process comprises one or more chemical modification of said polymer substrate.

32. The method of claim 31, wherein said one or more chemical modification of said polymer substrate is selected from the group consisting of: chemical cleaning, chemical texture modification, chemical or electrochemical activation or creation of reactive groups on or within said polymer substrate, application of one or more chemicals to said polymer substrate, and combinations thereof.

33. The method of claim 23, wherein said pre-treatment process comprises the application of an image receiver layer.

34. The method of claim 33, wherein said image receiver layer comprises a chemical coating applied to the surface of said polymer substrate.

35. The method of claim 33, wherein said image receiver layer has a thickness of between about 0.1 micrometers to about 200 micrometers.

36. The method of claim 33, wherein said image receiver layer has a thickness of between about 0.1 micrometers to about 100 micrometers.

37. The method of claim 33, wherein said image receiver layer has a thickness of between about 0.1 micrometers to about 20 micrometers.

38. The method of claim 33, wherein said image receiver layer is applied to the entire area of said polymer substrate.

39. The method of claim 33, wherein said image receiver layer is applied to one or more partial area of said polymer substrate.

40. The method of claim 33, wherein said image receiver layer is applied to a prior layer on or in said polymer substrate.

41. The method of claim 40, wherein said prior layer is a prior polymer layer containing a coloring agent.

42. The method of claim 33, wherein said image receiver layer comprises a highly absorbent polymer.

43. The method of claim 42, wherein said highly absorbent polymer comprises a polyvinylpyrrolidone homopolymer, a polyvinylpyrrolidone copolymer, a polyacrylamide homopolymer, a polyacrylamide copolymer, a polyacrylate homopolymer, a polyacrylate copolymer, a proteinaceous material, a carbohydrate, or a combination thereof.

44. The method of claim 33, wherein said image receiver layer is non-transiently incorporated into or onto said polymer substrate.

45. The method of claim 33, wherein said image receiver layer is a temporary coating.

46. The method of claim 45, wherein said image receiver layer is substantially removable during the normal post-fixation processes.

47. The method of claim 33, wherein said image receiver layer is applied prior to, simultaneously with, or after exposure of said polymer substrate to an activating substance.

48. The method of claim 33, wherein said image receiver layer is compatible with a base treatment of said polymer substrate.

49. The method of claim 47, wherein said activating substance comprises a base.

50. The method of claim 33, wherein said image receiver layer is applied by direct coating, application of droplets or microdroplets, ink jet printing, soaking, impregnation, spin coating, dip coating, curtain coating, or pad printing.

51. An article of manufacture, comprising:

2.) a polymer substrate

3.) a digitally encoded image made with ink comprising reactive components, wherein said polymer substrate forms a lens;

wherein said digitally encoded image is applied to said polymer substrate by ink jet printing; and wherein each said reactive component is stored in an ink jet printer cartridge.

52. The article of manufacture of claim 51, wherein said reactive components are stored in separate ink jet printer cartridges.

53. The article of manufacture of claim 51, wherein said ink comprises one or more polymerizable monomer and one or more initiator; and wherein each said one or more polymerizable monomer and said one or more initiator are stored in an ink jet printer cartridge.

54. The article of manufacture of claim 51, wherein said reactive components are stored in separate ink jet printer cartridges.

* * * * *